US011974107B2

(12) United States Patent
Ko et al.

(10) Patent No.: US 11,974,107 B2
(45) Date of Patent: Apr. 30, 2024

(54) ELECTRONIC DEVICE AND METHOD FOR AUDIO SHARING USING THE SAME

(71) Applicant: Samsung Electronics Co., Ltd., Suwon-si (KR)

(72) Inventors: Areum Ko, Suwon-si (KR); Nathan Robert Folkman, San Francisco, CA (US); Sean Ryan Bornheimer, San Francisco, CA (US); Byeongkuk Keam, Suwon-si (KR); Younguk Do, Suwon-si (KR); Jooil Sung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 17/509,755

(22) Filed: Oct. 25, 2021

(65) Prior Publication Data
US 2022/0053270 A1 Feb. 17, 2022

Related U.S. Application Data

(63) Continuation of application No. PCT/KR2021/010577, filed on Aug. 10, 2021.
(Continued)

(30) Foreign Application Priority Data

Nov. 26, 2020 (KR) .......... 10-2020-0161201

(51) Int. Cl.
*H04R 3/12* (2006.01)
*G06F 3/16* (2006.01)
(Continued)

(52) U.S. Cl.
CPC .............. *H04R 3/12* (2013.01); *G06F 3/165* (2013.01); *H04W 4/80* (2018.02); *H04W 8/005* (2013.01);
(Continued)

(58) Field of Classification Search
CPC ........ H04R 3/12; H04R 1/1016; H04R 5/033; H04R 2420/07; G06F 3/165;
(Continued)

(56) References Cited

U.S. PATENT DOCUMENTS 10,206,039 B1  2/2019  Yun et al.
10,924,858 B2  2/2021  Kraemer et al.
(Continued)

FOREIGN PATENT DOCUMENTS

KR  10-2015-0034034 A  4/2015
KR  10-2015-0096915 A  8/2015
(Continued)

OTHER PUBLICATIONS

International Search Report with Written Opinion and English translation dated Nov. 18, 2021; International Appln. No. PCT/KR2021/010577.

*Primary Examiner* — Tuan D Nguyen
(74) *Attorney, Agent, or Firm* — Jefferson IP Law, LLP

(57) ABSTRACT

An electronic device is provided to detect a connection of a first wireless audio device and a second wireless audio device, identify whether a wearer of the first wireless audio device and a wearer of the second wireless audio device are different, based on a first sensor signal received from the first wireless audio device and a second sensor signal received from the second wireless audio device, execute an audio sharing mode, based on the wearer of the first wireless audio device and the wearer of the second wireless audio device being different, control configuration information about the first and the second wireless audio device that are related to a function of the audio sharing mode, and transmit audio data according to the audio sharing mode to the first wireless audio device and the second wireless audio device, based on the configuration information.

20 Claims, 28 Drawing Sheets

Related U.S. Application Data

(60) Provisional application No. 63/064,107, filed on Aug. 11, 2020.

(51) Int. Cl.
*H04W 4/80* (2018.01)
*H04W 8/00* (2009.01)
*G10K 11/175* (2006.01)
*H04R 1/10* (2006.01)
*H04R 5/033* (2006.01)

(52) U.S. Cl.
CPC .......... *G10K 11/175* (2013.01); *H04R 1/1016* (2013.01); *H04R 5/033* (2013.01); *H04R 2420/07* (2013.01)

(58) Field of Classification Search
CPC ............... G10K 11/175; G10K 11/178; G10K 2210/1081; H04W 4/80; H04W 8/005; H04W 4/38
See application file for complete search history.

(56) References Cited

U.S. PATENT DOCUMENTS

| | | |
|---|---|---|
| 11,140,486 B2 | 10/2021 | Bae et al. |
| 2015/0236806 A1 | 8/2015 | Kim |
| 2016/0357510 A1 | 12/2016 | Watson et al. |
| 2017/0311105 A1* | 10/2017 | Hariharan ............ H04R 29/001 |
| 2018/0359554 A1 | 12/2018 | Razouane et al. |
| 2020/0169805 A1* | 5/2020 | Degraye .................. H04R 3/12 |
| 2020/0174745 A1* | 6/2020 | Jung ....................... G10L 15/22 |

FOREIGN PATENT DOCUMENTS

| | | |
|---|---|---|
| KR | 10-2019-0016802 A | 2/2019 |
| KR | 10-2019-0061681 A | 6/2019 |
| KR | 10-2073171 B1 | 2/2020 |

* cited by examiner

FIG. 11
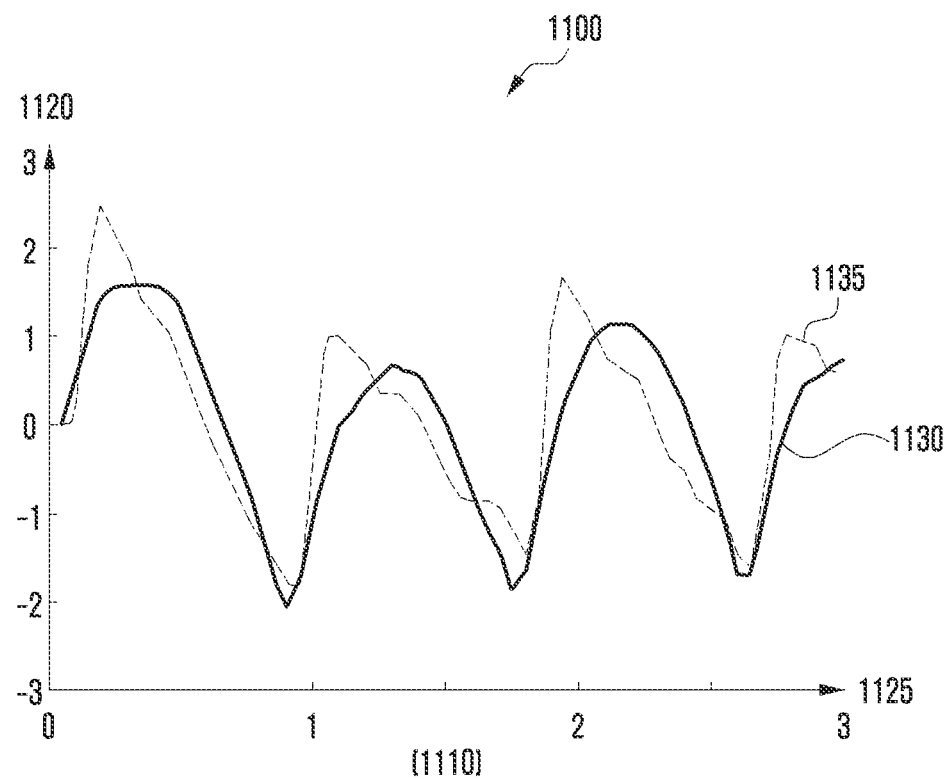
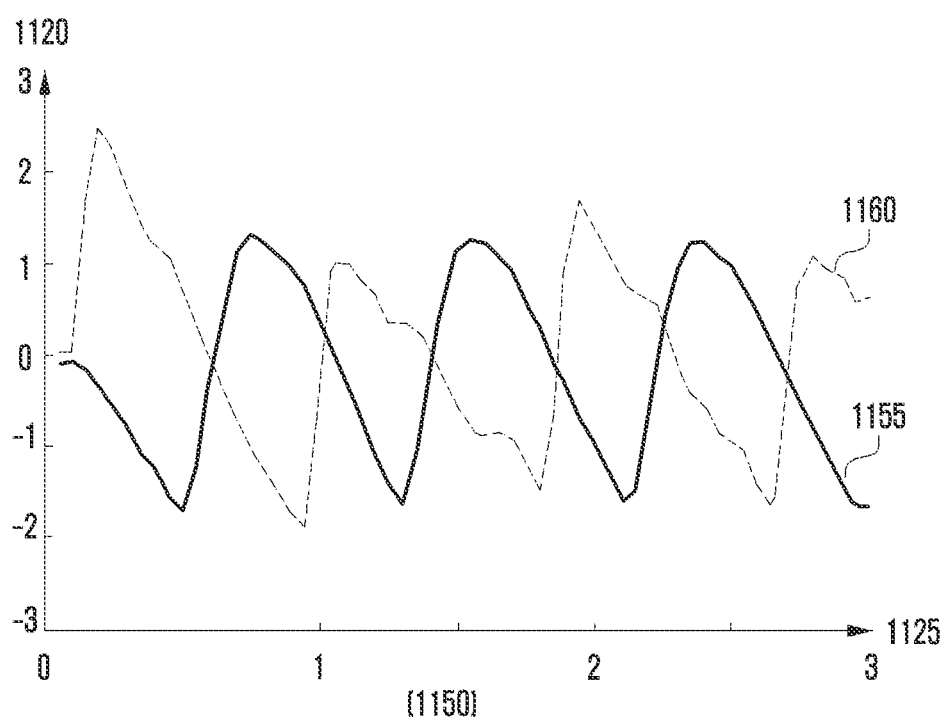

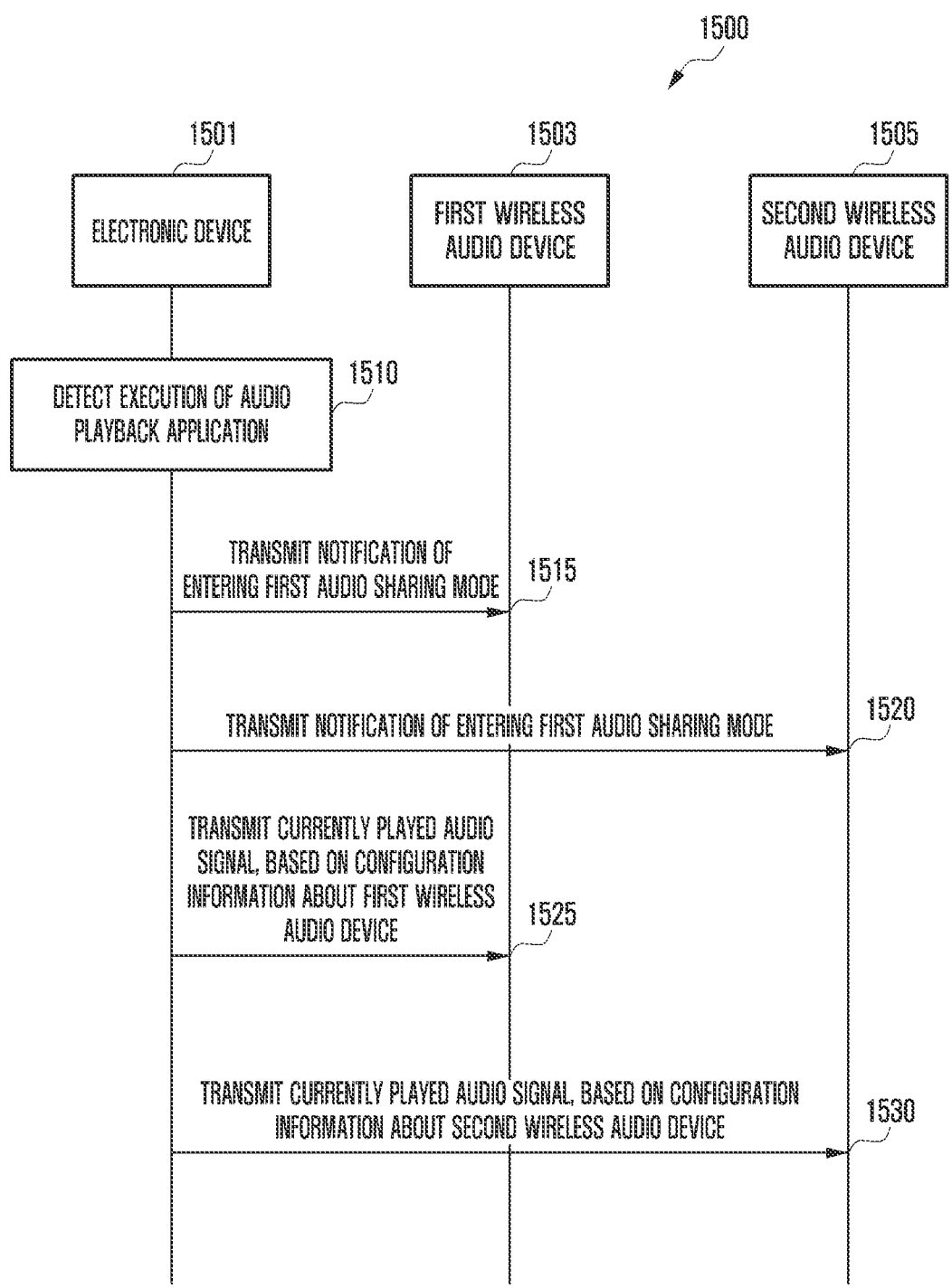

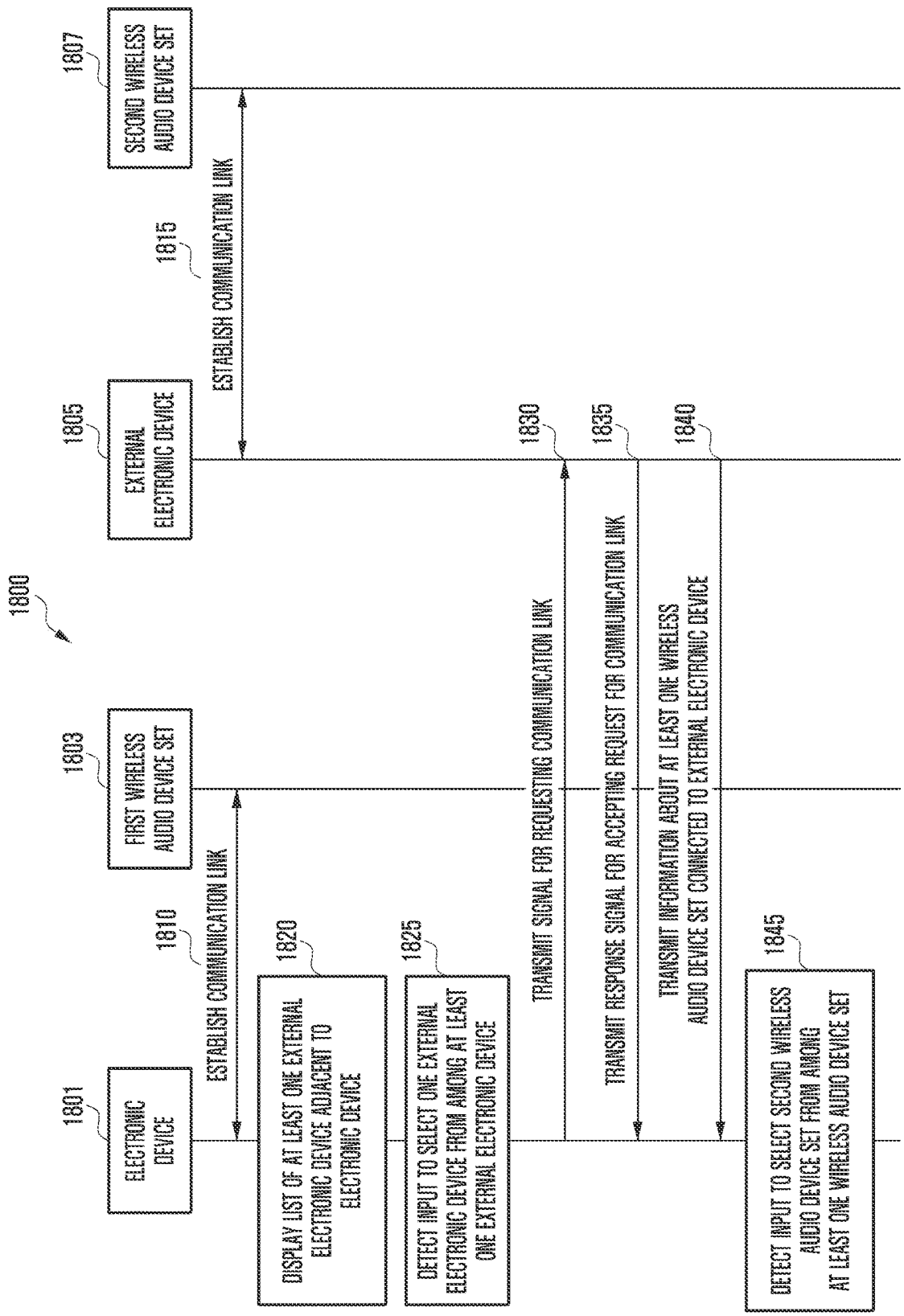

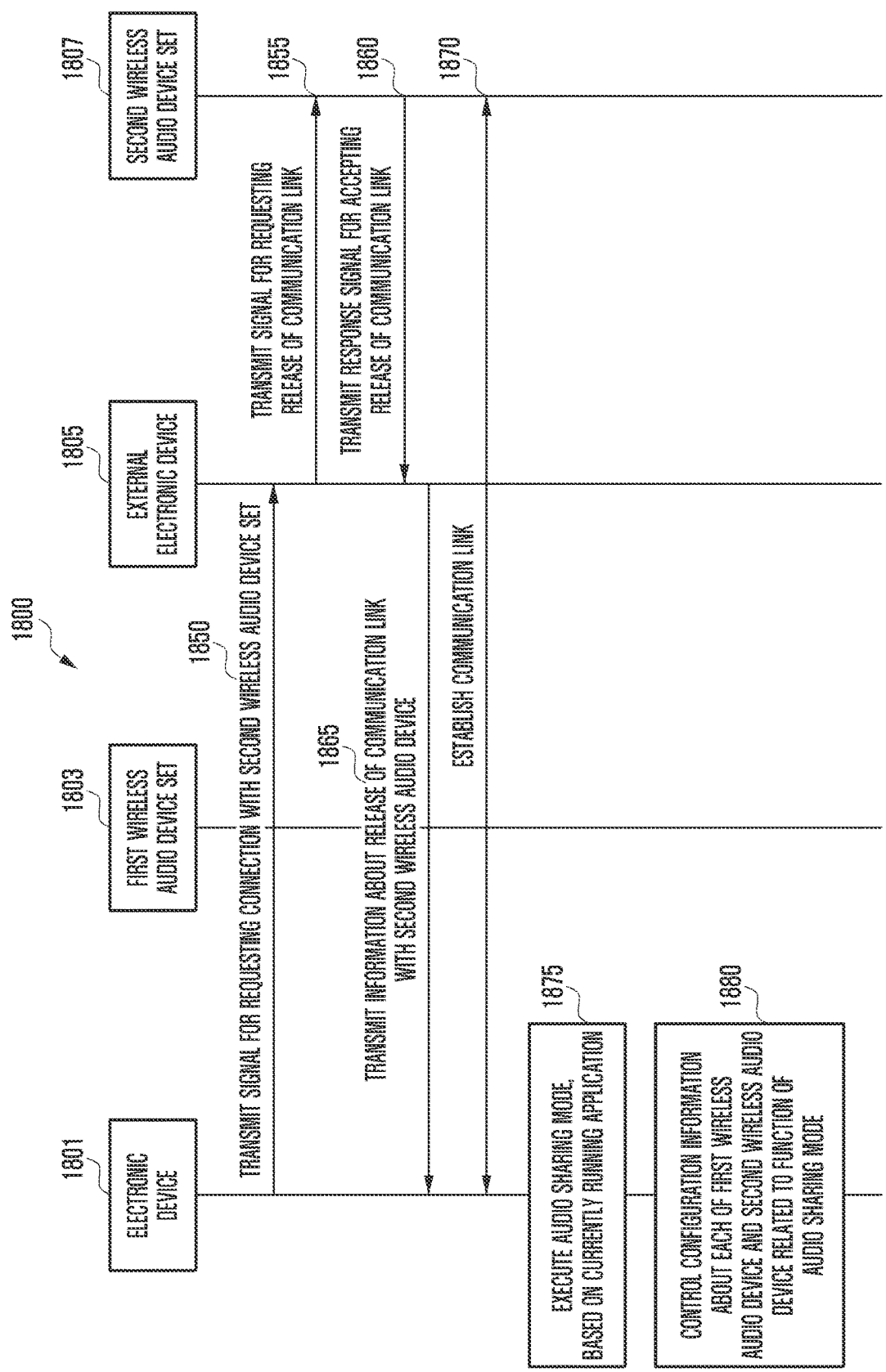

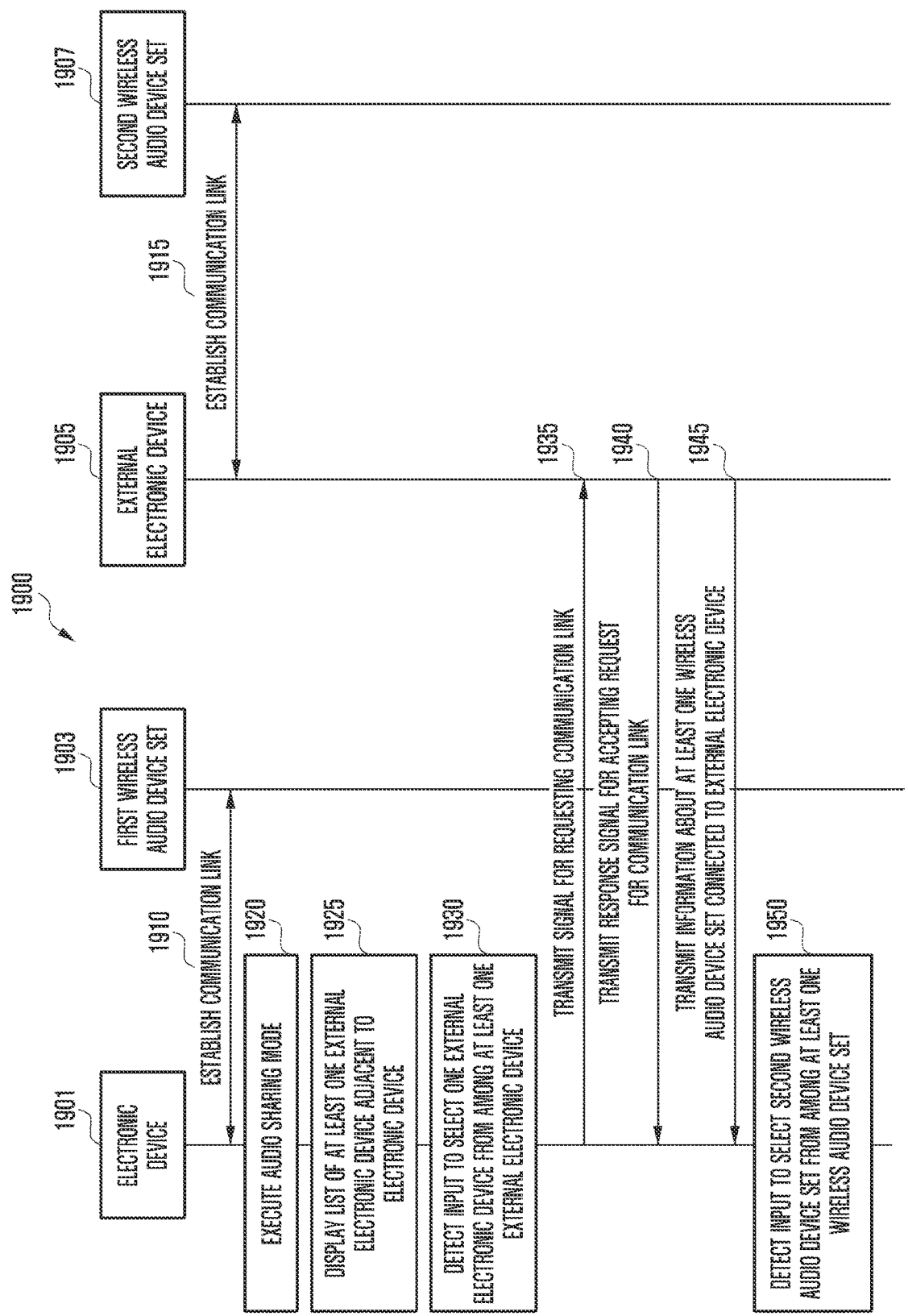

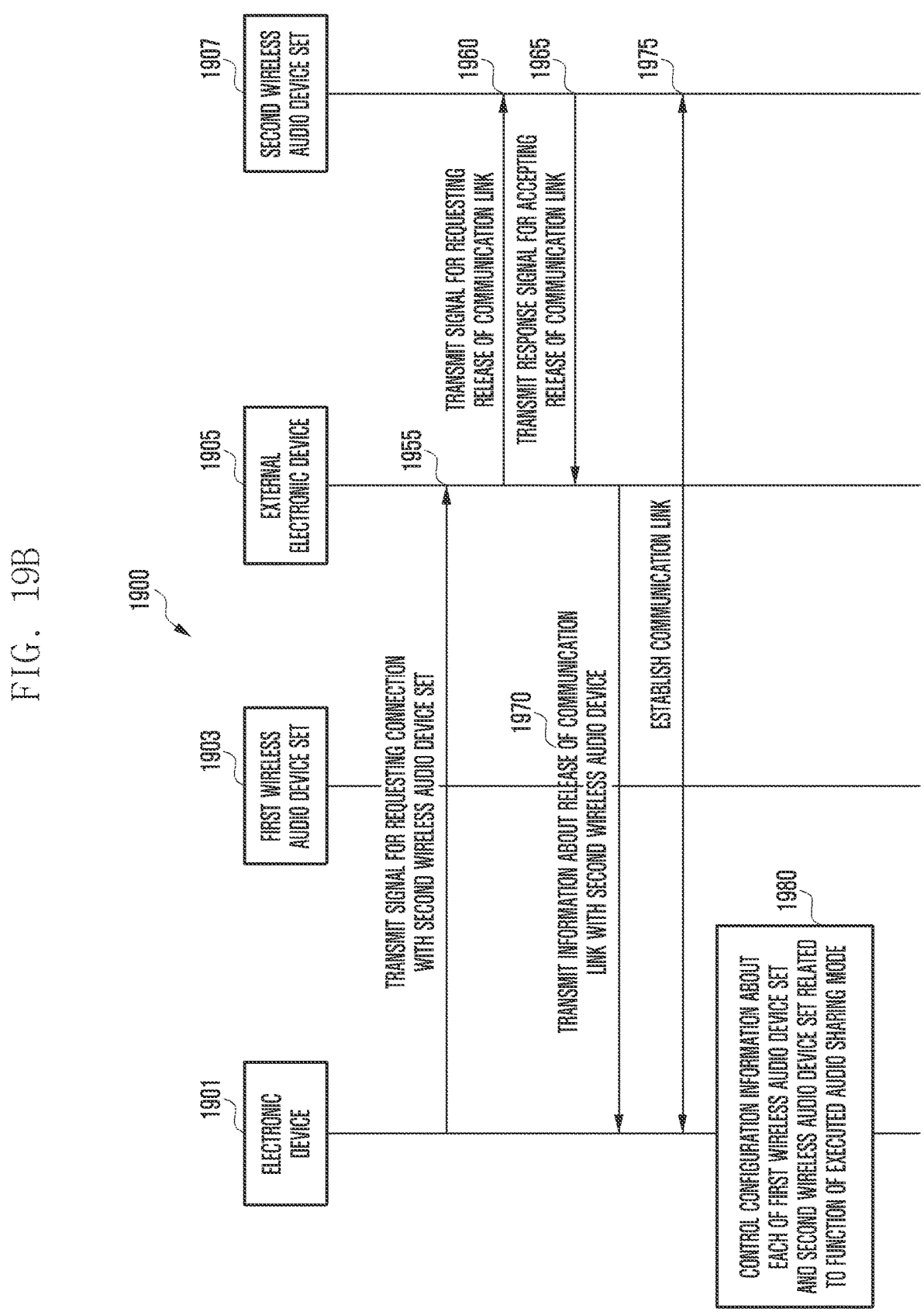

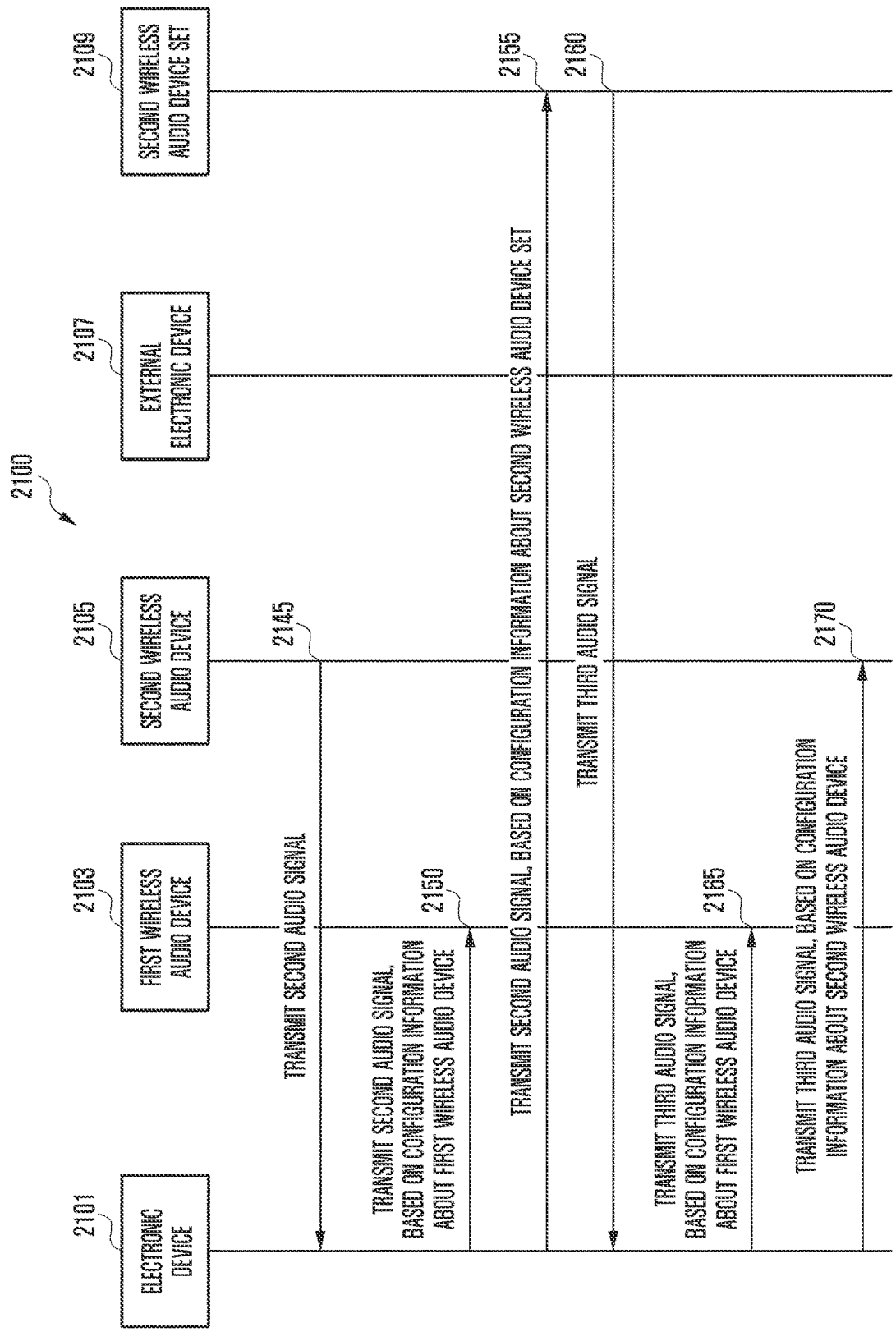

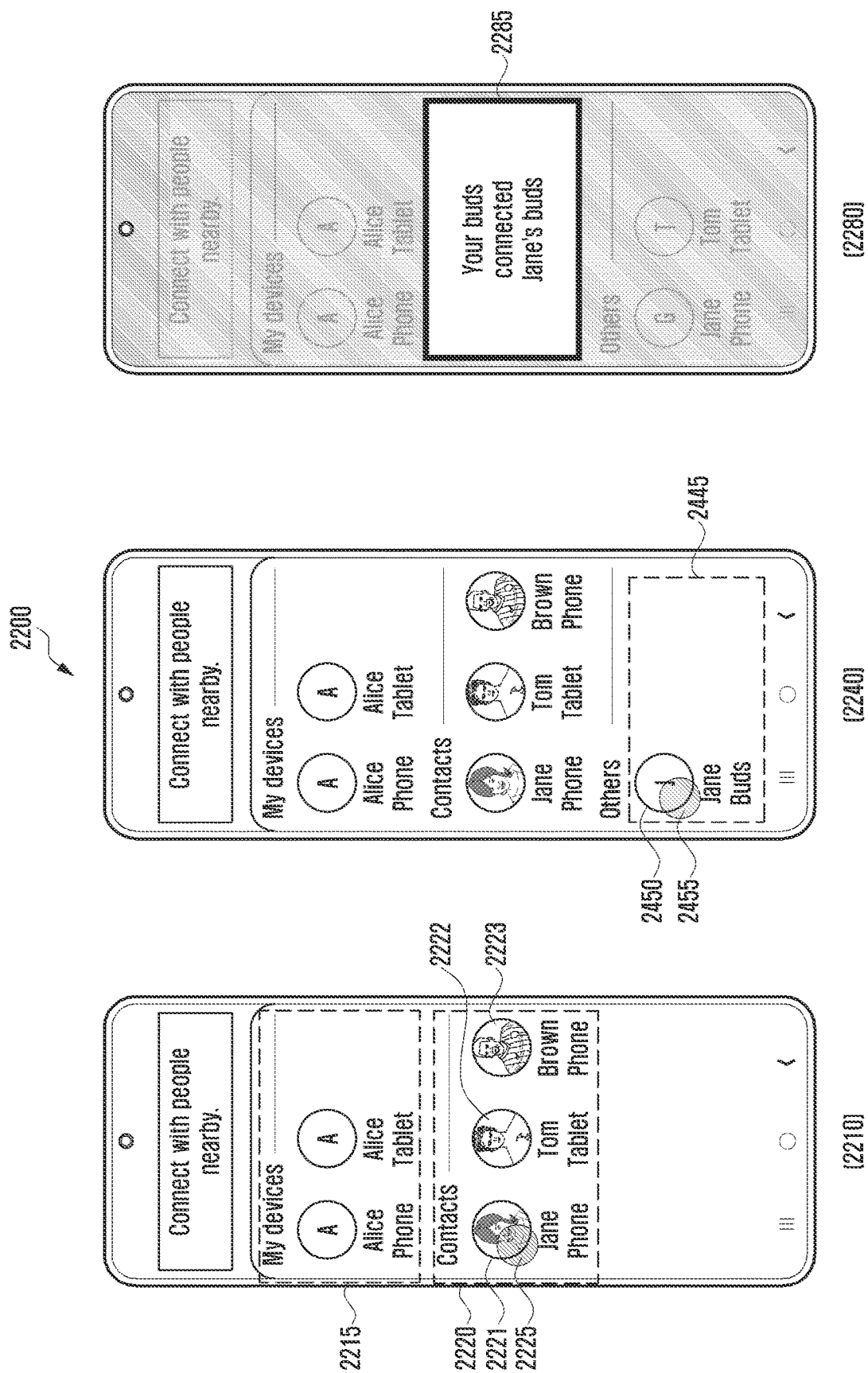

ELECTRONIC DEVICE AND METHOD FOR AUDIO SHARING USING THE SAME

CROSS-REFERENCE TO RELATED APPLICATION(S)

This application is a continuation application, claiming priority under § 365(c), of an International application No. PCT/KR2021/010577, filed on Aug. 10, 2021, which is based on and claims the benefit of a U.S. Provisional application Ser. No. 63/064,107, filed on Aug. 11, 2020, in the U.S. Patent and Trademark Office, and under 35 U.S.C. § 119(a) of a Korean patent application number 10-2020-0161201, filed on Nov. 26, 2020, in the Korean Intellectual Property Office, the disclosure of each of which is incorporated by reference herein in its entirety.

TECHNICAL FIELD

The disclosure relates to an electronic device and an audio sharing method using the same.

BACKGROUND ART

An electronic device may be connected (e.g., paired) with a wireless audio device through short-range wireless communication (e.g., Bluetooth). The wireless audio device may be configured in a body-inserted form. For example, a pair of wireless audio devices may wirelessly operate in a state of being inserted into or being closely attached to the left and right ears of a user. The wireless audio devices may include a speaker and at least one microphone and may output an audio signal received from the electronic device through the speaker. The user may share the pair of wireless audio devices with a different user to listen to currently played audio data together.

The above information is presented as background information only, and to assist with an understanding of the disclosure. No determination has been made, and no assertion is made, as to whether any of the above might be applicable as prior art with regard to the disclosure.

DISCLOSURE

Technical Problem

However, the electronic device cannot identify whether the wireless audio devices of the pair are worn on the different users, and thus cannot provide an audio sharing service suitable for each user.

Aspects of the disclosure are to address at least the above-mentioned problems and/or disadvantages, and to provide at least the advantages described below. Accordingly, an aspect of the disclosure is to provide an electronic device that can identify whether wireless audio devices of a pair are worn on different users, respectively, based on sensor signals received from the wireless audio devices of the pair. When the wireless audio devices of the pair are worn on the different users, respectively, the electronic device may control configuration information about each of the wireless audio devices of the pair.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a wireless communication circuit, and a processor configured to be operatively coupled with the wireless communication circuit, wherein the processor may be configured to detect a connection of a first wireless audio device and a second wireless audio device through the wireless communication circuit, identify whether a wearer of the first wireless audio device and a wearer of the second wireless audio device are different, based on a first sensor signal received from the first wireless audio device and a second sensor signal received from the second wireless audio device, execute an audio sharing mode, based on the wearer of the first wireless audio device and the wearer of the second wireless audio device being different, control configuration information about the first wireless audio device and the configuration information about the second wireless audio device that are related to a function of the audio sharing mode, and transmit audio data according to the audio sharing mode to the first wireless audio device and the second wireless audio device, based on the configuration information about the first wireless audio device and the configuration information about the second wireless audio device, respectively.

In accordance with another aspect of the disclosure, an audio sharing method of an electronic device is provided. The method includes detecting a connection of a first wireless audio device and a second wireless audio device through a wireless communication circuit, identifying whether a wearer of the first wireless audio device and a wearer of the second wireless audio device are different, based on a first sensor signal received from the first wireless audio device and a second sensor signal received from the second wireless audio device, executing an audio sharing mode, based on the wearer of the first wireless audio device and the wearer of the second wireless audio device being different, controlling configuration information about the first wireless audio device and the configuration information about the second wireless audio device that are related to a function of the audio sharing mode, and transmitting audio data according to the audio sharing mode to the first wireless audio device and the second wireless audio device, based on the configuration information about the first wireless audio device and the configuration information about the second wireless audio device, respectively.

Advantageous Effects of Invention

An electronic device according to various embodiments of the disclosure may control configuration information about each of wireless audio devices of a pair when the wireless audio devices of the pair are worn on different users, respectively, thereby providing an audio sharing service suitable for each user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIGS. 10 and 11 are graphs illustrating a method of identifying whether a first wireless audio device and a second wireless audio device are worn on ears of different users, based on a first sensor signal and a second sensor signal, according to various embodiments of the disclosure;

FIG. 15 is another view illustrating signal flow between an electronic device, a first wireless audio device, and a second wireless audio device, according to an embodiment of the disclosure;

FIGS. 18A and 18B are views illustrating signal flow between an electronic device, a first wireless audio device set, an external electronic device, and a second wireless audio device set, according to various embodiments of the disclosure;

FIGS. 19A and 19B are further views illustrating signal flow between an electronic device, a first wireless audio device set, an external electronic device, and a second wireless audio device set, according to various embodiments of the disclosure;

FIGS. 21A and 21B are further views illustrating signal flow between an electronic device, a first wireless audio device, a second wireless audio device, an external electronic device, and a second wireless audio device set, according to various embodiments of the disclosure;

FIG. 22 is a view illustrating a connection with at least one wireless audio device set connected to an external electronic device adjacent to an electronic device according to an embodiment of the disclosure.

Throughout the drawings, it should be noted that like reference numbers are used to depict the same or similar elements, features, and structures.

BEST MODE FOR CARRYING OUT THE DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
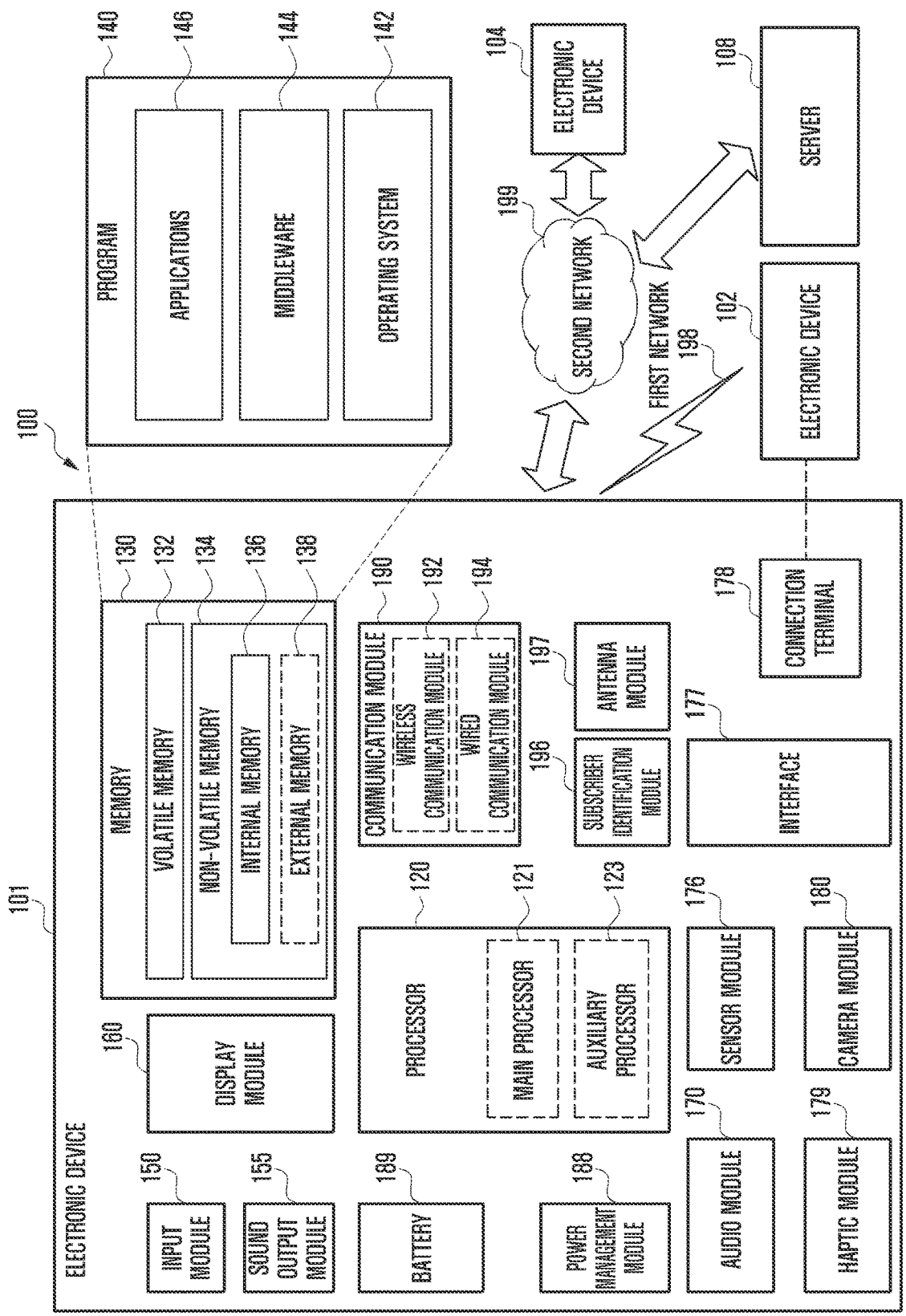
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to or consumed by the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
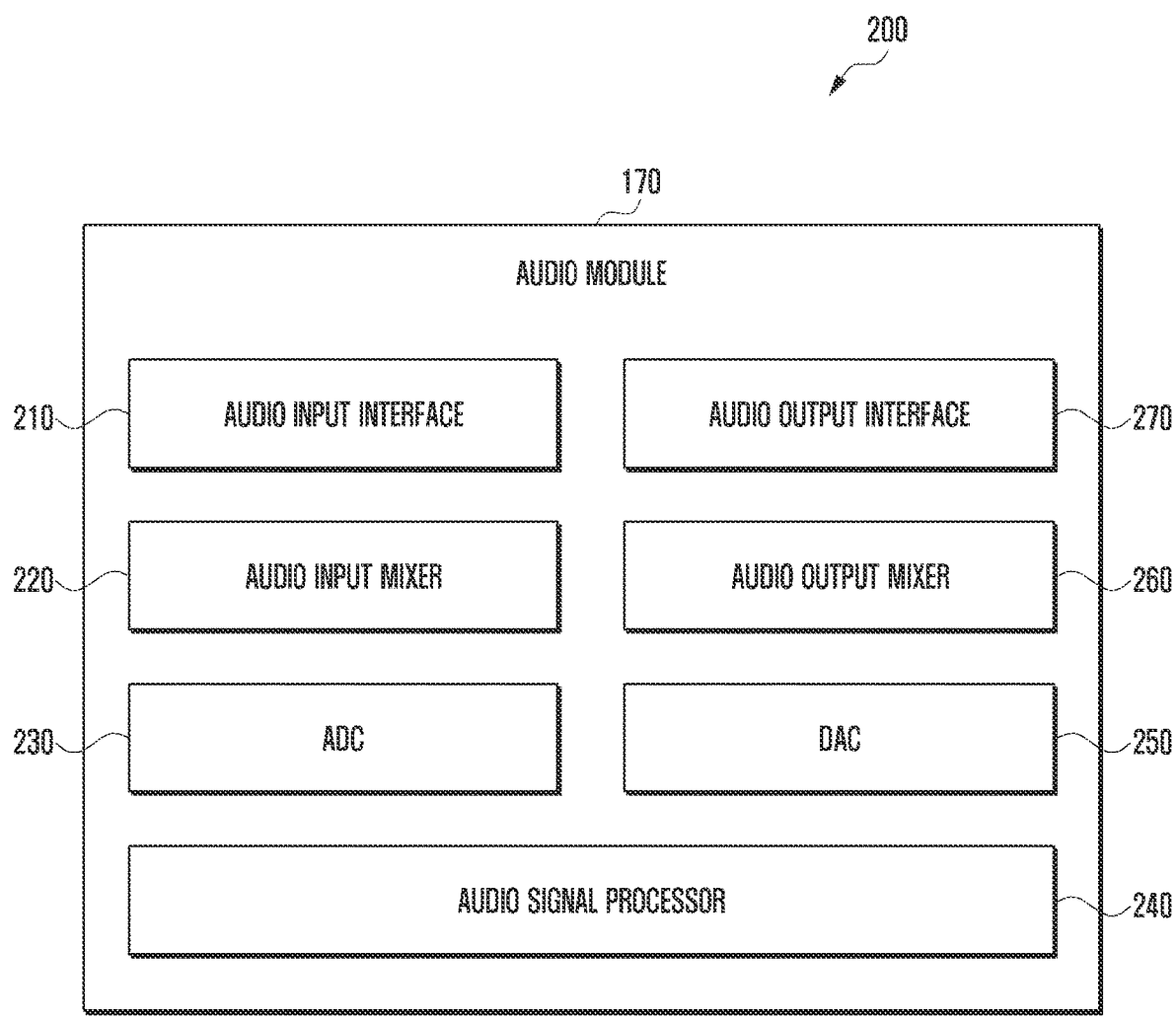
FIG. 2 is a block diagram illustrating an audio module according to an embodiment of the disclosure.

FIG. 2 is a block diagram illustrating an audio module according to an embodiment of the disclosure.

Referring to block diagram 200 of FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor 120 or the memory 130) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 3:
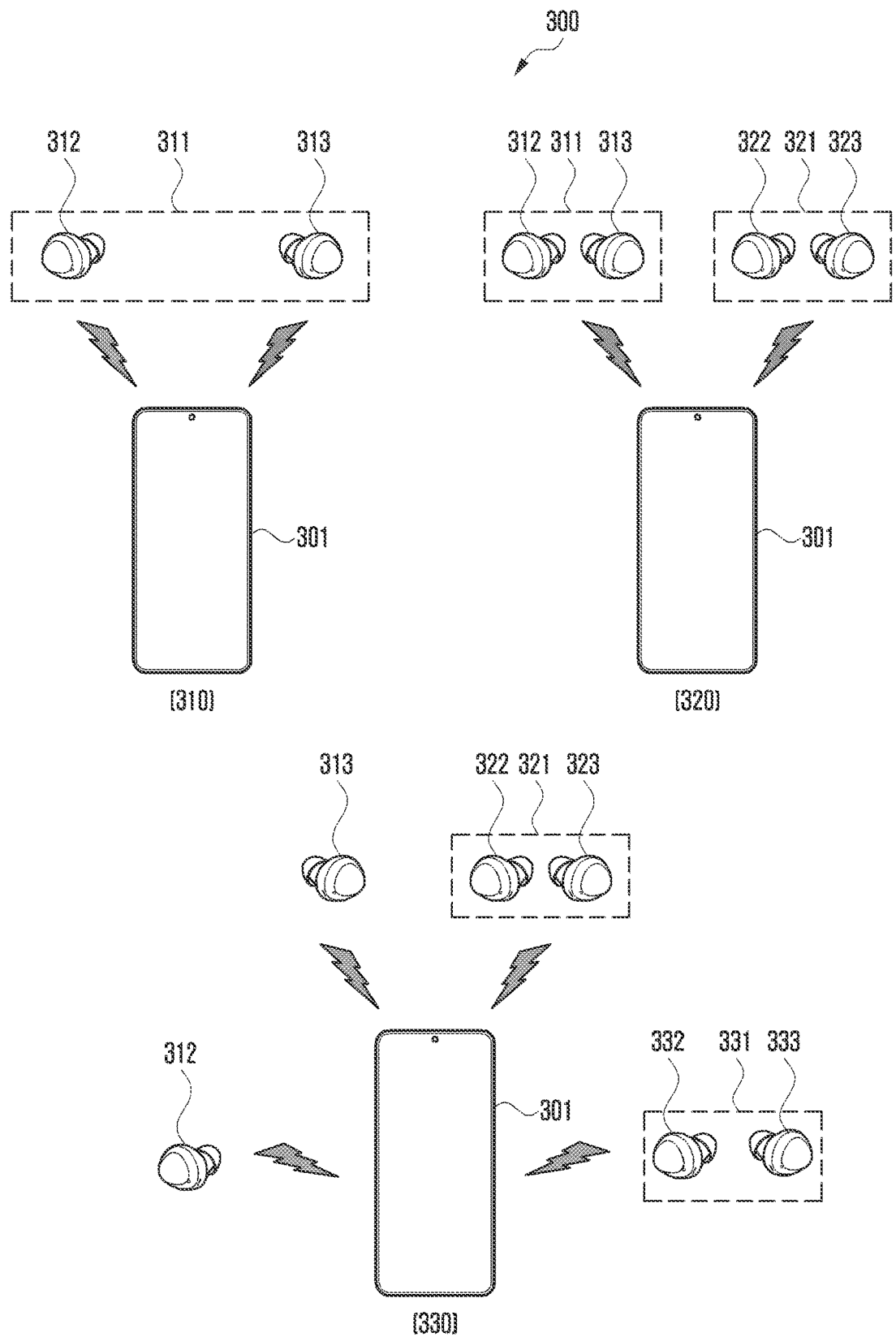
FIG. 3 illustrates a connection between an electronic device and at least one wireless audio device according to an embodiment of the disclosure.

FIG. 3 is a view illustrating a connection between an electronic device and at least one wireless audio device according to an embodiment of the disclosure.

Referring to view 300 of FIG. 3, as indicated by reference numeral 310, an electronic device 301 may be connected to at least one wireless audio device set, for example, a first wireless audio device set 311, through short-range wireless communication (e.g., Bluetooth, Wi-Fi, Wi-Fi Direct, or Wi-Fi Aware). The first wireless audio device set 311 may be an ear-wearable type designed to be worn on an ear of a user. For example, the first wireless audio device set 311 may include a first wireless audio device 312 designed to be worn on the left ear of the user and a second wireless audio device 313 designed to be worn on the right ear.

In an embodiment, the electronic device 301 may be paired with each of the first wireless audio device 312 and the second wireless audio device 313 through short-range wireless communication. In an embodiment, the electronic device 301 may identify whether a user wearing the first wireless audio device 312 and a user wearing the second wireless audio device 313 are different, based on sensor information received from each of the first wireless audio device 312 and the second wireless audio device 313. When the user wearing the first wireless audio device 312 and the user wearing the second wireless audio device 313 are different from each other, the electronic device 301 may execute an audio sharing mode (e.g., a first audio sharing mode or a second audio sharing mode), based on the type of an application being executed. That is, the electronic device 301 may support (or relay) audio sharing between the first wireless audio device 312 and the second wireless audio device 313.

An operation of supporting audio sharing between the first wireless audio device 312 and the second wireless audio device 313 described above will be described in various embodiments with reference to FIG. 4 and FIG. 12 to FIG. 17.

In another embodiment, as indicated by reference numeral 320, the electronic device 301 may establish a communication link with a second wireless audio device set 321 (e.g., a third wireless audio device 322 and a fourth wireless audio device 323) while establishing a communication link with the first wireless audio device set 311 including the first wireless audio device 312 and the second wireless audio device 313. For example, the second wireless audio device set 321 may be in a state of establishing a communication link with an external electronic device (not shown) before establishing a communication link to the electronic device 301. The electronic device 301 may retrieve the external electronic device (not shown) positioned close to the electronic device 301 and may request a communication link from the retrieved external electronic device (not shown). When receiving a response signal indicating acceptance of the requested communication link from the external electronic device (not shown), the electronic device 301 may establish a communication link with the external electronic device (not shown). The electronic device 301 may receive, from external electronic device (not shown), information about the second wireless audio device set 321 (e.g., the third wireless audio device 322 and the fourth wireless audio device 323) establishing a communication link to the external electronic device (not shown). The electronic device 301 may transmit a request for a communication link with the second wireless audio device set 321 (e.g., the third wireless audio device 322 and the fourth wireless audio device 323) to the external electronic device (not shown). The external electronic device (not shown) may perform an operation of releasing the communication link with the second wireless audio device set 321 and may transmit information about the release of the communication link to the electronic device 301. After the communication link with the second wireless audio device set 321 is released, the external electronic device (not shown) may enter an automatic connection standby state. For example, the external electronic device (not shown) may enter the automatic connection standby state so that the second wireless audio device set 321 may automatically establish a communication link to the external electronic device (not shown), to which the second wireless audio device set 321 has a history of being previously connected, when the second wireless audio device set 321 is not in a state of being connected to another electronic device.

Upon receiving the information, the electronic device 301 may establish a communication link with the second wireless audio device set 321.

In an embodiment, the electronic device 301 may be in a state of establishing a communication link with each of the first wireless audio device set 311 and the second wireless audio device set 321, and may control configuration information about each of the first wireless audio device 312, the second wireless audio device 313, and the second wireless audio device set 321. The electronic device 301 may support (or relay) audio sharing between the first wireless audio device 312, the second wireless audio device 313, and the second wireless audio device set 321, which have established the communication link thereto.

An operation of supporting audio sharing between the first wireless audio device set 311 and the second wireless audio device set 321 described above will be described in various embodiments with reference to FIG. 18A to FIG. 22.

In still another embodiment, as indicated by reference numeral 330, the electronic device 301 may establish a communication link with the second wireless audio device set 321 (e.g., the third wireless audio device 322 and the fourth wireless audio device 323) and a third wireless audio device set 331 (e.g., a fifth wireless audio device 332 and a sixth wireless audio device 333) while the first wireless audio device 312 and the second wireless audio device 313 are worn on ears of different users, and an audio sharing mode may be executed accordingly. For example, the second wireless audio device set 321 may be in a state of establishing a communication link with a first external electronic device (not shown) before establishing a communication link to the electronic device 301, and the third wireless audio device set 331 may be in a state of establishing a communication link with a second external electronic device (not shown) before establishing a communication link to the electronic device 301.

An operation of establishing a communication link between the electronic device 301 and the second wireless audio device set 321 connected to the first external electronic device (not shown) and an operation of establishing a communication link between the electronic device 301 and the third wireless audio device set 331 connected to the second external device (not shown) may be the same as an operation of establishing the communication link between the electronic device 301 and the second wireless audio device set 321 connected to the external electronic device (not shown) in the foregoing description with reference to reference numeral 320, and thus the description with reference to reference numeral 320 may equally apply.

In an embodiment, the electronic device 301 may control configuration information about each of the first wireless audio device 312, the second wireless audio device 313, the second wireless audio device set 321, and the third wireless audio device set 331. The electronic device 301 may support (or relay) audio sharing between the first wireless audio device 312, the second wireless audio device 313, the second wireless audio device set 321, and the third wireless audio device set 331, which have established a communication link thereto.

An operation of supporting audio sharing between the first wireless audio device 312, the second wireless audio device 313, the second wireless audio device set 321, and the third wireless audio device set 331 described above will be described in various embodiments with reference to FIG. 23A and FIG. 23B.

Figure 4:
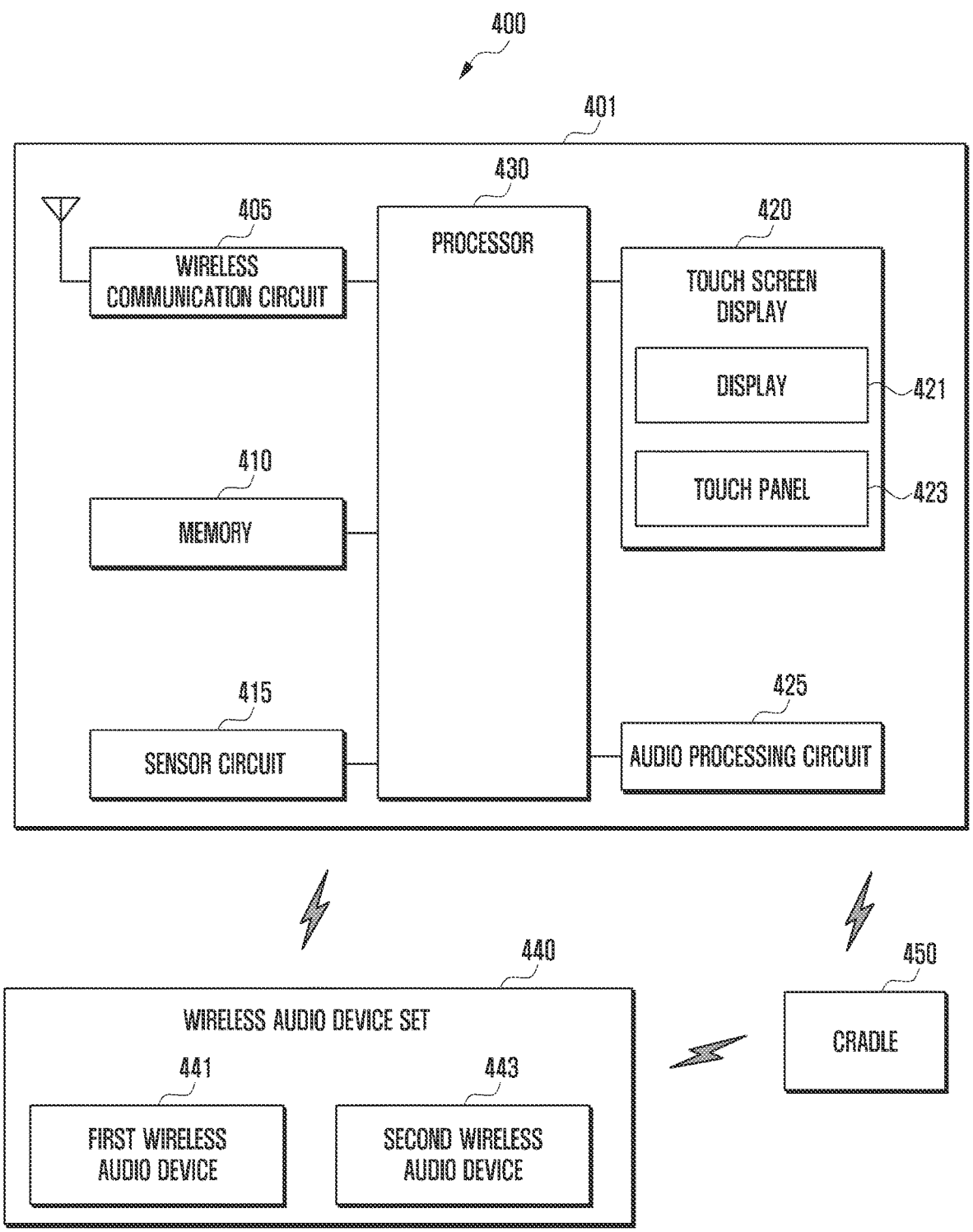
FIG. 4 is a block diagram illustrating a connection between an electronic device, a wireless audio device set, and a cradle, according to an embodiment of the disclosure.

FIG. 4 is a block diagram illustrating a connection between an electronic device, a wireless audio device set, and a cradle, according to an embodiment of the disclosure.

Referring to block diagram 400 of FIG. 4, electronic device 401 (e.g., the electronic device 301 of FIG. 3) may include a wireless communication circuit 405 (e.g., the communication module 190 of FIG. 1), a memory 410 (e.g., the memory 130 of FIG. 1), a sensor circuit 415 (e.g., the sensor module 176 of FIG. 1), a touchscreen display 420 (e.g., the display module 160 of FIG. 1), an audio processing circuit 425 (e.g., the audio module 170 of FIG. 1), and a processor 430 (e.g., the processor 120 of FIG. 1).

According to various embodiments, the wireless communication circuit 405 (e.g., the communication module 190 of FIG. 1) may include a short-range wireless communication circuit. The short-range wireless communication circuit may include Bluetooth, Bluetooth Low Energy (BLE), Wi-Fi Direct, ultra-wideband (UWB), and/or Infrared Data Association (IrDA).

In an embodiment, the short-range wireless communication circuit may establish a communication link between the electronic device 401 and a wireless audio device set 440 and/or a cradle 450. In a state of being paired with the wireless audio device set 440, the electronic device 401 may transmit audio data output from the audio processing circuit 425 to the wireless audio device set 440, for example, a first wireless audio device 441 and a second wireless audio device 443, through the wireless communication circuit 405. In a state of being paired with each of the first wireless audio device 441 and the second wireless audio device 443, the electronic device 401 may receive an audio signal input from at least one microphone of the first wireless audio device 441 or at least one microphone of the second wireless audio device 443 from the first wireless audio device 441 or the second wireless audio device 443 through the wireless communication circuit 405.

According to various embodiments, the memory 410 (e.g., the memory 130 of FIG. 1) may store information about the wireless audio device set 440 (e.g., the first wireless audio device 441 and the second wireless audio device 443). The memory 410 may store a sensor value for determining whether the first wireless audio device 441 and the second wireless audio device 443 are worn on an ear of a user. The memory 410 may store a sensor value for determining whether a user wearing the first wireless audio device 441 is different from a user wearing the second wireless audio device 443. The memory 410 may store configuration information about the first wireless audio device 441 and configuration information about the second wireless audio device 443.

In an embodiment, the memory 410 may store a program for executing an audio sharing mode, for example, a first audio sharing mode (e.g., a media sharing mode) or a second audio sharing mode (e.g., a conversation sharing mode), based on the type of an application currently running.

According to various embodiments, the sensor circuit 415 (e.g., the sensor module 176 of FIG. 1) may include a photoplethysmography (PPG) sensor, an acceleration sensor, a geomagnetic sensor, and/or a gyro sensor. The sensor circuit 415 (e.g., the PPG sensor) may obtain a PPG signal. The sensor circuit 415 (e.g., the acceleration sensor, the geomagnetic sensor, and/or the gyro sensor) may obtain movement information about the electronic device 401 (e.g., the movement direction information of the electronic device 401 and/or slope information on the electronic device 401). The obtained PPG signal and/or movement information about the electronic device 401 may be used to determine whether a user of the electronic device 401 and a user wearing the first wireless audio device 441 and/or the second wireless audio device 443 are the same.

According to various embodiments, the touchscreen display 420 (e.g., the display module 160 of FIG. 1) may be configured as a single body including a display 421 and a touch panel 423.

In an embodiment, the touchscreen display 420 may display an image under the control of the processor 430 and may be configured as, but not limited to, a liquid crystal display (LCD), a light-emitting diode (LED) display, an organic light-emitting diode (OLED) display, a microelectromechanical system (MEMS) display, an electronic paper display, or a flexible display.

In an embodiment, the touchscreen display 420 may display information related to the wireless audio device set 440, for example, the first wireless audio device 441 and the second wireless audio device 443, under the control of the processor 430. For example, the information related to the wireless audio device set 440 may include information about whether the electronic device 401 is paired with the wireless audio device set 440, for example, each of the first wireless audio device 441 and the second wireless audio device 443, information about whether the first wireless audio device 441 and the second wireless audio device 443 are worn on an ear of a user, battery information about the first wireless audio device 441 and the second wireless audio device 443, and/or control information for manipulating the first wireless audio device 441 and the second wireless audio device 443 (e.g., control information related to a function of the electronic device 401 (e.g., a control signal related to connection and disconnection of a phone call or audio playback).

In an embodiment, the touchscreen display 420 may display a user interface for controlling configuration information about a wireless audio device establishing a communication link with the electronic device 401 according to the audio sharing mode executed under the control of the processor 430.

According to various embodiments, although not shown, the audio processing circuit 425 (e.g., the audio module 170 of FIG. 1) may include a speaker and a microphone. The audio processing circuit 425 may output audio data through the speaker. The audio processing circuit 425 may collect various types of audio data (e.g., the user's voice) externally generated through the microphone. The microphone may include a plurality of microphones. The audio processing circuit 425 may transmit the output audio data to the paired wireless audio device set 440 (e.g., the first wireless audio device 441 and the second wireless audio device 443) through the wireless communication circuit 405 under the control of the processor 430.

According to various embodiments, the processor 430 (e.g., the processor 120 of FIG. 1) may control the overall operation of the electronic device 401 and signal flow between internal components of the electronic device 401 and may process data.

In an embodiment, the processor 430 may be connected through communication with the first wireless audio device 441 and the second wireless audio device 443 through the wireless communication circuit 405. The processor 430 may identify whether the first wireless audio device 441 and the second wireless audio device 443 are worn on an ear of a user, based on a first sensor signal of the first wireless audio device 441 received from the first wireless audio device 441 and a second sensor signal of the second wireless audio device 443 from the second wireless audio device 443. For example, the processor 430 may receive sensor signals detected through sensor circuits of the first wireless audio device 441 and the second wireless audio device 443 from the first wireless audio device 441 and the second wireless audio device 443, and may identify whether the first wireless audio device 441 and the second wireless audio device 443 are worn on an ear of a user, based on the sensor signals. In another example, the processor 430 may receive information about whether the first wireless audio device 441 and the second wireless audio device 443 are worn on an ear of a user from the first wireless audio device 441 and the second wireless audio device 443 through the wireless communication circuit 405, and may identify whether the first wireless audio device 441 and the second wireless audio device 443 are worn on the ear of the user or are detached from the ear of the user.

In an embodiment, when it is identified that the first wireless audio device 441 and the second wireless audio device 443 are worn on an ear of a user, the processor 430 may identify whether the first wireless audio device 441 and the second wireless audio device 443 are worn on the ears of the same user or on ears of different users by comparing the first sensor signal and the second sensor signal.

In another embodiment, the processor 430 may further receive information about a user wearing each of the wireless audio devices 441 and 443 from each of the first wireless audio device 441 and the second wireless audio device 443 through the wireless communication circuit 405. The electronic device 401 may identify user information about the electronic device 401 by comparing a sensor signal obtained through the sensor circuit 415 with sensor information about at least one user stored in the memory 410. The processor 430 may compare the information about the user wearing each of the wireless audio devices 441 and 443 received from each of the first wireless audio device 441 and the second wireless audio device 443 with the user information about the electronic device 401. For example, the processor 430 may identify whether the user of the electronic device 401 is the same as the user wearing the first wireless audio device 441 or whether the user of the electronic device 401 is the same as the user of the second wireless audio device 443, thereby identifying whether the first wireless audio device 441 and the second wireless audio device 443 are worn on the ears of the same user.

In an embodiment, when the user wearing the first wireless audio device 441 and the user wearing the second wireless audio device 443 are different, the processor 430 may determine whether the currently running application is an application related to audio playback. When the currently running application is an application related to audio playback, the processor 430 may execute the first audio sharing mode (e.g., the media sharing mode). The processor 430 may control configuration information about each of the first wireless audio device 441 and the second wireless audio device 443 related to a function of the first audio sharing mode. For example, the configuration information may include active noise cancellation (ANC) configuration information, volume control information (volume up/down), and/or event notification reception information.

In an embodiment, upon executing the first audio sharing mode, the processor 430 may transmit audio data currently being played to the first wireless audio device 441 and the second wireless audio device 443 through the application related to audio playback.

In an embodiment, when it is identified that the currently running application is not an application related to audio playback, the processor 430 may execute the second audio sharing mode (e.g., the conversation sharing mode). The processor 430 may control configuration information about each of the first wireless audio device 441 and the second wireless audio device 443 related to a function of the second audio sharing mode.

In an embodiment, after executing the second audio sharing mode, the processor 430 may control the configuration information about each of the wireless audio devices 441 and 443 to be suitable for the second audio sharing mode.

In various embodiments, the wireless audio device set 440 may include the first wireless audio device 441 and the second wireless audio device 443. The wireless audio device set 440 will be described in detail with reference to FIG. 5.

In various embodiments, the cradle 450 may include a housing (not shown) configured in the form of a case to accommodate the first wireless audio device 441 and the second wireless audio device 443. The housing (not shown) of the cradle 450 may include at least one groove in which the first wireless audio device 441 and the second wireless audio device 443 can be seated. The housing (not shown) of the cradle 450 may include a cover to protect the first wireless audio device 441 and the second wireless audio device 443 from foreign substances.

In an embodiment, the first wireless audio device 441 and the second wireless audio device 443 may be seated in the groove formed in the housing (not shown) of the cradle 450. For example, the groove formed in the housing (not shown) may be formed such that ear plugs of the first wireless audio device 441 and the second wireless audio device 443 are inserted into the groove.

In an embodiment, the cradle 450 may include a connector pin for supplying power to the first wireless audio device 441 and the second wireless audio device 443. The first wireless audio device 441 and the second wireless audio device 443 include a terminal and/or a pogo pin that come in physical contact with the connector pin formed on the housing (not shown) while being seated in the groove of the cradle 450. The first wireless audio device 441 and the second wireless audio device 443 may be connected with the cradle 450 by the connector pin to receive power from the cradle 450, and may supply power to batteries included in the first wireless audio device 441 and the second wireless audio device 443 to charge the batteries.

In an embodiment, the first wireless audio device 441 and the second wireless audio device 443 may perform power line communication (PLC) with the cradle 450 through a connection terminal. The first wireless audio device 441 and the second wireless audio device 443 may perform wireless communication with the cradle 450.

An electronic device 401 according to various embodiments may include a wireless communication circuit 405 and a processor 430 operatively coupled with the wireless communication circuit 405, wherein the processor 430 may be configured to detect a connection of a first wireless audio device 441 and a second wireless audio device 443 through the wireless communication circuit, identify whether a wearer of the first wireless audio device 441 and a wearer of the second wireless audio device 443 are different, based on a first sensor signal received from the first wireless audio device 441 and a second sensor signal received from the second wireless audio device 443, execute an audio sharing mode, based on the wearer of the first wireless audio device 441 and the wearer of the second wireless audio device 443 being different, control configuration information about the first wireless audio device 441 and the configuration information about the second wireless audio device 443 that are related to a function of the audio sharing mode, and transmit audio data according to the audio sharing mode to the first wireless audio device 441 and the second wireless audio device 443, based on the configuration information about the first wireless audio device 441 and the configuration information about the second wireless audio device 443, respectively.

The electronic device 401 according to various embodiments may further include a display 421, wherein the processor 430 may be configured to control the display 421 to display a user interface for controlling the configuration information about the first wireless audio device 441 and the configuration information about the second wireless audio device 443.

According to various embodiments, the configuration information may include ANC configuration information, volume control information, event reception configuration information, and/or microphone and/or speaker control information about each of the first wireless audio device 441 and the second wireless audio device 443.

According to various embodiments, the audio sharing mode may include a first audio sharing mode and a second audio sharing mode.

According to various embodiments, the first audio sharing mode may include a media sharing mode, and the processor 430 may be configured to identify a currently running application upon identifying that the wearer of the first wireless audio device 441 and the wearer of the second wireless audio device 443 are different, and execute the first audio sharing mode when the currently running application is an application related to audio playback.

According to various embodiments, the processor 430 may be configured to transmit audio data currently played in the first audio sharing mode to the first wireless audio device 441, based on the configuration information about the first wireless audio device 441, and transmit the audio data currently played in the first audio sharing mode to the second wireless audio device 443, based on the configuration information about the second wireless audio device 443.

According to various embodiments, the second audio sharing mode may include a conversation sharing mode, and the processor 430 may be configured to execute the second audio sharing mode when the currently running application is not an application related to audio playback.

According to various embodiments, the processor 430 may be configured to receive first audio data from the first wireless audio device 441, transmit the first audio data to the second wireless audio device 443, based on the configuration information about the second wireless audio device 443, receive second audio data from the second wireless audio device 443, and transmit the second audio data to the first wireless audio device 441, based on the configuration information about the first wireless audio device 441.

According to various embodiments, the processor 430 may be configured to detect a communication link with an external electronic device through the wireless communication circuit 405, receive and display information about at least one wireless audio device having a communication link to the external electronic device from the external electronic device, transmit a signal for requesting a connection with a first wireless audio device set to the external electronic device upon detecting a user input to select the first wireless audio device set from among the at least one wireless audio device, and establish a communication link with the first wireless audio device set when receiving a signal relating to release of a connection with the first wireless audio device set from the external electronic device.

According to various embodiments, the information about the at least one wireless audio device may include a MAC address, identification information, and/or a security key.

According to various embodiments, the processor 430 may be configured to control the configuration information about the first wireless audio device 441, the configuration information about the second wireless audio device 443, and configuration information about the first wireless audio device set that are related to the function of the executed audio sharing mode, and transmit the audio data according to the audio sharing mode to the first wireless audio device 441, the second wireless audio device 443, and the first wireless audio device set, based on the configuration information about the first wireless audio device 441, the configuration information about the second wireless audio device 443, and the configuration information about the first wireless audio device set, respectively.

According to various embodiments, the processor 430 may be configured to identify whether the first wireless audio device 441 and the second wireless audio device 443 are worn, based on the first sensor signal received from the first wireless audio device 441 and the second sensor signal received from the second wireless audio device 443.

According to various embodiments, the processor 430 may be configured to receive the first sensor signal and the second sensor signal from the first wireless audio device 441 and the second wireless audio device 443 at a specified time interval.

Figure 5:
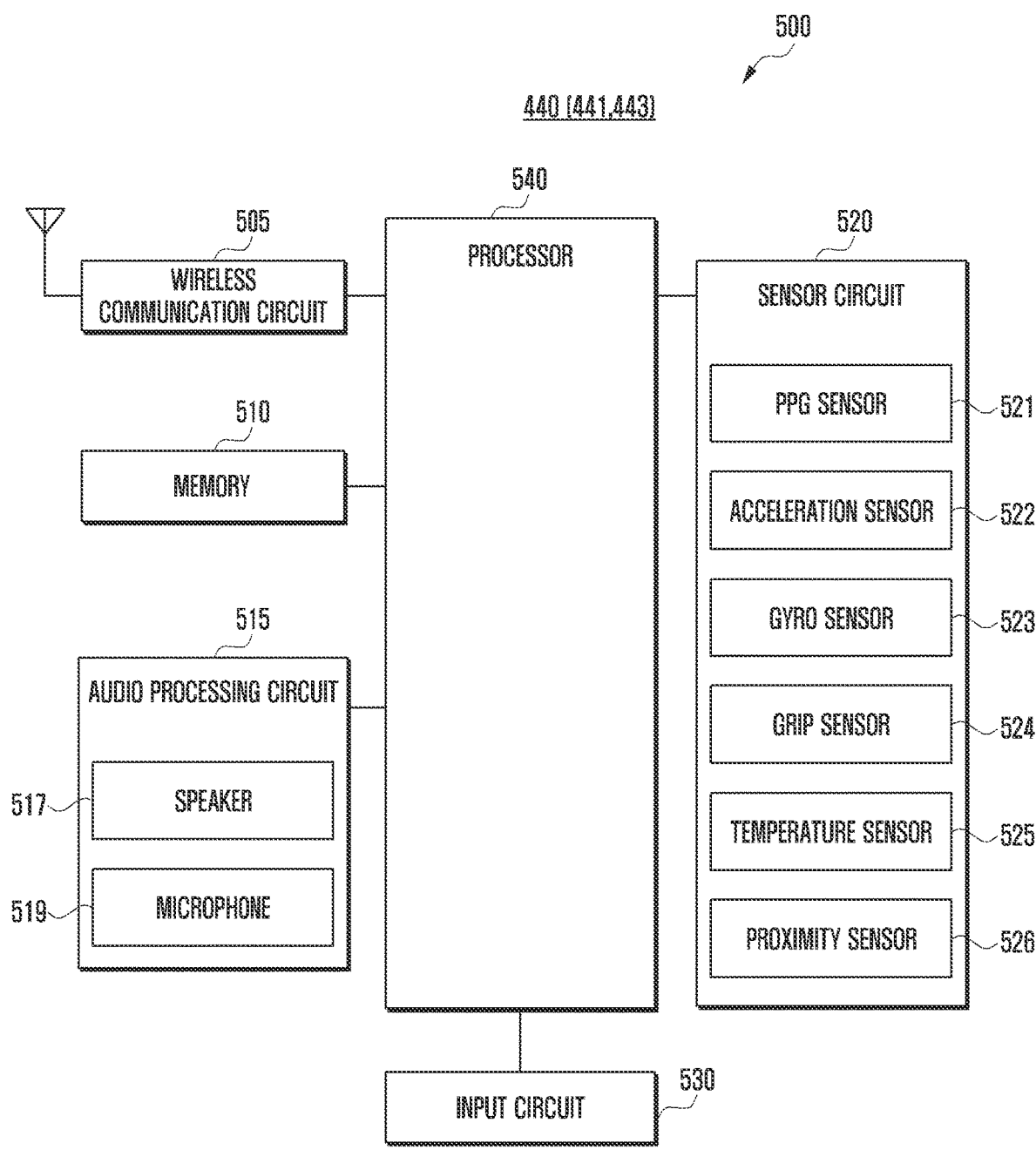
FIG. 5 is a block diagram illustrating a wireless audio device set according to an embodiment of the disclosure.

FIG. 5 is a block diagram illustrating a wireless audio device set according to an embodiment of the disclosure.

Referring to block diagram 500 FIG. 5, the wireless audio device set (e.g., the wireless audio device set 440 of FIG. 4) may include a first wireless audio device (e.g., the first wireless audio device 441 of FIG. 4) and a second wireless audio device (e.g., the second wireless audio device 443 of FIG. 4).

In an embodiment, each of the first wireless audio device 441 and the second wireless audio device 443 may include a wireless communication circuit 505, a memory 510, an audio processing circuit 515, a sensor circuit 520, an input circuit 530, and a processor 540.

According to various embodiments, the wireless communication circuit 505 may include a short-range wireless communication circuit (e.g., Bluetooth and Wi-Fi). The short-range wireless communication circuit may establish a communication link between the wireless audio device set 440 and an electronic device 401 and/or the cradle 450.

In an embodiment, the first wireless audio device 441 and the second wireless audio device 443 may establish a communication link with the electronic device 401 through short-range wireless communication. The first wireless audio device 441 and the second wireless audio device 443 may be connected to the electronic device 401 as one wireless audio device through the same MAC address. For example, one wireless audio device (e.g., the first wireless audio device 441 or the second wireless audio device 443) of the first wireless audio device 441 and the second wireless audio device 443 may be representatively connected to the device 401, and another wireless audio device (e.g., the second wireless audio device 443 or the first wireless audio device 441) may overhear a signal transmitted to the one wireless audio device (e.g., the first wireless audio device 441 or the second wireless audio device 443) connected to the electronic device 401 by sniffing. To prevent an ill-intentioned user, the electronic device 401 may identify that the overhearing wireless audio device (e.g., the second wireless audio device 443 or the first wireless audio device 441) is a device that is connected as a pair to the connected wireless audio device (e.g., the first wireless audio device 441 or the second wireless audio device 443).

In another embodiment, the first wireless audio device 441 and the second wireless audio device 443 may each have a MAC address. In this case, each of the first wireless audio device 441 and the second wireless audio device 443 may be independently connected to the electronic device 401.

In various embodiments, the wireless audio devices 441 and 443 are described as communicating with the electronic device 401 through sniffing, but the disclosure is not limited thereto. For example, the wireless audio devices 441 and 443 may communicate with the electronic device 401 using True Wireless Stereo (TWS), True Wireless Stereo Plus (TWS+), and/or Audio over Bluetooth Low Energy (AoBLE) methods. For example, the TWS communication method may include a method in which one wireless audio device (e.g., the first wireless audio device 441 or the second wireless audio device 443) of the first wireless audio device 441 and the second wireless audio device 443 may be representatively connected to the device 401, and another wireless audio device (e.g., the second wireless audio device 443 or the first wireless audio device 441) may establish a communication connection to the one wireless audio device (e.g., the first wireless audio device 441 or the second wireless audio device 443) connected to the electronic device 401. The TWS+ communication method may include a method in which one wireless audio device (e.g., the first wireless audio device 441 or the second wireless audio device 443) of the first wireless audio device 441 and the second wireless audio device 443 may establish a communication link with the electronic device 401 as a master device, and another wireless audio device (e.g., the second wireless audio device 443 or the first wireless audio device 441) may establish a communication connection to the electronic device 401 as a slave device. The AoBLE communication method may include a method in which the first wireless audio device 441 and the second wireless audio device 443 respectively establish different communication links with the electronic device 401.

In an embodiment, when the wireless audio device set 440 is paired with the electronic device 401, the wireless audio device set 440 may transmit an audio signal input from at least one microphone of the first wireless audio device 441 or at least one microphone of the second wireless audio device 443 to the electronic device 401 through the wireless communication circuit 505. The wireless audio device set 440 may transmit a control signal related to a function of the electronic device 401, detected by the first wireless audio device 441 or the second wireless audio device 443, to the electronic device 401 through the wireless communication circuit 505. For example, the control signal related to the function of the electronic device 401 may include a control signal related to connection and disconnection of a phone call and audio playback (e.g., pause, fast forward, and rewind).

According to various embodiments, the memory 510 may store information about the electronic device 401 to be paired. The memory 510 may store a sensor signal for identifying whether the wireless audio devices 441 and 443 are worn. The memory 510 may store a sensor signal for at least one user. The sensor signal for the at least one user stored in the memory 510 may be used to identify a user wearing the wireless audio devices 441 and 443 corresponding to a sensor signal obtained by the sensor circuit 520.

According to various embodiments, the audio processing circuit 515 may include a speaker 517 and a microphone 519 (e.g., a first microphone (e.g., an in-ear microphone) and a second microphone (e.g., an outer microphone)). The speaker 517 may output an audio signal corresponding to audio data received from the electronic device 401.

In an embodiment, one of the at least one microphone, for example, the first microphone (e.g., the in-ear microphone) is a microphone mounted in each of the first wireless audio device 441 or the second wireless audio device 443 and may detect a sound inside the body or a resonance sound in an ear.

In an embodiment, another microphone of the at least one microphone, for example, the second microphone (e.g., the outer microphone) may receive an ambient sound signal of the wireless audio device set 440.

According to various embodiments, the sensor circuit 520 may include a PPG sensor 521, an acceleration sensor 522, a gyro sensor 523, a grip sensor 524, a temperature sensor 525, and/or a proximity sensor 526.

In an embodiment, the PPG sensor 521 may include a heart rate monitor (HRM) sensor. The PPG sensor 521 may measure the heartbeat of a user of the electronic device 401. For example, the PPG sensor 521 may include an optical sensor and may identify a heartbeat pattern (waveform) by measuring a change in the amount of light reflected from a blood vessel through the skin. The processor 540 may measure and calculate the heart rate per minute using the interval of each pattern.

In an embodiment, the acceleration sensor 522 and the gyro sensor 523 may form a six-axis sensor. The six-axis sensor may detect variance in movement of the electronic device 401. The 6-axis sensor may include an inertial sensor. For example, the acceleration sensor 522 may measure force exerted in the directions of three axes including an x-axis, a y-axis, and a z-axis. The gyro sensor 523 may measure angular velocity by detecting pitch, roll, and yaw in three axes.

In an embodiment, the grip sensor 524 may include a touch sensor. For example, when the grip sensor 524 includes a touch sensor, the grip sensor 524 may detect that an ear and the sensor come in contact when the user wears the wireless audio device set 440 on the ear. The grip sensor 524 may detect contact with the skin in a capacitive manner with the touch sensor installed in a portion of the wireless audio device set 440 that comes in contact with the ear, thereby detecting whether the user is wearing the wireless audio device set 440.

In another embodiment, the grip sensor 524 may include an optical sensor. For example, when the grip sensor 524 includes an optical sensor, the grip sensor 524 may measure the amount of light on a surface on which an ear of the user and the sensor come in contact as the user wears the wireless audio device set 440, thereby detecting whether the user is wearing the wireless audio device set 440.

In an embodiment, when the temperature sensor 525 is configured as a contact type, the temperature sensor 525 may be positioned in a concha and may measure the ear temperature of the user due to the position in the concha. When the temperature sensor 525 is configured as a non-contact type, the temperature sensor 525 may be positioned in an ear canal and may measure the ear temperature of the user due to the position in the ear canal.

In an embodiment, the proximity sensor 526 may detect a sensor signal corresponding to a state in which the wireless audio device set 440 is worn on the ear of the user and a sensor signal corresponding to a state in which the wireless audio device set 440 is mounted on the cradle 450 or is placed on the floor.

According to various embodiments, the input circuit 530 may include a touch pad. It is possible to request audio signal processing from the electronic device 401 via a user input, such as a user touch or a button input, detected through the input circuit 530 of each of the wireless audio devices 441 and 443.

According to various embodiments, the processor 540 may transmit a sensor signal detected by the sensor circuit 520 to the electronic device 401.

In an embodiment, the processor 540 may determine whether the wireless audio device set 440 is worn on the ear of the user and whether the wireless audio device set 440 is detached from the ear of the user, based on the sensor signal (e.g., the value and/or the pattern of the sensor signal) detected by the sensor circuit 520 (e.g., a sensor signal measured by the PPG sensor 521, a sensor signal obtained using the acceleration sensor 522 and/or the gyro sensor 523, and/or an ear-reflected sound). The processor 540 may transmit, to the electronic device 401, information about whether the wireless audio device set 440 is being worn on the ear of the user and/or whether the wireless audio device set 440 has been detached from the ear of the user.

In an embodiment, the processor 540 may determine a user wearing the wireless audio device set 440, based on a sensor signal obtained through the sensor circuit 520. For example, the processor 540 may determine a user wearing the wireless audio device set 440 by comparing the sensor signal obtained through the sensor circuit 520 with the sensor signal for the at least one user stored in the memory 510. The processor 540 may transmit information about the determined user wearing the wireless audio device set 440 to the electronic device 401.

In an embodiment, the processor 540 may process an audio signal received through at least one microphone of the wireless audio device set 440. The processor 540 may transmit the processed audio signal to the electronic device 401.

In various embodiments, each of the first wireless audio device 441 and the second wireless audio device 443 may independently operate.

Figure 6:
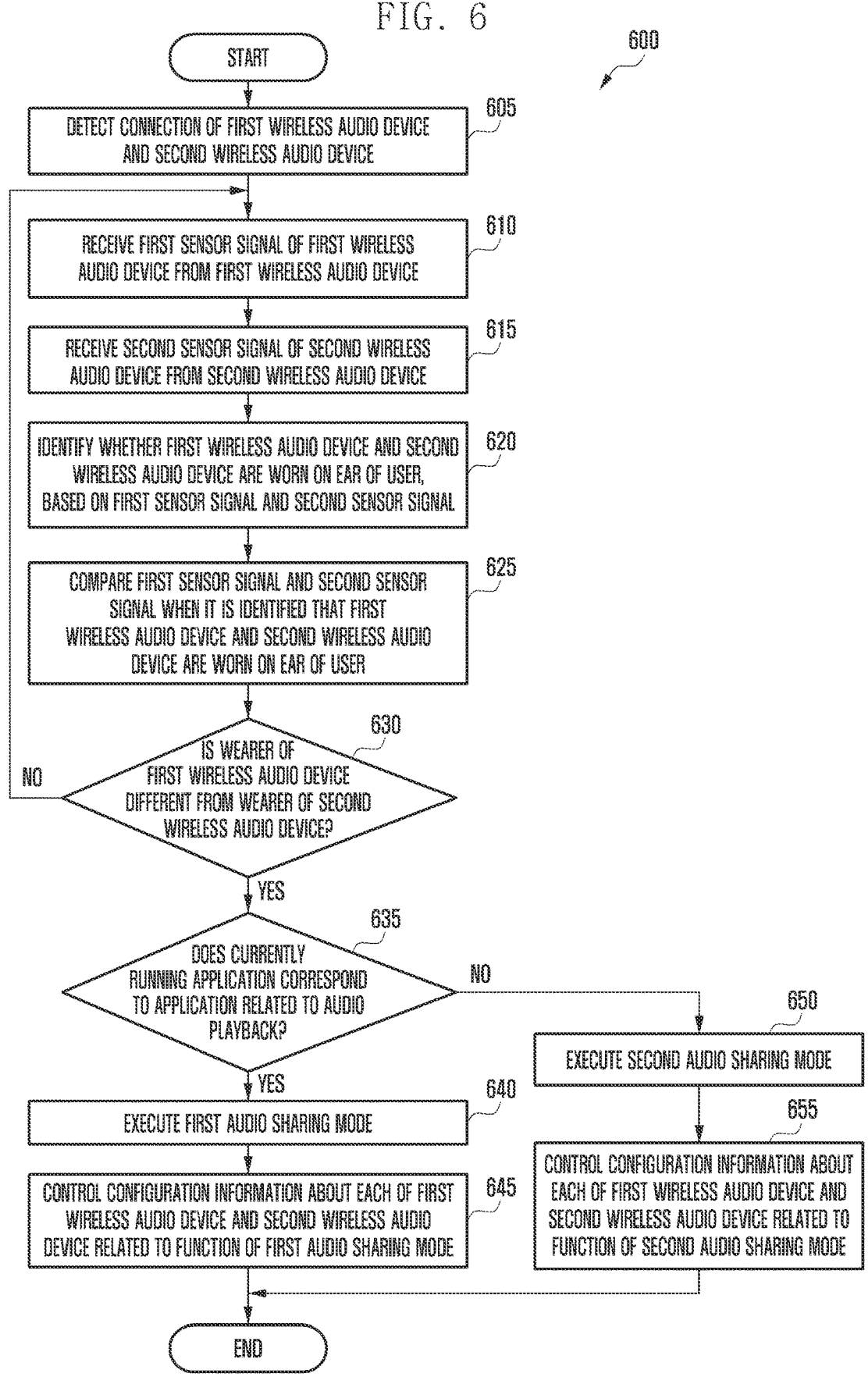
FIG. 6 is a flowchart illustrating an audio sharing method according to an embodiment of the disclosure.

FIG. 6 is a flowchart illustrating an audio sharing method according to an embodiment of the disclosure.

Referring to flowchart 600 of FIG. 6, in operation 605, a processor (e.g., the processor 430 of FIG. 4) of an electronic device (e.g., the electronic device 401 of FIG. 4) may detect a connection of a first wireless audio device (e.g., the first wireless audio device 441 of FIG. 4) and a second wireless audio device (e.g., the second wireless audio device 443 of FIG. 4). For example, the processor 430 may detect the connection (e.g., Bluetooth pairing) with the first wireless audio device 441 and the second wireless audio device 443 through a wireless communication circuit (e.g., the wireless communication circuit 405 of FIG. 4), for example, a short-range wireless communication circuit.

For example, the electronic device 401 may operate as a scanner, and the first wireless audio device 441 and the second wireless audio device 443 may operate as advertisers. The first wireless audio device 441 and the second wireless audio device 443 may transmit an advertising packet. The advertising packet may include a MAC address corresponding to a unique address value for identifying the corresponding wireless audio device 441 or 443. Upon receiving the advertising packet from each of the wireless audio devices 441 and 443, the electronic device 401 may transmit a scan request packet to each of the wireless audio devices 441 and 443. In response to the scan request packet, each of the wireless audio devices 441 and 443 may include identification information (e.g., name) of each wireless audio device in a packet. In a pairing operation, security management modules (not shown) respectively included in the electronic device 401 and the wireless audio devices 441 and 443 may exchange information for generating a temporary encryption key and may generate a temporary encryption key in the electronic device 401 and the wireless audio devices 441 and 443. The generated temporary encryption key may be used to encrypt the connection. After pairing is completed, the electronic device 401 may operate as a master device, and the wireless audio devices 441 and 443 may operate as slave devices. After pairing of the electronic device 401 with the wireless audio devices 441 and 443 is completed, the security management modules (not shown) may share a security key through key distribution on the connection encrypted with the temporary encryption key. The shared security key can be reused in the next connection.

In an embodiment, in operation 610, the processor 430 may receive a first sensor signal of the first wireless audio device 441 from the first wireless audio device 441. For example, the first wireless audio device 441 may obtain the sensor signal of the first wireless audio device 441 detected by a sensor circuit (e.g., the sensor circuit 520 of FIG. 5). For example, the sensor signal of the first wireless audio device 441 may include a sensor signal relating to a movement of the first wireless audio device 441, a sensor signal relating to wearing of the first wireless audio device 441 on an ear of a user and/or detachment thereof from the ear of the user, and/or a sensor signal relating to mounting of the first wireless audio device 441 on a cradle (e.g., the cradle 450 of FIG. 4) and/or detachment thereof from the cradle.

In an embodiment, in operation 615, the processor 430 may receive a second sensor signal of the second wireless audio device 443 from the second wireless audio device 443. For example, the second wireless audio device 443 may obtain the sensor signal of the second wireless audio device 443 detected by the sensor circuit (e.g., the sensor circuit 520 of FIG. 5). For example, the sensor signal of the second wireless audio device 443 may include a sensor signal relating to a movement of the second wireless audio device 443, a sensor signal relating to wearing of the second wireless audio device 443 on an ear of a user and/or detachment thereof from the ear of the user, and/or a sensor signal relating to mounting of the second wireless audio device 443 on the cradle 450 and/or detachment thereof from the cradle.

Although not shown, in various embodiments, the processor 430 may further receive information about a user wearing the first wireless audio device 441 and the second wireless audio device 443 from each of the wireless audio devices 441 and 443 through the wireless communication circuit 405.

In an embodiment, in operation 620, the processor 430 may identify whether the first wireless audio device 441 and the second wireless audio device 443 are worn on an ear of a user, based on the first sensor signal and the second sensor signal. For example, the processor 430 may receive a sensor signal detected by an acceleration sensor 522, a gyro sensor 523, a grip sensor 524, a temperature sensor 525, or a grip sensor 526 of the first wireless audio device 441 and the second wireless audio device 443, and may identify whether the first wireless audio device 441 and the second wireless audio device 443 are worn on an ear of a user, based on the sensor signal. Operation 620 of determining whether the first wireless audio device 441 and the second wireless audio device 443 are worn on the ear of the user will be described in detail with reference to FIG. 7 to FIG. 9 to be described later.

In an embodiment, when it is identified that the first wireless audio device 441 and the second wireless audio device 443 are worn on the ear of the user, the processor 430 may compare the first sensor signal and the second sensor signal in operation 625. For example, operation 625 may be an operation of identifying whether the first wireless audio device 441 and the second wireless audio device 443 are worn on the ears of the same user (e.g., the first wireless audio device 441 is worn on the left ear of a first user and the second wireless audio device 443 is worn on the right ear of the first user) or on ears of different users (e.g., the first wireless audio device 441 is worn on the left ear of the first user and the second wireless audio device 443 is worn on the right ear of a second user).

The disclosure is not limited to the foregoing description, and the processor 430 may obtain a sensor signal through the sensor circuit 415. The processor 430 may identify information about a user of the electronic device 401 by comparing the sensor signal obtained by the sensor circuit 415 and sensor information about at least one user stored in a memory 410. The processor 430 may compare the information about the user wearing each of the first wireless audio device 441 and the second wireless audio device 443 received from each of the wireless audio devices 441 and 443 with the information about the user of the electronic device 401. For example, the processor may identify whether the user of the electronic device 401 is the same as the user wearing the first wireless audio device 441 or whether the user of the electronic device 401 is the same as the user wearing the second wireless audio device 443, thereby identifying whether the first wireless audio device 441 and the second wireless audio device 443 are worn on the ears of the same user.

In an embodiment, in operation 630, the processor 430 may determine whether the user wearing the first wireless audio device 441 is different from the user wearing the second wireless audio device 443. Operation 630 of determining whether the user wearing the first wireless audio device 441 is different from the user wearing the second wireless audio device 443 will be described in detail with reference to FIG. 10 and FIG. 11 to be described later.

In an embodiment, when the user wearing the first wireless audio device 441 and the user wearing the second wireless audio device 443 are different, the processor 430 may determine whether a currently running application is an application related to audio playback in operation 635. When the currently running application is an application related to audio playback, the processor 430 may execute a first audio sharing mode in operation 640. For example, the first audio sharing mode may include a media sharing mode.

In an embodiment, the processor 430 may execute the first audio sharing mode and may transmit a notification indicating the execution of the first audio sharing mode to the first wireless audio device 441 and the second wireless audio device 443. For example, the notification indicating the execution of the first audio sharing mode may include audio feedback (e.g., a voice and/or a notification sound).

In an embodiment, the processor 430 may display a notification message indicating the execution of the first audio sharing mode in a pop-up window on a display (e.g., the display 421 of FIG. 4) or may display a user interface for controlling configuration information about each of the wireless audio devices 441 and 443. However, the disclosure is not limited to the foregoing description, and the processor 430 may output audio feedback indicating the execution of the first audio sharing mode through a speaker (e.g., the audio processing circuit 415 of FIG. 4).

In an embodiment, in operation 645, the processor 430 may control configuration information about each of the first wireless audio device 441 and the second wireless audio device 443 related to a function of the first audio sharing mode.

In an embodiment, after executing the first audio sharing mode, the processor 430 may control the configuration information about each of the wireless audio devices 411 and 413 to be suitable for the first audio sharing mode. For example, the configuration information may include ANC configuration information, volume control information (volume up/down), and/or event notification reception information. When an ambient noise value received from each of the wireless audio devices 441 and 443 exceeds a specified value (e.g., 70 dB), the processor 430 may adjust an ANC level. For example, the processor 430 may activate (on) an ANC function and may deactivate (off) an AMP function. In another example, the processor 430 may independently control (e.g., adjust) the volume of each of the wireless audio devices 441 and 443, based on the ambient noise value received from each of the wireless audio devices 441 and 443. In still another example, when an event is received, the processor 430 may configure whether to transmit a notification of the event to each of the wireless audio devices 441 and 443.

In an embodiment, upon executing the first audio sharing mode, the processor 430 may transmit audio data currently being played to the first wireless audio device 441 and the second wireless audio device 443 through the application related to audio playback. For example, the processor 430 may transmit the audio data currently being played to the first wireless audio device 441, based on the configuration information (e.g., ANC information and volume information) about the first wireless audio device 441. The processor 430 may transmit the audio data currently being played to the second wireless audio device 443, based on the configuration information (e.g., ANC information and volume information) about the second wireless audio device 443.

In an embodiment, when it is identified that the currently running application is not an application related to audio playback, the processor 430 may execute a second audio sharing mode in operation 650. For example, the second audio sharing mode may include a conversation sharing mode. In the conversation sharing mode used, for example, for a noisy place (e.g., the outside), ambient noise makes it difficult to communicate between users. The processor 430 may execute the conversation sharing mode, thereby supporting the users to have a conversation without problems.

In an embodiment, the processor 430 may execute the second audio sharing mode and may transmit a notification indicating the execution of the second audio sharing mode to the first wireless audio device 441 and the second wireless audio device 443. For example, the notification indicating the execution of the second audio sharing mode may include audio feedback (e.g., a voice and/or a notification sound).

In an embodiment, the processor 430 may display a notification message indicating the execution of the second audio sharing mode in a pop-up window on the display 421 or may display a user interface for controlling configuration information about each of the wireless audio devices 441 and 443. However, the disclosure is not limited to the foregoing description, and the processor 430 may output audio feedback indicating the execution of the second audio sharing mode through the speaker.

In an embodiment, upon receiving the notification indicating the execution of the second audio sharing mode, the first wireless audio device 441 and the second wireless audio device 443 may transmit a response signal for accepting the second audio sharing mode to the electronic device 401. For example, the response signal for accepting the second audio sharing mode may include an input to detect a designated gesture (e.g., a nodding gesture or a gesture of touching a cheek) and an input detected by an input circuit (e.g., the input circuit 530 of FIG. 5) of each wireless audio device 441 and 443.

In an embodiment, when receiving the response signal for accepting the second audio sharing mode from each of the wireless audio devices 441 and 443, the processor 430 may transmit feedback (e.g., a voice or a notification sound) indicating that the second audio sharing mode is entered to each of the wireless audio devices 441 and 443. The processor 430 may display a notification message on the display 421 upon entering the second audio sharing mode. The disclosure is not limited to the foregoing description, and a configuration screen for the second audio sharing mode may be displayed. For example, as the second audio sharing mode is entered, a voice communication link of the first wireless audio device 441 and the second wireless audio device 443 may be activated, and the configuration information about each of the wireless audio device 441 and 443 may be changed. A method for activating the voice communication link may include a method of each wireless audio device 441 or 443 connecting to the electronic device 401 through a separate Bluetooth link (e.g., a synchronous connection oriented (SCO) link), a method of transmitting data through a server/cloud, or a method of direct connection between the wireless audio devices 441 and 443, without being limited thereto.

In an embodiment, in operation 655, the processor 430 may control configuration information about each of the first wireless audio device 441 and the second wireless audio device 443 related to a function of the second audio sharing mode.

In an embodiment, after executing the second audio sharing mode, the processor 430 may control the configuration information about each of the wireless audio devices 411 and 413 to be suitable for the second audio sharing mode. For example, the configuration information may include ANC configuration information, volume control information (volume up/down), and/or event notification reception information. When an ambient noise value received from each of the wireless audio devices 441 and 443 exceeds a specified value (e.g., 70 dB), the processor 430 may adjust an ANC level. For example, the processor 430 may activate (on) an ANC function and may deactivate (off) an AMP function. In another example, the processor 430 may independently control (e.g., adjust) the volume of each of the wireless audio devices 441 and 443, based on the ambient noise value received from each of the wireless audio devices 441 and 443. In still another example, when an event is received, the processor 430 may configure whether to transmit a notification of the event to each of the wireless audio devices 441 and 443.

In various embodiments, the processor 430 may receive the first sensor signal and the second sensor signal respectively from the first wireless audio device 441 and the second wireless audio device 443 at specified time intervals. The processor 430 may periodically perform an operation of identifying whether the first wireless audio device 441 and the second wireless audio device 443 are worn and whether the users wearing the same are different and/or the same, based on the first sensor signal and the second sensor signal.

In various embodiments, although not shown, the processor 430 may terminate the audio sharing mode when detecting that the first wireless audio device 441 and the second wireless audio device 443 are detached from the ears of the first user and the second user, when the first wireless audio device 441 and the second wireless audio device 443 are changed to a state of being worn on the ears of the same user (e.g., the first user), when detecting that the first wireless audio device 441 and the second wireless audio device 443 are mounted on the cradle (e.g., the cradle 450 of FIG. 4), or when an input to deactivate a connection for audio sharing is detected.

Figure 7:
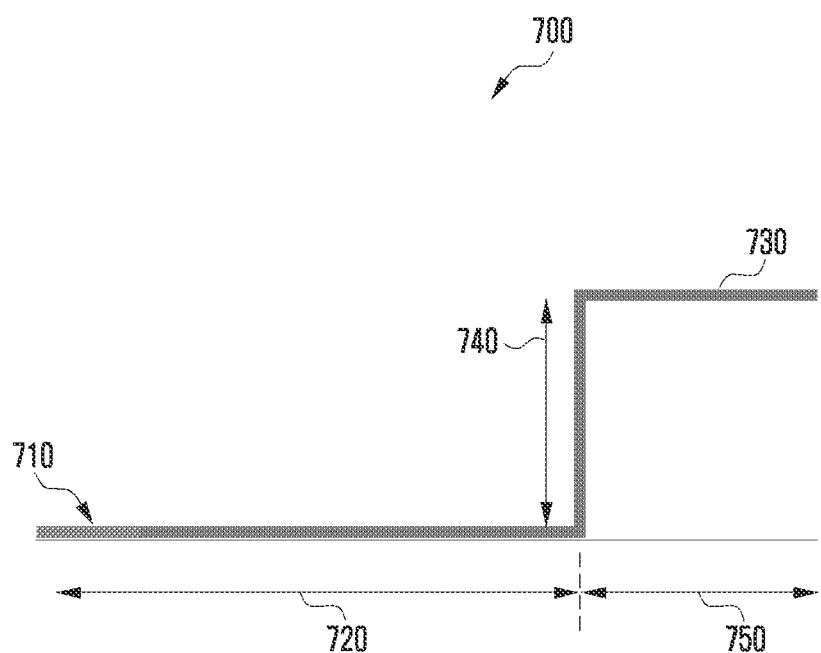
FIG. 7 is a graph illustrating a method of determining whether a first wireless audio device and a second wireless audio device are worn on an ear of a user, based on a first sensor signal and a second sensor signal, according to an embodiment of the disclosure.

FIG. 7 is a graph illustrating a method of determining whether a first wireless audio device and a second wireless audio device are worn on an ear of a user, based on a first sensor signal and a second sensor signal, according to an embodiment of the disclosure.

In various embodiments, in a state of wearing a wireless audio device set (e.g., the wireless audio device set 440 of FIG. 4), for example, a first wireless audio device (e.g., the first wireless audio device 441 of FIG. 4) and a second wireless audio device (e.g., the second wireless audio device 443 of FIG. 4), a user of an electronic device (e.g., the electronic device 401 of FIG. 4) may detach one wireless audio device, for example, the second wireless audio device 443, in order to share an audio with a different user. The detached second wireless audio device 443 may be worn on an ear of the different user.

Referring to graph 700 of FIG. 7, the second wireless audio device 443 may obtain a sensor signal of the second wireless audio device 443 through a sensor circuit (e.g., the sensor circuit 520 of FIG. 5). For example, raw data in a state 720 before the second wireless audio device 443 is worn on the ear of the user (or a state in which the second wireless audio device 443 is detached from the ear of the user) may have a first capacitance value 710 at a base level. For example, the raw data in the state 720 before the second wireless audio device 443 is worn on the ear of the user may be previously stored in a memory (e.g., the memory 510 of FIG. 5) of the second wireless audio device 443.

In an embodiment, when the second wireless audio device 443 is worn on the ear of the user in a state 750 after the state 720 in which the second wireless audio device 443 is not worn on the ear of the user, the second wireless audio device 443 may detect a second capacitance value 730 that is greater than the first capacitance value 710.

In an embodiment, the second wireless audio device 443 may determine whether the second wireless audio device 443 is worn on the ear of the user, based on a difference 740 between the first capacitance value 710 and the second capacitance value 730. For example, when the second wireless audio device 443 detects that the difference 740 between the first capacitance value 710 and the second capacitance value 730 exceeds a specified value, the second wireless audio device 443 may be determined as being worn on the ear of the user.

In an embodiment, the second wireless audio device 443 may transmit a signal corresponding to a state in which the second wireless audio device 443 is worn on the ear of the user to the electronic device 401.

In an embodiment, the electronic device 401 may execute an audio sharing mode, based on a signal corresponding to a state of being worn on the ear of the user or a state of being detached from the ear of the user received from each of the first wireless audio device 441 and the second wireless audio device 443. For example, when it is identified, based on the received signal corresponding to a state of being worn on the ear of the user or a state of being detached from the ear of the user, that the first wireless audio device 441 is maintained to be worn on the ear of the user and the second wireless audio device 443 worn on the ear of the user is detached therefrom and is worn thereon within a specified time (e.g., a continuous event that the second wireless audio device 443 is worn, detached, and worn for a certain period of time occurs), the electronic device 401 may execute the audio sharing mode (e.g., a media sharing mode or a conversation sharing mode), based on a currently running application.

Although FIG. 7 shows that the raw data in the state 720 before the second wireless audio device 443 is worn on the ear of the user has the first capacitance value 710 according to various embodiments, the disclosure is not limited thereto. Raw data in a state after the second wireless audio device 443 is detached from the ear of the user may also have the first capacitance value 710. For example, when it is detected that the second wireless audio device 443 mounted on the ear of the user is detached from the ear of the user, the second capacitance value 730 may be changed to the first capacitance value 710.

Figure 8:
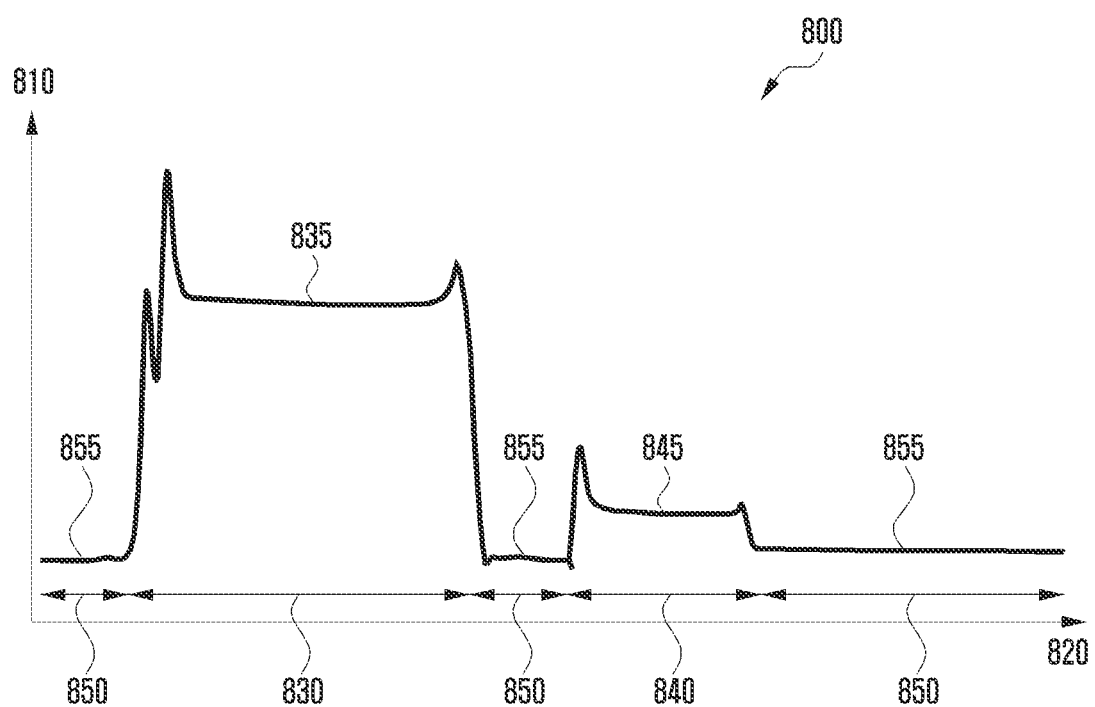
FIG. 8 is another graph illustrating a method of determining whether a first wireless audio device and a second wireless audio device are worn on an ear of a user, based on a first sensor signal and a second sensor signal, according to an embodiment of the disclosure.

FIG. 8 is another graph illustrating a method of determining whether a first wireless audio device and a second wireless audio device are worn on an ear of a user, based on a first sensor signal and a second sensor signal, according to an embodiment of the disclosure.

In various embodiments, in a state of wearing a wireless audio device set (e.g., the wireless audio device set 440 of FIG. 4), for example, a first wireless audio device (e.g., the first wireless audio device 441 of FIG. 4) and a second wireless audio device (e.g., the second wireless audio device 443 of FIG. 4), a user of an electronic device (e.g., the electronic device 401 of FIG. 4) may detach one wireless audio device, for example, the second wireless audio device 443, in order to share an audio with a different user. The detached wireless audio device may be worn on an ear of the different user.

Referring to graph 800 of FIG. 8, an x-axis may denote time 820 and a y-axis may denote a sensor signal value 810 detected by a proximity sensor (e.g., the proximity sensor 526 of FIG. 5). In an embodiment, a first sensor signal value 835 detected by the proximity sensor 526 in a state 830 in which the first wireless audio device 441 (or the second wireless audio device 443) is worn on the ear of the user may be greater than a second sensor signal value 845 detected by the proximity sensor 526 in a state 840 in which the first wireless audio device 441 (or the second wireless audio device 443) is inserted in a cradle (e.g., the cradle 450 of FIG. 4) (or is placed on the floor) or a third sensor signal value 855 detected by the proximity sensor 526 in a state 850 in which the first wireless audio device 441 (or the second wireless audio device 443) is detached from the ear of the user.

In an embodiment, the first wireless audio device 441 (or the second wireless audio device 443) may transmit the sensor signal value detected by the proximity sensor 526 to the electronic device 401 at specified time intervals.

In various embodiments, when the sensor signal value of the first wireless audio device 441 (or the second wireless audio device 443) is changed from the third sensor signal value 855 to the first sensor signal value 835, the electronic device 401 may determine that the first wireless audio device 441 (or the second wireless audio device 443) is mounted on the ear of the user.

In various embodiments, when the sensor signal value of the first wireless audio device 441 (or the second wireless audio device 443) is changed from the first sensor signal value 835 to the third sensor signal value 855, the electronic device 401 may determine that the first wireless audio device 441 (or the second wireless audio device 443) is detached from the ear of the user.

In various embodiments, when the sensor signal value of the first wireless audio device 441 (or the second wireless audio device 443) is changed from the third sensor signal value 855 to the second sensor signal value 845, the electronic device 401 may determine that the first wireless audio device 441 (or the second wireless audio device 443) is mounted on the cradle 450.

In various embodiments, when the sensor signal value of the first wireless audio device 441 (or the second wireless audio device 443) is changed from the second sensor signal value 845 to the third sensor signal value 855, the electronic device 401 may determine that the first wireless audio device 441 (or the second wireless audio device 443) is detached from the cradle 450.

Figure 9:
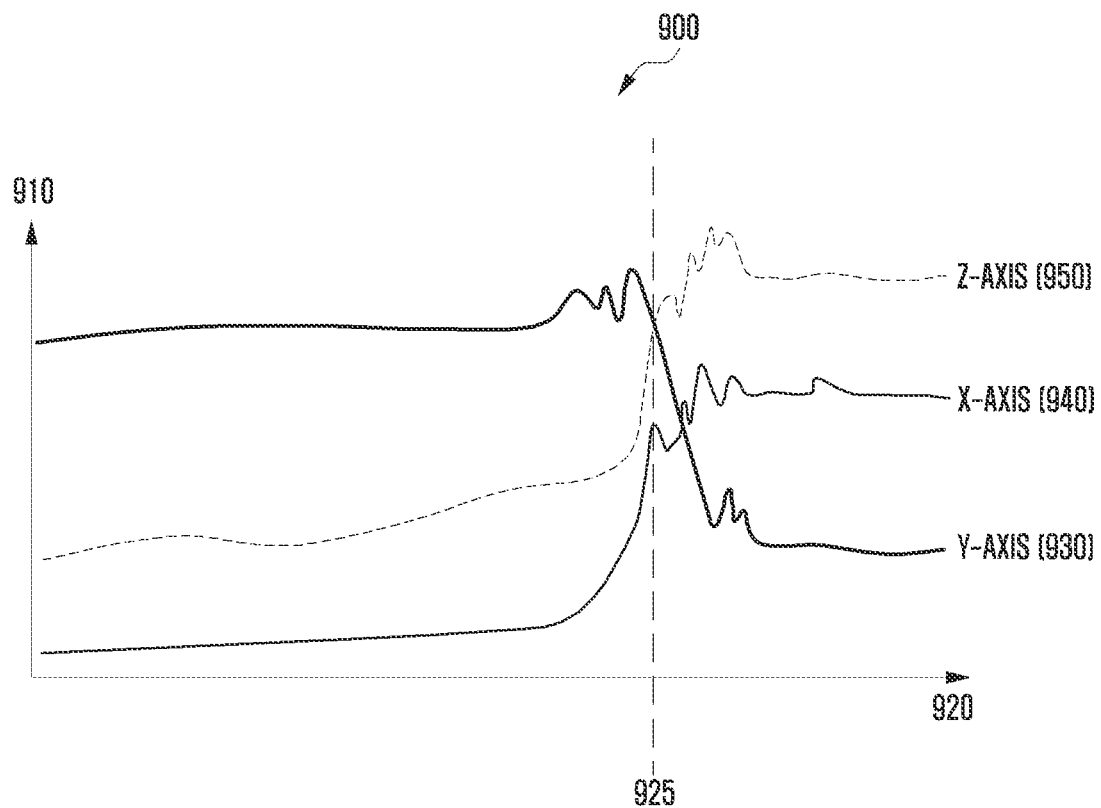
FIG. 9 is another graph illustrating a method of determining whether a first wireless audio device and a second wireless audio device are worn on an ear of a user, based on a first sensor signal and a second sensor signal, according to an embodiment of the disclosure.

FIG. 9 is another graph illustrating a method of determining whether a first wireless audio device and a second wireless audio device are worn on an ear of a user, based on a first sensor signal and a second sensor signal, according to an embodiment of the disclosure.

According to various embodiments, a wireless audio device, for example, a first wireless audio device (e.g., the first wireless audio device 441 of FIG. 4) or a second wireless audio device (e.g., the wireless audio device 443 of FIG. 4), may determine whether the first wireless audio device 441 or the second wireless audio device 443 is worn on an ear of a user or is detached from the ear of the user using an acceleration sensor (e.g., the acceleration sensor 522 of FIG. 5) and/or a gyro sensor (e.g., the gyro sensor 523 of FIG. 5).

Referring to graph 900 of FIG. 9, an x-axis may denote time 920 and a y-axis may denote a sensor signal value 910 detected by the acceleration sensor 522. In an embodiment, when the first wireless audio device 441 (or the second wireless audio device 443) in the state 830 of being worn on the ear of the user is detached (e.g., by a motion of pulling out the wireless audio device 441 or 443) at a time point 925, the sensor signal value (e.g., a y-axis sensor value 930, an x-axis sensor value 940, and a z-axis sensor value 950) detected by the acceleration sensor 522 may be changed. For example, sensor signals of the first wireless audio device 441 and the second wireless audio device 443 may obtain a constant sensor value in a state of being worn on the ear of the user. When one wireless audio device of the first wireless audio device 441 and the second wireless audio device 443 is detached from the ear of the user, a signal of the detached wireless audio device may dramatically change compared to a signal of the worn wireless audio device.

Figure 10:
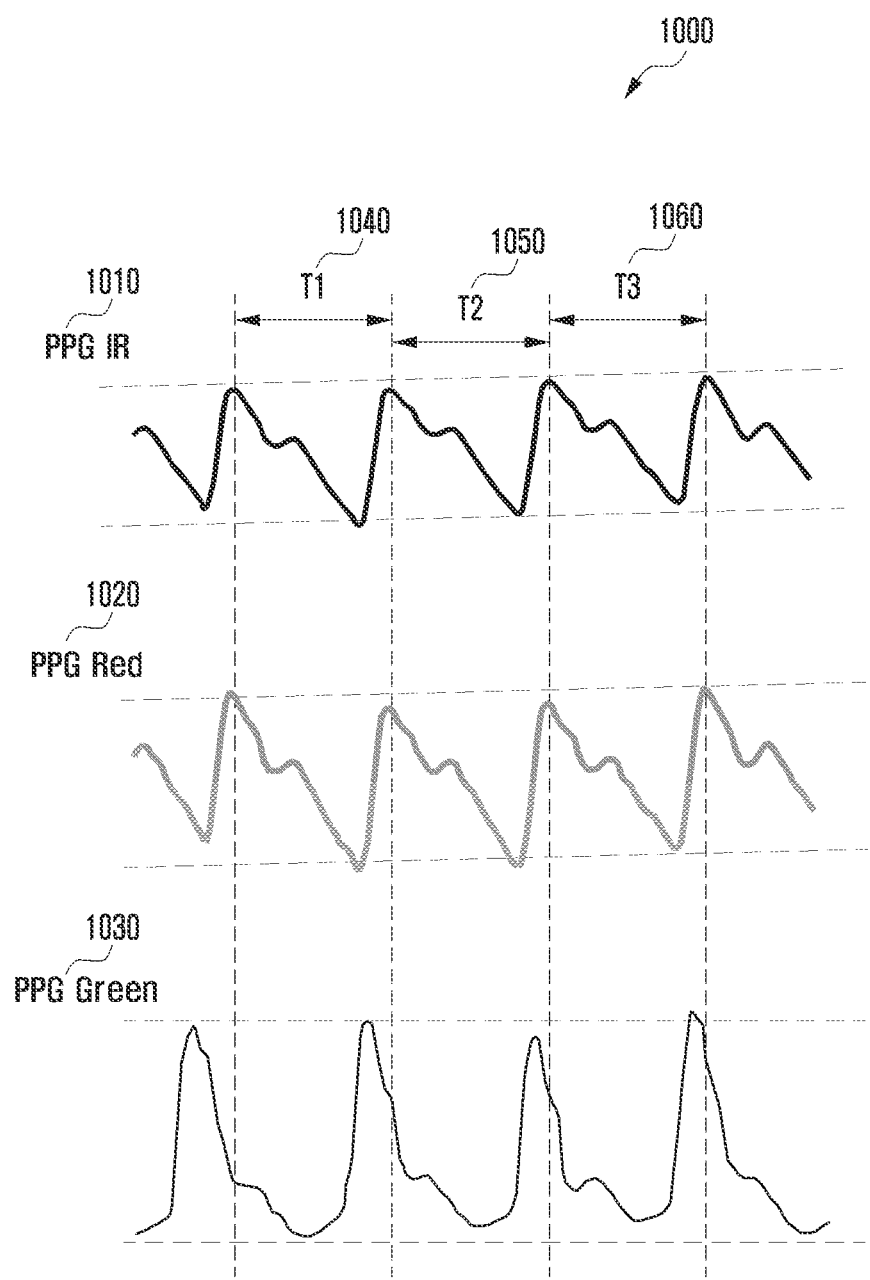

FIGS. 10 and 11 are graphs illustrating a method of identifying whether a first wireless audio device and a second wireless audio device are worn on ears of different users, based on a first sensor signal and a second sensor signal, according to various embodiments of the disclosure.

In various embodiments, a wireless audio device, for example, a first wireless audio device (e.g., the first wireless audio device 441 of FIG. 4) or a second wireless audio device (e.g., the wireless audio device 443 of FIG. 4), may determine whether the first wireless audio device 441 or the second wireless audio device 443 is mounted on different wearers using a PPG sensor (e.g., the PPG sensor 521 of FIG. 5).

Referring to graph 1000 of FIG. 10, an electronic device (e.g., the electronic device 401 of FIG. 4) may request the first wireless audio device 441 and the second wireless audio device 443 to measure a sensor signal using the PPG sensor 521 (e.g., an HRM sensor). The PPG sensor 521 of the first wireless audio device 441 and the second wireless audio device 443 may obtain a change in the amount of light reflected in a blood vessel according to a change in blood flow in the form of a waveform using an optical sensor. The period of one waveform (e.g., T1 1040, T2 1050, and T3 1060 of each of PPG IR 1010, PPG red 1020, and PPG green 1030) may be recognized as one cardiac cycle of diastole and systole, and the first wireless audio device 441 and the second wireless audio device 443 may measure heart rate per minute using this period.

Referring to graph 1100 of FIG. 11, when a first user wears the first wireless audio device 441 and a second user wears the second wireless audio device 443, a correlation (or similarity) between the waveform of each of the first wireless audio device 441 and the second wireless audio device 443 and the waveform of the electronic device 401 may be compared.

In an embodiment, by comparing heart waveform patterns of the first wireless audio device 441, the second wireless audio device 443, and the electronic device 401 that occur at the same time for a predetermined time (e.g., 10 seconds), the electronic device 401 may determine whether a user wearing the first wireless audio device 441 and a user wearing the second wireless audio device 443 are the same or different.

For example, as indicated by reference numeral 1110, an x-axis may denote time 1125 and a y-axis may denote a normalized PPG signal value 1120. The electronic device 401 may compare a correlation between a PPG signal 1130 of the first wireless audio device 441 and a PPG signal 1135 of the electronic device 401. For example, assuming that the correlation is "0.834," the electronic device 401 may determine that a user of the electronic device 401 and the user wearing the first wireless audio device 441 are the same.

In another example, as indicated by reference numeral 1150, the x-axis may again denote time 1125 and the y-axis may denote a normalized PPG signal value 1120. The electronic device 401 may compare a correlation between a PPG signal 1155 of the second wireless audio device 443 and a PPG signal 1160 of the electronic device 401. For example, assuming that the correlation is "0.705," the electronic device 401 may determine that the user of the electronic device 401 and the user wearing the second wireless audio device 443 are different.

That is, it may be identified that the user wearing the first wireless audio device 441 is different from the user wearing the second wireless audio device 443.

Although not shown, a method of determining whether the first wireless audio device 441 and the second wireless audio device 443 are mounted, based on a first sensor signal and a second sensor signal according to various embodiments may include a method of detecting a change in acceleration signal using an acceleration sensor 522. For example, when the same user wears the first wireless audio device 441 and the second wireless audio device 443, an acceleration signal of the first wireless audio device 441 and an acceleration signal of the second wireless audio device 443 may be symmetrical. When different users wear the first wireless audio device 441 and the second wireless audio device 443, respectively, different forms of patterns may be detected instead of a movement in a constant pattern. For example, when a movement occurs while the users are wearing the first wireless audio device 441 and the second wireless audio device 443, a difference may occur in pattern between the first wireless audio device 441 and the second wireless audio device 443. The electronic device 401 may analyze a signal correlation between the first wireless audio device 441 and the second wireless audio device 443, thereby determining whether the user wearing the first wireless audio device 441 and the user wearing the second wireless audio device 443 are the same or different.

In an embodiment, when different users wear the first wireless audio device 441 and the second wireless audio device 443, respectively, and face each other, geomagnetic sensors may indicate opposite directions. The electronic device 401 may identify the angle based on different directions indicated by the geomagnetic sensor, and may determine whether the user wearing the first wireless audio device 441 and the user wearing the second wireless audio device 443 are the same or different, based on the angle.

In another embodiment, the electronic device 401 may determine whether the user wearing the first wireless audio device 441 and the user wearing the second wireless audio device 443 are the same or different, based on a change in signal detected by a temperature sensor (e.g., the temperature sensor 525 of FIG. 5) of each wireless audio device 441 or 443. For example, when the same user wears the first wireless audio device 441 and the second wireless audio device 443, a temperature value of the first wireless audio device 441 and a temperature value of the second wireless audio device 443 may be the same. When the user wearing the first wireless audio device 441 and the users wearing the second wireless audio device 443 are different, a temperature value of the first wireless audio device 441 and a temperature value of the second wireless audio device 443 may be different.

In still another embodiment, sounds (e.g., ear-reflected sounds) produced by reflection, from an eardrum, of a specific sound transmitted by respective speakers (e.g., the speaker 517 of FIG. 5) of the first wireless audio device 441 and the second wireless audio device 443 may be measured by an inner microphone (e.g., the microphone 519 of FIG. 5), and the sounds may have unique patterns depending on each individual person. The first wireless audio device 441 and the second wireless audio device 443 may transmit measured patterns to the electronic device 401. The electronic device 401 may store the received patterns in a memory (e.g., the memory 410 of FIG. 4). The electronic device 401 may determine whether the user wearing the first wireless audio device 441 and the user wearing the second wireless audio device 443 are the same or different, based on the patterns stored in the memory 410 and patterns measured by the inner microphone 519 of each of the first wireless audio device 441 and the second wireless audio device 443 and received at specified time intervals.

According to various embodiments, it may be determined whether the first wireless audio device 441 and the second wireless audio device 443 are worn on the ears of the same user or on ears of different users by combining the foregoing sensor signals. For example, whether the first wireless audio device 441 and the second wireless audio device 443 are worn may be determined based on the sensor signals measured by the PPG sensor 521, and whether the user wearing the first wireless audio device 441 and the user wearing the second wireless audio device 443 are the same or different may be determined by comparing the change in sensor signal and/or the sensor signal correlation using the acceleration sensor 522 and/or the gyro sensor 523. Whether the first wireless audio device 441 and the second wireless audio device 443 are worn and whether the user wearing the first wireless audio device 441 and the user wearing the second wireless audio device 443 are the same and/or different may be accurately determined by combining the foregoing sensor signals.

Although FIG. 10 and FIG. 11 according to various embodiments show that the first wireless audio device 441 or the second wireless audio device 443 may determine whether the first wireless audio device 441 or the second wireless audio device 443 is worn on a different user, based on the sensor signals (e.g., the sensor signals measured by the PPG sensor 521 and the sensor signals and/or the ear-reflected sounds obtained by the acceleration sensor 522 and/or the gyro sensor 523), the disclosure is not limited thereto.

In another embodiment, the electronic device 401 may receive information about the user wearing each of the first wireless audio device 441 and the second wireless audio device 443 from each wireless audio device. For example, a memory (e.g., the memory 510 of FIG. 5) of the first wireless audio device 441 and the second wireless audio device 443 may store sensor information about at least one user. Each of the first wireless audio device 441 and the second wireless audio device 443 may determine a user wearing each of the wireless audio devices 441 and 443, based on sensor information obtained by a sensor circuit (e.g., the sensor circuit 520 of FIG. 5) and the sensor information about the at least one user stored in the memory 510. The first wireless audio device 441 and the second wireless audio device 443 may transmit information about the determined user to the electronic device 401. The electronic device 401 may identify user information about the electronic device 401, based on a sensor signal obtained by a sensor circuit (e.g., the sensor circuit 415 of FIG. 4). The electronic device 401 may determine whether the user of the electronic device 401 is the same as or different from the user wearing the first wireless audio device 441 and/or the user wearing the second wireless audio device 443, based on the identified user information about the electronic device 401 and the information about the user received from each wireless audio device.

Figure 12:
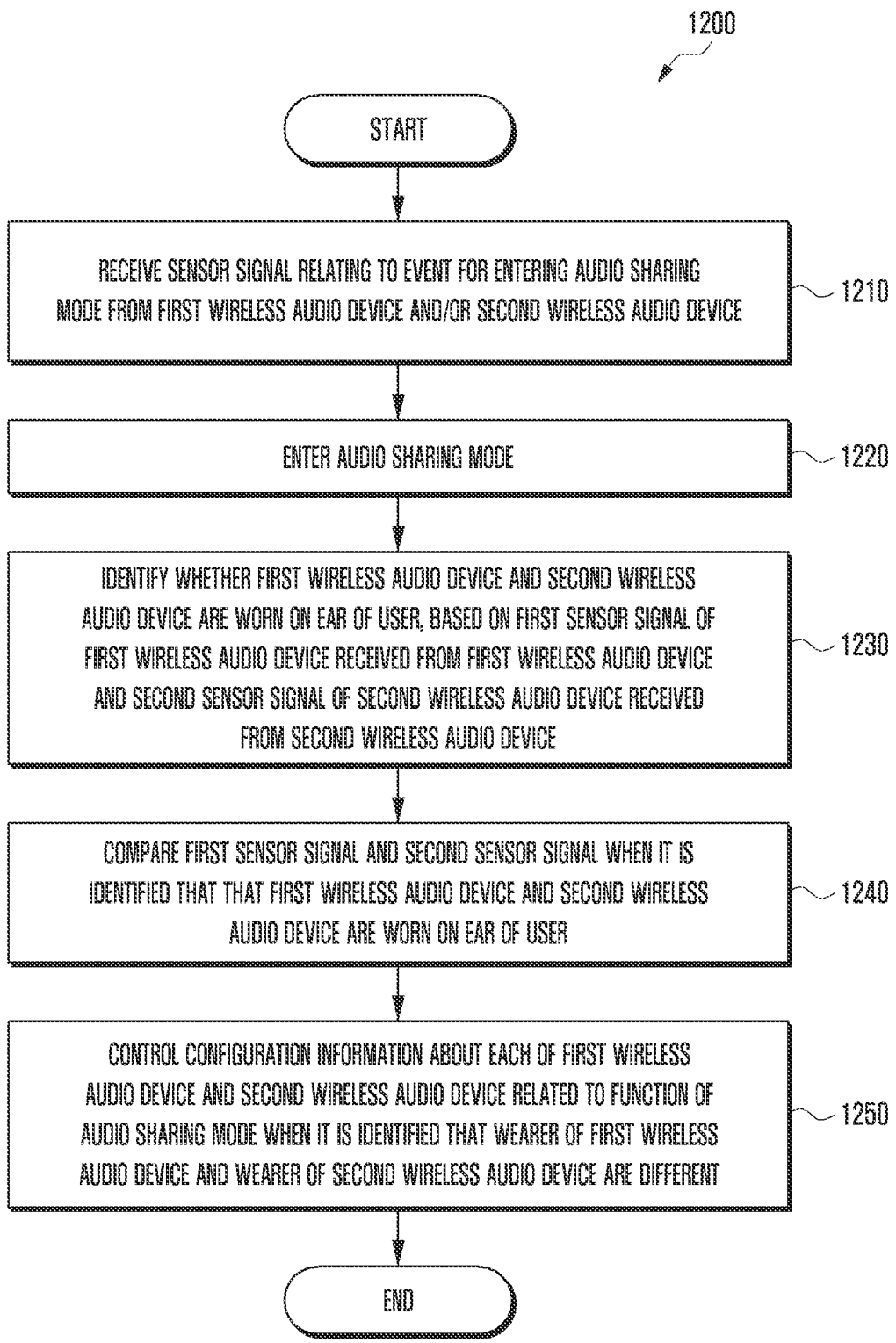
FIG. 12 is a flowchart illustrating an audio sharing method according to an embodiment of the disclosure.

FIG. 12 is a flowchart illustrating an audio sharing method according to an embodiment of the disclosure.

Referring to flowchart 1200 of FIG. 12, in operation 1210, a processor (e.g., the processor 430 of FIG. 4) of an electronic device (e.g., the electronic device 401 of FIG. 4) may receive a sensor signal relating to an event for entering an audio sharing mode from a first wireless audio device (e.g., the first wireless audio device 441 of FIG. 4) and/or a second wireless audio device (e.g., the second wireless audio device 443 of FIG. 4).

In an embodiment, the sensor signal relating to the event for entering the audio sharing mode may include a sensor signal corresponding to a movement (e.g., a specified number of times of motion) of the first wireless audio device 441 (or the second wireless audio device 443) in a state in which the first wireless audio device 441 (or the second wireless audio device 443) is detached from a cradle (e.g., the cradle 450 of FIG. 4) and a sensor signal corresponding to a state in which the first wireless audio device 441 (or the second wireless audio device 443) is worn on an ear of a user after detecting the motion of the first wireless audio device 441 (or the second wireless audio device 443).

For example, force exerted in x-axis, y-axis, and z-axis directions may be measured using a sensor circuit 520, for example, an acceleration sensor (e.g., the acceleration sensor 522 of FIG. 5), of the first wireless audio device 441 (or the second wireless audio device 443), and pitch, roll, and yaw angular velocities may be measured using a gyro sensor (e.g., the gyro sensor 523 of FIG. 5). Variance in movement of the first wireless audio device 441 (or the second wireless audio device 443) may be detected using the acceleration sensor 522 and the gyro sensor 523. A movement in a specific direction may be detected a specified number of times or greater, and the first wireless audio device 441 (or the second wireless audio device 443) being worn on an ear of a user within a specified time (e.g., n seconds) may be detected. The first wireless audio device 441 (or the second wireless audio device 443) may transmit a sensor signal to the electronic device 401. The electronic device 401 may determine whether the event for entering the audio sharing mode is detected, based on the received sensor signal.

In another example, in a state in which the first wireless audio device 441 and the second wireless audio device 443 are mounted on the cradle 450, a specified number (e.g., n or greater) of movements (e.g., motion) may be detected. After the specified number of movements are detected, it may be detected the first wireless audio device 441 and the second wireless audio device 443 are worn an ear of a user. For example, whether the first wireless audio device 441 and the second wireless audio device 443 are in a state of being inserted in the cradle 450 may be determined based on a change in sensor signal value detected by a proximity sensor 526. It may be detected through the gyro sensor 523 that a movement of the first wireless audio device 441 (or the second wireless audio device 443) in a specific direction occurs a specified number (e.g., n or greater) of times and that the first wireless audio device 441 (or the second wireless audio device 443) is worn on the ear of the user within a specified time (e.g., n seconds). The first wireless audio device 441 (or the second wireless audio device 443) may transmit a sensor signal to the electronic device 401. The electronic device 401 may determine whether the event for entering the audio sharing mode is detected, based on the received sensor signal.

In an embodiment, in operation 1220, the processor 430 may enter the audio sharing mode. For example, upon receiving the sensor signal relating to the event for entering the audio sharing mode in operation 1210, the processor 430 may enter the audio sharing mode. For example, the electronic device 401 may transmit feedback (e.g., sound feedback) indicating the entrance to the audio sharing mode to the first wireless audio device 441 (or the second wireless audio device 443). The electronic device 401 may display a user interface corresponding to the audio sharing mode on a display (e.g., the display 421 of FIG. 4).

In an embodiment, in operation 1230, the processor 430 may identify whether the first wireless audio device 441 and the second wireless audio device 443 are worn on an ear of a user, based on a first sensor signal of the first wireless audio device 441 received from the first wireless audio device 441 and a second sensor signal of the second wireless audio device 443 received from the second wireless audio device 443.

In an embodiment, in operation 1240, when it is identified that the first wireless audio device 441 and the second wireless audio device 443 are worn on the ear of the user, the processor 430 may compare the first sensor signal and the second sensor signal.

In an embodiment, although not shown, when it is identified that the first wireless audio device 441 and the second wireless audio device 443 are worn on the ear of the user, each of the wireless audio devices 441 and 443 may be connected to the electronic device 401 through a separate Bluetooth link (e.g., an SCO link). However, the disclosure is not limited to the foregoing description. When the connection through the separate Bluetooth link (e.g., an SCO link) is completed, the electronic device 401 may transmit a guide (e.g., sound feedback) reporting that the audio sharing mode is activated to each of the wireless audio devices 441 and 443.

In an embodiment, in operation 1250, when it is identified that a wearer of the first wireless audio device 441 and a wearer of the second wireless audio device 443 are different as a result of the comparison, the processor 430 may control configuration information about each of the first wireless audio device 441 and the second wireless audio device 443 related to a function of the audio sharing mode. For example, the configuration information may include ANC configuration information, volume control information (volume up/down), and/or event notification reception information. When an ambient noise value received from each of the wireless audio devices 441 and 443 exceeds a specified value (e.g., 70 dB), the processor 430 may adjust an ANC level. For example, the processor 430 may activate (on) an ANC function and may deactivate (off) an AMP function. In another example, the processor 430 may independently control (e.g., adjust) the volume of each of the wireless audio devices 441 and 443, based on the ambient noise value received from each of the wireless audio devices 441 and 443. In still another example, when an event is received, the processor 430 may configure whether to transmit a notification of the event to each of the wireless audio devices 441 and 443. In yet another example, the electronic device 401 may optimize a codec and a network protocol in order to synchronize the second wireless audio device 443 with the mouth shape of a different user and audio data that is heard.

In an embodiment, when the audio sharing mode entered in operation 1220 is a first audio sharing mode, the processor 430 may transmit audio data currently being played to the first wireless audio device 441 and the second wireless audio device 443 through an application related to audio playback. For example, the processor 430 may transmit the audio data currently being played to the first wireless audio device 441, based on the configuration information (e.g., ANC information and volume information) about the first wireless audio device 441. The processor 430 may transmit the audio data currently being played to the second wireless audio device 443, based on the configuration information (e.g., ANC information and volume information) about the second wireless audio device 443.

In an embodiment, when the audio sharing mode entered in operation 1220 is a second audio sharing mode, the processor 430 may receive a first audio signal from the first wireless audio device 441. The processor 430 may transmit the first audio signal to the second wireless audio device 443, based on the configuration information (e.g., ANC information, volume information) about the second wireless audio device 443. The processor 430 may receive a second audio signal from the second wireless audio device 443. The processor 430 may transmit the second audio signal to the first wireless audio device 441, based on the configuration information (e.g., ANC information, volume information) about the first wireless audio device 441.

Figure 13:
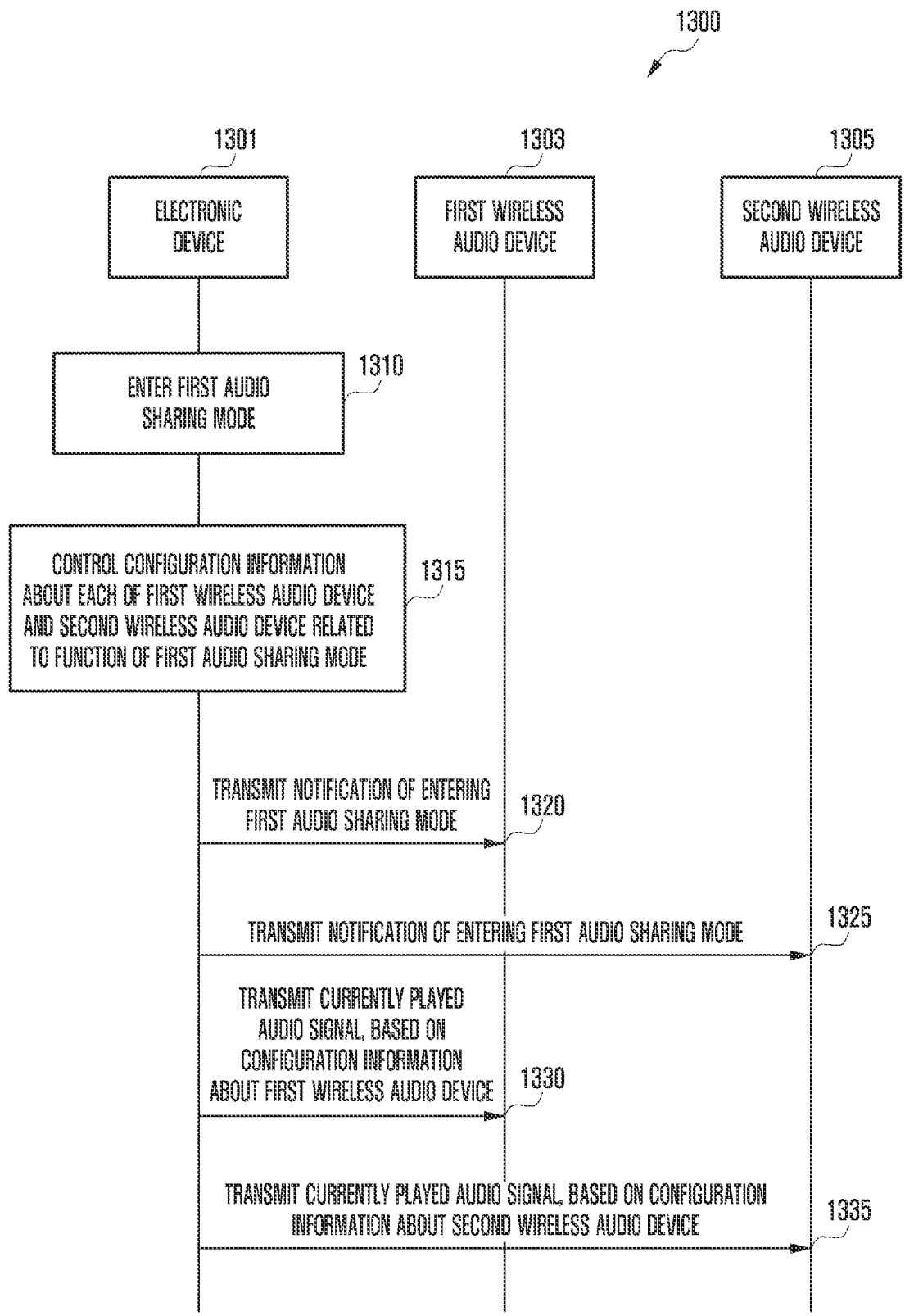
FIG. 13 is a view illustrating signal flow between an electronic device, a first wireless audio device, and a second wireless audio device, according to an embodiment of the disclosure.

FIG. 13 is a view illustrating signal flow between an electronic device, a first wireless audio device, and a second wireless audio device, according to an embodiment of the disclosure.

According to various embodiments, FIG. 13 illustrates an embodiment of executing a first audio sharing mode, for example, when the currently running application is identified as the application related to audio playback in operation 635 of FIG. 6. For example, the first audio sharing mode may include a media sharing mode.

Referring to view 1300 of FIG. 13, in operation 1310, an electronic device 1301 (e.g., the electronic device 401 of FIG. 4) may enter the first audio sharing mode, for example, the media sharing mode.

In an embodiment, in operation 1315, the electronic device 1301 may control configuration information about each of a first wireless audio device 1303 (e.g., the first wireless audio device 441 of FIG. 4) and a second wireless audio device 1305 (e.g., the second wireless audio device 443 of FIG. 4) related to a function of the first audio sharing mode. For example, the configuration information may include ANC configuration information, volume control information (volume up/down), and/or event notification reception information. When an ambient noise value received from each of the wireless audio devices 1303 and 1305 exceeds a specified value (e.g., 70 dB), the electronic device 1301 may adjust an ANC level. In another example, the electronic device 1301 may independently control (e.g., adjust) the volume of each of the wireless audio devices 1303 and 1305, based on the ambient noise value received from each of the wireless audio devices 1303 and 1305. In still another example, when an event is received, the electronic device 1301 may configure whether to transmit a notification of the event to each of the wireless audio devices 1303 and 1305.

In various embodiments, although operation 1315 of controlling the configuration information about each of the first wireless audio device 1303 and the second wireless audio device 1305 related to the function of the first audio sharing mode is described as being performed after operation 1310 of entering the first audio sharing mode, the disclosure is not limited thereto. For example, operation 1315 may be performed after operation 1320 and operation 1325 to be described below.

In an embodiment, in operation 1320, the electronic device 1301 may transmit a notification of entering the first audio sharing mode to the first wireless audio device 1303. In operation 1325, the electronic device 1301 may transmit the notification of entering the first audio sharing mode to the second wireless audio device 1305. For example, the notification of entering of the first audio sharing mode may include audio feedback (e.g., a voice and/or a notification sound). When receiving the notification of entering the first audio sharing mode, a first user wearing the first wireless audio device 1303 and a second user wearing the second wireless audio device 1305 may recognize that the first audio sharing mode is entered.

In various embodiments, operation 1320 and operation 1325 may be performed substantially at the same time.

In an embodiment, in operation 1330, the electronic device 1301 may transmit an audio signal currently being played to the first wireless audio device 1303, based on the configuration information about the first wireless audio device 1303. For example, the electronic device 1301 may transmit the audio signal currently being played to the first wireless audio device 1303, based on the ANC configuration information and/or the volume information about the first wireless audio device 1303. When an event (e.g., a texting event) is received while the audio signal is being played, the electronic device 1301 may or may not transmit a notification of the received event, based on the event notification reception information about the first wireless audio device 1303.

In an embodiment, in operation 1335, the electronic device 1301 may transmit the audio signal currently being played to the second wireless audio device 1305, based on the configuration information about the second wireless audio device 1305. For example, the electronic device 1301 may transmit the audio signal currently being played to the second wireless audio device 1305, based on the ANC configuration information and/or the volume information about the second wireless audio device 1305. When an event (e.g., a texting event) is received while the audio signal is being played, the electronic device 1301 may or may not transmit a notification of the received event, based on the event notification reception information about the second wireless audio device 1305.

Figure 14A:
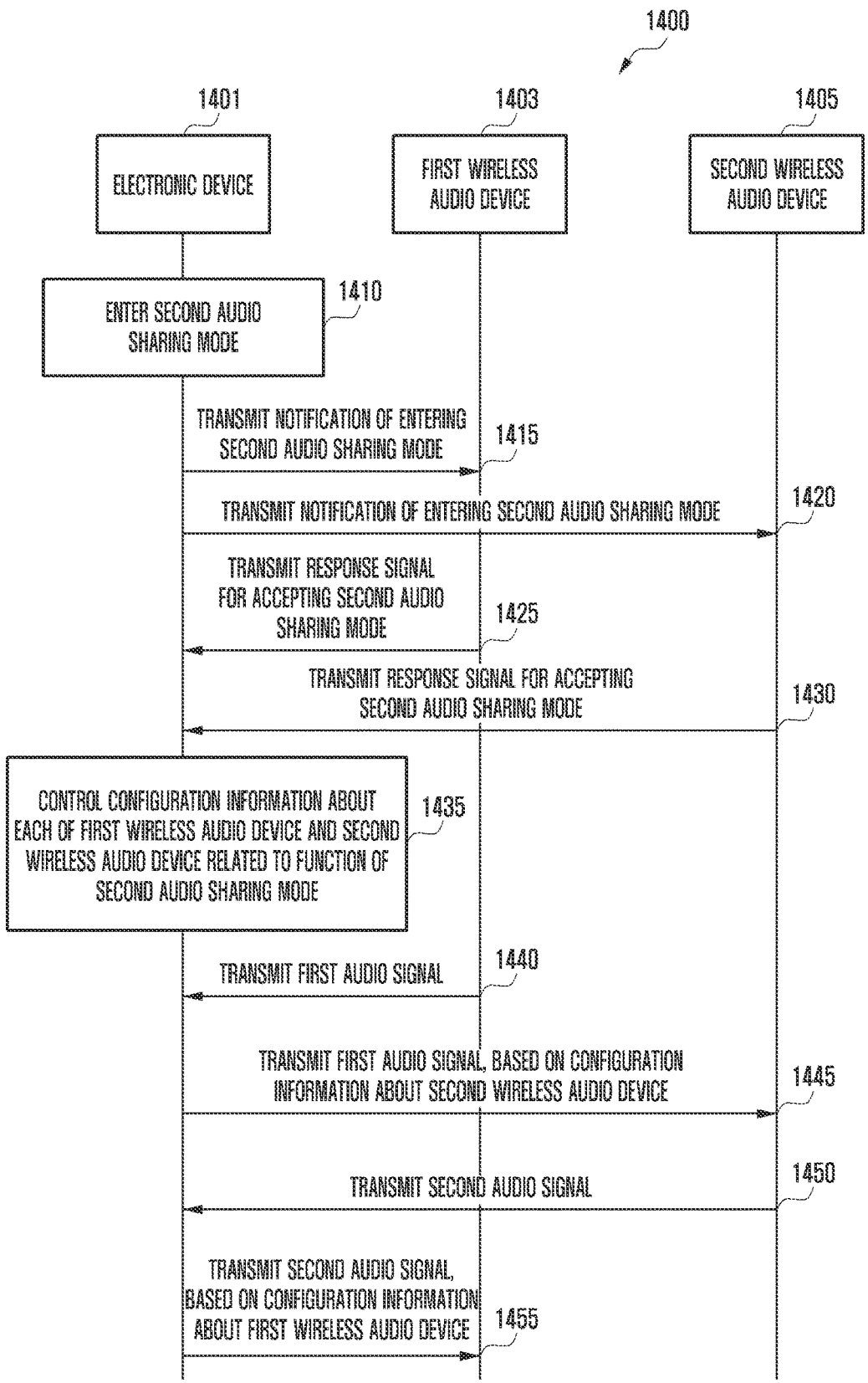
FIG. 14A is another view illustrating signal flow between an electronic device, a first wireless audio device, and a second wireless audio device, according to an embodiment of the disclosure.

FIG. 14A is another view illustrating signal flow between an electronic device, a first wireless audio device, and a second wireless audio device, according to an embodiment of the disclosure.

According to various embodiments, FIG. 14A illustrates an embodiment of executing a second audio sharing mode, for example, when it is identified that the currently running application is not the application related to audio playback in operation 635 of FIG. 6. For example, the second audio sharing mode may include a conversation sharing mode.

Referring to view 1400 of FIG. 14A, in operation 1410, an electronic device 1401 (e.g., the electronic device 401 of FIG. 4) may enter the second audio sharing mode, for example, the conversation sharing mode.

In an embodiment, in operation 1415, the electronic device 1401 may transmit a notification of entering the second audio sharing mode to a first wireless audio device 1403 (e.g., the first wireless audio device 441 of FIG. 4). In operation 1420, the electronic device 1401 may transmit the notification of entering the second audio sharing mode to a second wireless audio device 1405 (e.g., the second wireless audio device 443 of FIG. 4). When receiving the notification of entering the second audio sharing mode, a first user wearing the first wireless audio device 1403 and a second user wearing the second wireless audio device 1405 may recognize that the second audio sharing mode is entered.

In various embodiments, operation 1415 and operation 1420 may be performed substantially at the same time.

In an embodiment, in operation 1425, the first wireless audio device 1403 may transmit a response signal for accepting the second audio sharing mode to the electronic device 1401. In operation 1430, the second wireless audio device 1405 may transmit a response signal for accepting the second audio sharing mode to the electronic device 1401. For example, the response signal for accepting the second audio sharing mode may include an input to detect a designated gesture (e.g., a nodding gesture or a gesture of touching a cheek) and an input detected by an input circuit (e.g., the input circuit 530 of FIG. 5) of each wireless audio device 1403 and 1405.

In an embodiment, in operation 1435, the electronic device 1401 may control configuration information about each of the first wireless audio device 1403 and the second wireless audio device 1405 related to a function of the second audio sharing mode. For example, the configuration information may include ANC configuration information, volume control information (volume up/down), and/or event notification reception information.

In an embodiment, in operation 1440, the first wireless audio device 1403 may transmit a first audio signal to the electronic device 1401. For example, the first wireless audio device 1403 may obtain the first audio signal through a microphone (e.g., the microphone 519 of FIG. 5) and may transmit the first audio signal to the electronic device 1401.

In an embodiment, in operation 1445, the electronic device 1401 may transmit the first audio signal to the second wireless audio device 1405, based on the configuration information about the second wireless audio device 1405. For example, the electronic device 1401 may transmit the first audio signal, received from the first wireless audio device 1403, to the second wireless audio device 1405, based on the ANC configuration information and/or the volume information about the second wireless audio device 1405. When an event (e.g., a texting event) is received during the second audio sharing mode, the electronic device 1301 may or may not transmit a notification of the received event, based on the event notification reception information about the second wireless audio device 1405.

In an embodiment, in operation 1450, the second wireless audio device 1405 may transmit a second audio signal to the electronic device 1401. For example, the second wireless audio device 1405 may obtain the second audio signal through a microphone (e.g., the microphone 519 of FIG. 5) and may transmit the second audio signal to the electronic device 1401.

In an embodiment, in operation 1455, the electronic device 1401 may transmit the second audio signal to the first wireless audio device 1403, based on the configuration information about the first wireless audio device 1403. For example, the electronic device 1401 may transmit the second audio signal, received from the second wireless audio device 1405, to the first wireless audio device 1403, based on the ANC configuration information and/or the volume information about the first wireless audio device 1403. When an event (e.g., a texting event) is received during the second audio sharing mode, the electronic device 1401 may or may not transmit a notification of the received event, based on the event notification reception information about the first wireless audio device 1403.

Although FIG. 14A shows that the electronic device 1401 relays an audio signal between the first wireless audio device 1403 and the second wireless audio device 1405 according to various embodiments, the disclosure is not limited thereto. For example, the first wireless audio device 1403 and the second wireless audio device 1405 may transmit and receive audio signals to and from each other without relaying by the electronic device 1401. A relevant description will be made below in detail with reference to FIG. 14B.

Figure 14B:
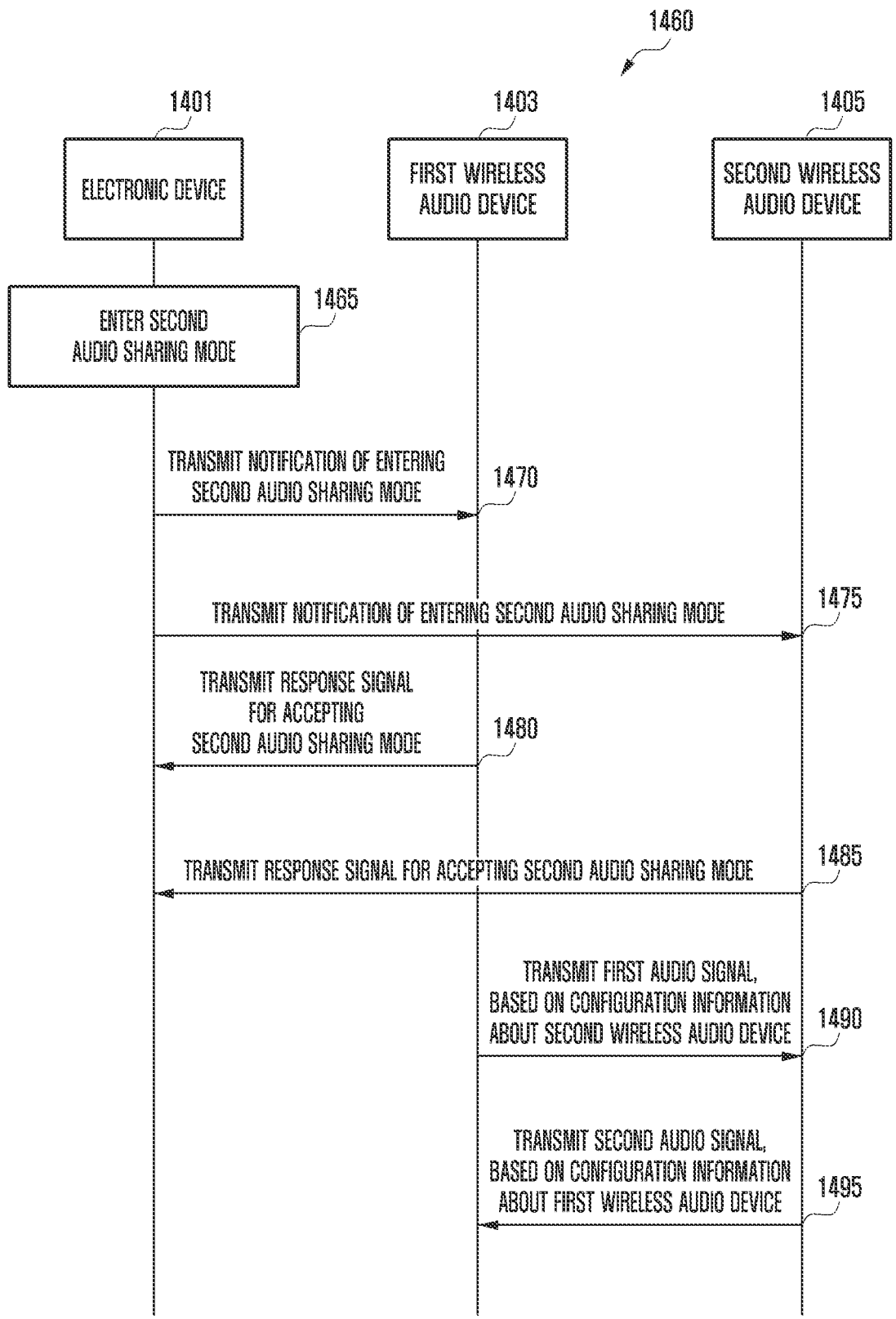
FIG. 14B is another view illustrating signal flow between an electronic device, a first wireless audio device, and a second wireless audio device, according to an embodiment of the disclosure.

FIG. 14B is another view illustrating signal flow between an electronic device, a first wireless audio device, and a second wireless audio device, according to an embodiment of the disclosure.

According to various embodiments, FIG. 14B illustrates an embodiment of executing a second audio sharing mode, for example, when it is identified that the currently running application is not the application related to audio playback in operation 635 of FIG. 6. For example, the second audio sharing mode may include a conversation sharing mode.

Operation 1465 to operation 1485 of FIG. 14B according to various embodiments are the same as operation 1410 to operation 1430 of FIG. 14A described above, and thus a detailed description thereof may be replaced with a relevant description of FIG. 14A.

Referring to view 1460 of FIG. 14B, in operation 1465, an electronic device 1401 may enter the second audio sharing mode. In operation 1470, the electronic device 1401 may transmit a notification of entering the second audio sharing mode to a first wireless audio device 1403. In operation 1475, the electronic device 1401 may transmit the notification of entering the second audio sharing mode to a second wireless audio device 1405.

In various embodiments, operation 1470 and operation 1475 may be performed substantially at the same time.

In an embodiment, in operation 1480, the first wireless audio device 1403 may transmit a response signal for accepting the second audio sharing mode to the electronic device 1401. In operation 1485, the second wireless audio device 1405 may transmit a response signal for accepting the second audio sharing mode to the electronic device 1401.

In an embodiment, although not shown, the electronic device 1401 may transmit configuration information about the first wireless audio device 1403 and configuration information about the second wireless audio device 1405 to the second wireless audio device 1405 and the first wireless audio device 1403, respectively.

In an embodiment, in operation 1490, the first wireless audio device 1403 may transmit a first audio signal to the second wireless audio device 1405, based on the configuration information about the second wireless audio device 1405. For example, the first wireless audio device 1403 may receive the first audio signal through a microphone (e.g., the microphone 519 of FIG. 5). The first wireless audio device 1403 may transmit the first audio signal to the second wireless audio device 1405, based on the configuration information about the second wireless audio device 1405 received from the electronic device 1401. For example, the first wireless audio device 1403 may transmit the first audio signal received from the microphone 519 to the second wireless audio device 1405, based on ANC configuration information and/or volume information about the second wireless audio device 1405.

In an embodiment, in operation 1495, the second wireless audio device 1405 may transmit a second audio signal to the first wireless audio device 1403, based on the configuration information about the first wireless audio device 1403. For example, the second wireless audio device 1405 may receive the second audio signal through the microphone 519. The second wireless audio device 1405 may transmit the second audio signal to the first wireless audio device 1403, based on the configuration information about the first wireless audio device 1403 received from the electronic device 1401. For example, the second wireless audio device 1405 may transmit the second audio signal received from the microphone 519 to the first wireless audio device 1403, based on ANC configuration information and/or volume information about the first wireless audio device 1403.

FIG. 15 is another view illustrating signal flow between an electronic device, a first wireless audio device, and a second wireless audio device, according to an embodiment of the disclosure.

According to various embodiments, FIG. 15 illustrates an embodiment of switching to a first audio sharing mode (e.g., a media sharing mode) when an audio (e.g., media) is played by executing an application related to audio playback in an electronic device 1501 (e.g., the electronic device 401 of FIG. 4) while executing a second audio sharing mode (e.g., a conversation sharing mode) according to the foregoing embodiment of FIG. 14A or FIG. 14B.

Referring to view 1500 of FIG. 15, in operation 1510, the electronic device 1501 (e.g., the electronic device 401 of FIG. 4) may detect execution of an application related to audio playback.

In an embodiment, in operation 1515, the electronic device 1501 may transmit a notification of entering the first audio sharing mode to a first wireless audio device 1503 (e.g., the first wireless audio device 411 of FIG. 4). In operation 1520, the electronic device 1501 may transmit a notification of entering the first audio sharing mode to a second wireless audio device 1505 (e.g., the second wireless audio device 413 of FIG. 4).

In an embodiment, in operation 1525, the electronic device 1501 may transmit a currently played audio signal, based on configuration information about the first wireless audio device 1503. In operation 1530, the electronic device 1501 may transmit the currently played audio signal, based on configuration information about the second wireless audio device 1505.

According to various embodiments, when detecting that the first wireless audio device 1503 and the second wireless audio device 1505 are detached from ears of a first user and a second user, when detecting a change to a state in which the first wireless audio device 1503 and the second wireless audio device 1505 are worn the ears of the same user (e.g., the first user), when detecting that the first wireless audio device 1503 and the second wireless audio device 1505 are mounted on a cradle (e.g., the cradle 450 of FIG. 4), or when detecting an input to deactivate a connection for audio sharing, the electronic device 1501 may terminate the first audio sharing mode.

Figure 16:
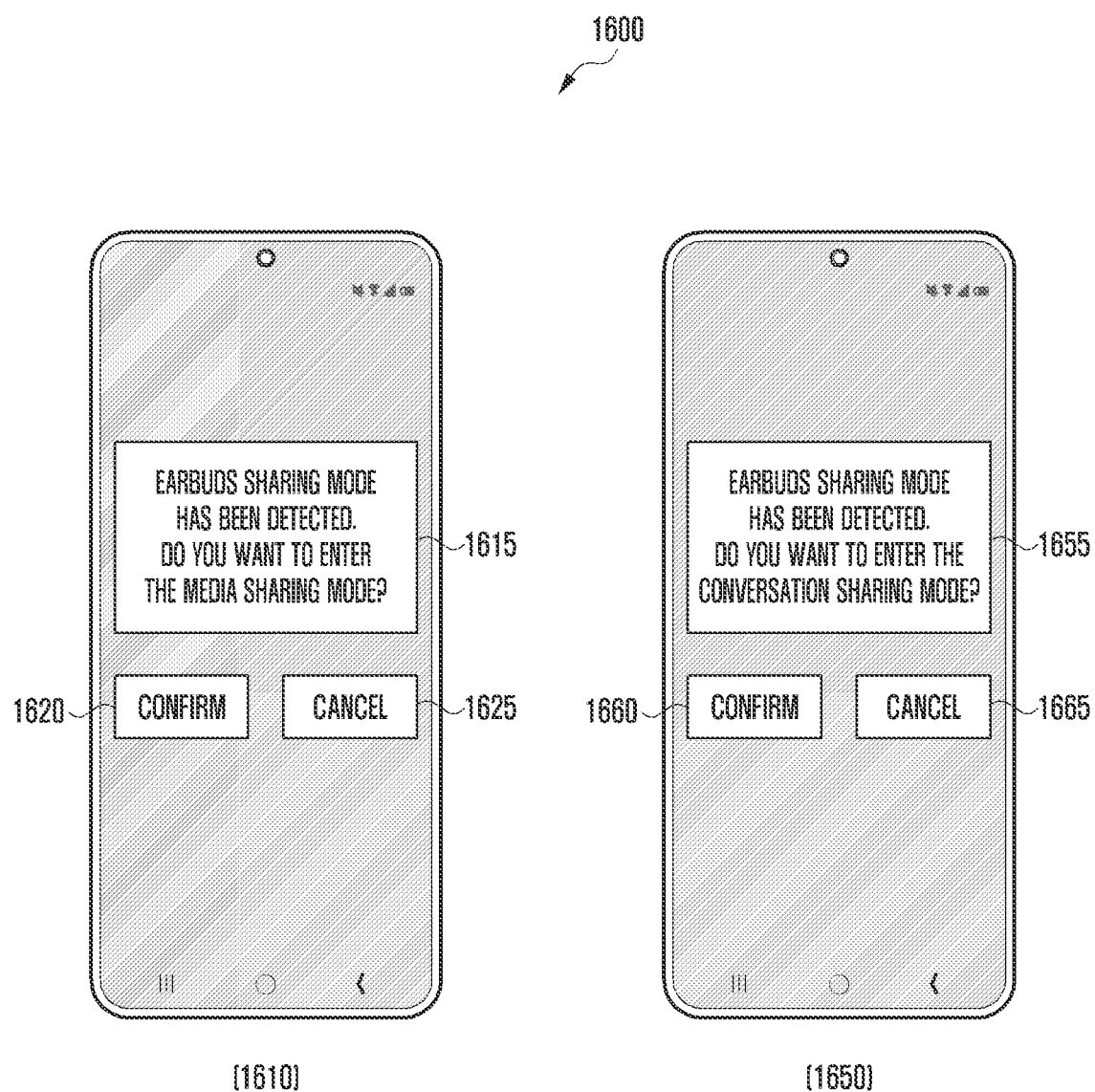
FIG. 16 is a view illustrating a method of outputting a notification message indicating execution of an audio sharing mode according to an embodiment of the disclosure.

FIG. 16 is a view illustrating a method of outputting a notification message indicating execution of an audio sharing mode according to an embodiment of the disclosure.

Referring to view 1600 of FIG. 16, as shown by reference numeral 1610, when determining that a currently running application is an application related to audio playback, an electronic device (e.g., the electronic device 401 of FIG. 4) may display a notification message 1615 (e.g., "Earbuds sharing mode has been detected. Do you want to enter the media sharing mode?") indicating execution of a first audio sharing mode, for example, a media sharing mode, on a display (e.g., the display 421 of FIG. 4). When an input to select a confirm button 1620 is detected, the electronic device 401 may execute the media sharing mode. When an input to select a cancel button 1625 is detected, the electronic device 401 may not execute the media sharing mode.

In an embodiment, as shown by reference numeral 1650, when determining that the currently running application is not an application related to audio playback, the electronic device 401 may display a notification message 1655 (e.g., "Earbuds sharing mode has been detected. Do you want to enter the conversation sharing mode?") indicating execution of a second audio sharing mode, for example, a conversation sharing mode, on the display 421. When an input to select a confirm button 1660 is detected, the electronic device 401 may execute the conversation sharing mode. When an input to select a cancel button 1665 is detected, the electronic device 401 may not execute the conversation sharing mode.

Figure 17:
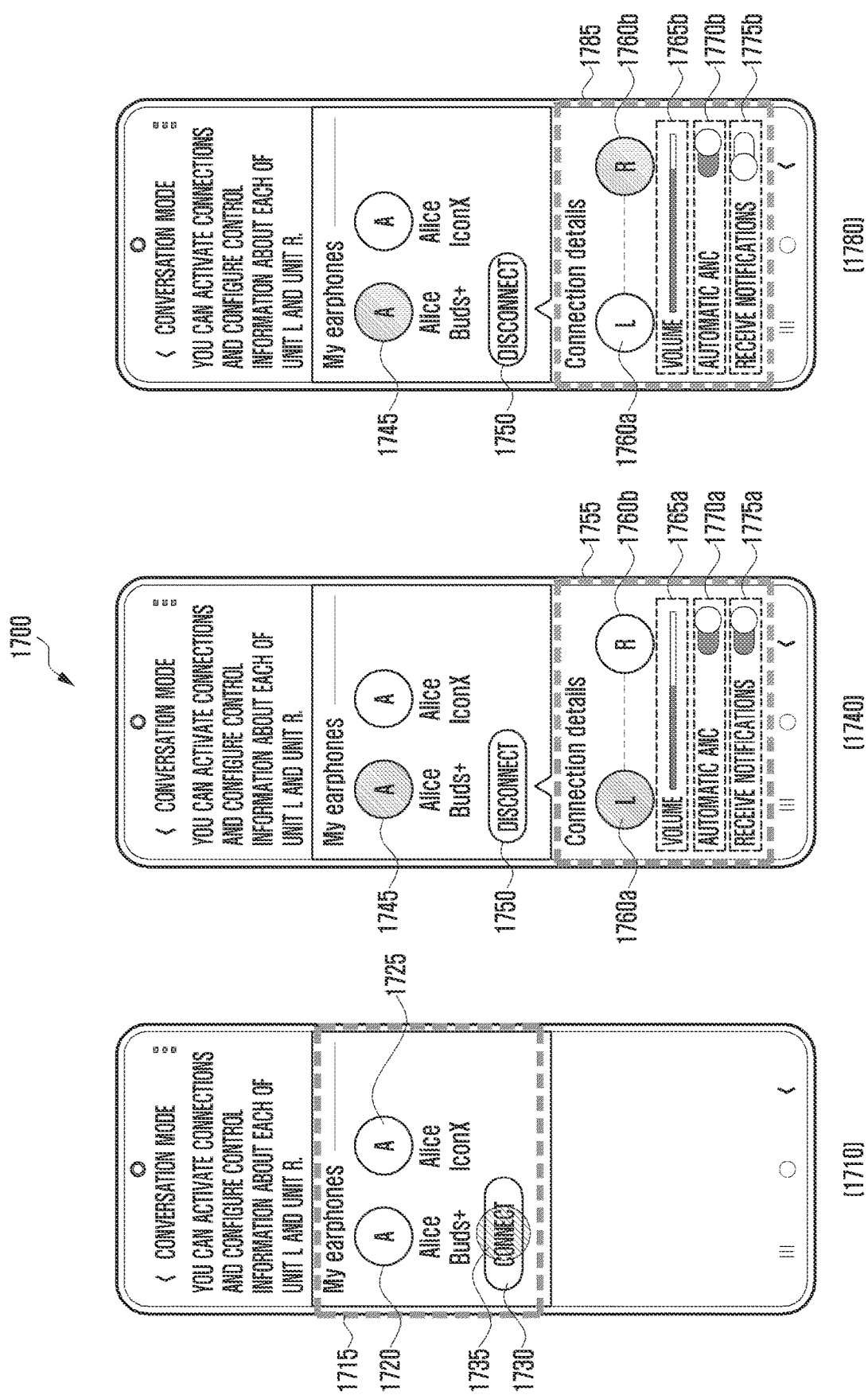
FIG. 17 is a view illustrating a user interface for controlling configuration information about a wireless audio device according to an embodiment of the disclosure.

FIG. 17 is a view illustrating a user interface for controlling configuration information about a wireless audio device according to an embodiment of the disclosure.

According to various embodiments, an electronic device (e.g., the electronic device 401 of FIG. 4) may execute a first audio sharing mode or a second audio sharing mode, based on a currently running application in a state in which a first wireless audio device (e.g., the first wireless audio device 441 of FIG. 4) and a second wireless audio device (e.g., the second wireless audio device 443 of FIG. 4) are worn on ears of different users, respectively. The electronic device 401 may control configuration information about each of the first wireless audio device 441 and the second wireless audio device 443 related to a function of the first audio sharing mode or the second audio sharing mode.

Referring to view 1700 of FIG. 17, as shown by reference numeral 1710, the electronic device 401 may display a user interface for controlling the configuration information about each of the wireless audio devices 441 and 443 on a display (e.g., the display 421 of FIG. 4) upon executing the second audio sharing mode (or the first audio sharing mode), for example, a conversation sharing mode. For example, the user interface may include a list 1715 of wireless audio devices having an established communication link to the electronic device 401. For example, the list 1715 of the wireless audio devices having the established communication link to the electronic device 401 may include a first wireless audio device set 1720 (e.g., Alice Buds+) and a second wireless audio device set 1725 (e.g., Alice iconX).

In an embodiment, upon detecting a user input 1735 of selecting a connect button 1730 of the first wireless audio device set 1720, the electronic device 401 may display an item 1755 for controlling configuration information about a first wireless audio device 1760a and a second wireless audio device 1760b included in the first wireless audio device set 1720 as shown by reference numeral 1740. As the first wireless audio device set 1720 is connected, the connect button 1730 may be changed to a disconnect button 1750.

In an embodiment, reference number 1740 shows items 1755 for controlling the configuration information about the first wireless audio device 1760a of the first wireless audio device set 1720, and the configuration information may include, for example, a volume 1765a, an ANC configuration 1770a, and an event notification reception 1775a. For example, the electronic device 401 may receive an ambient noise value from the first wireless audio device 1760a and when the received ambient noise value exceeds a specified value (e.g., 70 dB), the electronic device 401 may automatically activate the ANC configuration 1770a and may deactivate (off) an AMP function. In another example, the electronic device 401 may automatically adjust the volume 1765a of the first wireless audio device 1760a, based on the ambient noise value from the first wireless audio device 1760a. The disclosure is not limited to the foregoing description, and the volume 1765a and/or the ANC configuration 1770a of the first wireless audio device 1760a may be configured by a user input. In still another example, the electronic device 401 may configure whether to receive an event notification in the first wireless audio device 1760a through the event notification reception 1775a.

In an embodiment, reference numeral 1780 shows items 1785 for controlling the configuration information about the second wireless audio device 1760b of the first wireless audio device set 1720, and the configuration information may include, for example, a volume 1765b, an ANC configuration 1770b, and an event notification reception 1775b. For example, the electronic device 401 may receive an ambient noise value from the second wireless audio device 1760b, and when the received ambient noise value exceeds a specified value (e.g., 70 dB), the electronic device 401 may automatically activate the ANC configuration 1770b and may deactivate (off) an AMP function. In another example, the electronic device 401 may automatically adjust the volume 1765b of the second wireless audio device 1760b, based on the ambient noise value. In still another example, the electronic device 401 may configure whether to receive an event notification in the second wireless audio device 1760b through the event notification reception 1775b.

According to various embodiments, when the first wireless audio device 441 and the second wireless audio device 443 are worn on ears of different users, the configuration information (e.g., volume and ANC configuration) of each of the first wireless audio device 441 and the second wireless audio device 443 may be separately controlled, thereby providing an audio signal appropriate for the users' situations (e.g., noise).

FIGS. 18A and 18B are views illustrating signal flow between an electronic device, a first wireless audio device set, an external electronic device, and a second wireless audio device set, according to various embodiments of the disclosure.

Referring to view 1800 of FIGS. 18A and 18B, in operation 1810, an electronic device 1801 (e.g., the electronic device 401 of FIG. 4) may establish a communication link to a first wireless audio device set 1803. For example, the electronic device 1801 may establish a connection (e.g., Bluetooth pairing) with the first wireless audio device set 1803 (e.g., the wireless audio device set 440 of FIG. 4) through a wireless communication circuit (e.g., the wireless communication circuit 405 of FIG. 4), for example, a short-range wireless communication circuit.

In an embodiment, in operation 1815, an external electronic device 1805 may establish a communication link to a second wireless audio device set 1807. The external electronic device 1805 may establish a connection (e.g., Bluetooth pairing) with the second wireless audio device set 1807 through a wireless communication circuit, for example, a short-range wireless communication circuit.

In an embodiment, in operation 1820, the electronic device 1801 may display a list of at least one external electronic device adjacent to the electronic device 1801. For example, the electronic device 1801 may activate a discovery mode (e.g., a mode of retrieving an external electronic device to which the electronic device 1801 is to be connected through the wireless communication circuit 405), and may display a list of at least one external electronic device that is retrieved upon activating the discovery mode.

In an embodiment, in operation 1825, the electronic device 1801 may detect an input to select one external electronic device 1805 from among the at least one external electronic device.

In an embodiment, in operation 1830, the electronic device 1801 may transmit a signal for requesting a communication link to the external electronic device 1805. In operation 1835, the external electronic device 1805 may transmit a response signal for accepting the request for the communication link to the electronic device 1801.

In an embodiment, although not shown, upon receiving the response signal from the external electronic device 1805, the electronic device 1801 may establish a communication link to the external electronic device 1805. For example, the electronic device 1801 and the external electronic device 1805 may establish the communication link through authentication. When the external electronic device 1805 exists in a contact list of the electronic device 1801, the electronic device 1801 may establish the communication link with the external electronic device 1805 through authentication, such as fingerprint recognition. In another example, the electronic device 1801 and the external electronic device 1805 may establish the communication link through mutual authentication between the electronic device 1801 and the external electronic device 1805. When there is a history of being previously connected with the external electronic device 1805, the electronic device 1801 may omit an authentication operation.

In an embodiment, in operation 1840, the external electronic device 1805 may transmit information about at least one wireless audio device set, for example, the second wireless audio device set 1807, connected to the external electronic device 1805 to the electronic device 1801. For example, the information about the second wireless audio device set 1807 may include a MAC address corresponding to a unique address value for identifying a wireless audio device, identification information (e.g., profile information) about a wireless audio device, and/or a security key.

In an embodiment, in operation 1845, the electronic device 1801 may detect an input to select the second wireless audio device set 1807 from among the at least one wireless audio device set.

In another embodiment, when there is one wireless audio device set connected to the external electronic device 1805, an operation of selecting a wireless audio device set for connection may be omitted.

In an embodiment, upon detecting the input to select the second wireless audio device set 1807, the electronic device 1801 may transmit a signal for requesting a connection with the second wireless audio device set 1807 to the external electronic device 1805 in operation 1850. Upon receiving the signal for requesting the connection with the second wireless audio device set 1807 from the electronic device 1801, the external electronic device 1805 may transmit a signal for requesting release of the communication link to the second wireless audio device set 1807 in operation 1855. In operation 1860, the second wireless audio device set 1807 may transmit a response signal for accepting the release of the communication link to the external electronic device 1805.

In various embodiments, although not shown, upon receiving the response signal for accepting the release of the communication link from the second wireless audio device set 1807, the external electronic device 1805 may enter an automatic connection standby state. For example, the automatic connection standby state may include a state for supporting the second wireless audio device set 1807 to automatically establish a communication link with the external electronic device 1805 previously connected when the second wireless audio device set 1807 is not in a state of being connected with a different electronic device (e.g., when the electronic device 1801 and the second wireless audio device set 1807 having a communication link established in operation 1870 are disconnected).

In an embodiment, in operation 1865, the external electronic device 1805 may transmit information about the release of the communication link with the second wireless audio device set 1807 to the electronic device 1801.

In an embodiment, upon receiving the information about the release of the communication link with the second wireless audio device set 1807 from the external electronic device 1805, the electronic device 1801 may establish a communication link with the second wireless audio device set 1807 in operation 1870.

In various embodiments, although not shown, after establishing the communication link with the electronic device 1801, the second wireless audio device set 1807 may release or maintain the communication link with the external electronic device 1805. For example, when releasing the communication link with the external electronic device 1805 after establishing the communication link with the electronic device 1801, the second wireless audio device set 1807 may store configuration information about the communication link with the external electronic device 1805 previously connected. When releasing the link with the electronic device 1801, the second wireless audio device set 1807 may reestablish (e.g., restore) the communication link with the external electronic device 1805 in the automatic connection standby state, based on the configuration information about the communication link with the external electronic device 1805. That is, when releasing the link with the electronic device 1801, the second wireless audio device set 1807 may be automatically connected to the external electronic device 1805 to which the second wireless audio device set 1807 has established the communication link before being connected to the electronic device 1801.

In an embodiment, in operation 1875, the electronic device 1801 may execute an audio sharing mode, based on a currently running application. In operation 1880, the electronic device 1801 may control configuration information about each of the first wireless audio device set 1803 and the second wireless audio device set 1807 related to a function of the audio sharing mode.

In an embodiment, although not shown, when the audio sharing mode is a first audio sharing mode, the electronic device 1801 may transmit currently played audio data to the first wireless audio device set 1803 and the second wireless audio device set 1807 through an application related to audio playback. For example, the electronic device 1801 may transmit the currently played audio data to the first wireless audio device set 1803, based on the configuration information (e.g., ANC information and volume information) about the first wireless audio device set 1803. The electronic device 1801 may transmit the currently played audio data to the second wireless audio device set 1807, based on the configuration information (e.g., ANC information and volume information) about the second wireless audio device set 1807.

In an embodiment, although not shown, when the audio sharing mode is a second audio sharing mode, the electronic device 1801 may receive a first audio signal from the first wireless audio device set 1803. The electronic device 1801 may transmit the first audio signal to the second wireless audio device set 1807, based on the configuration information (e.g., ANC information and volume information) about the second wireless audio device set 1807. The electronic device 1801 may receive a second audio signal from the second wireless audio device set 1807. The electronic device 1801 may transmit the second audio signal to the first wireless audio device set 1803, based on the configuration information (e.g., ANC information and volume information) about the first wireless audio device set 1803.

FIGS. 19A and 19B are further views illustrating signal flow between an electronic device, a first wireless audio device set, an external electronic device, and a second wireless audio device set, according to various embodiments of the disclosure.

According to various embodiments, compared to FIG. 18A and FIG. 18B described above, FIG. 19A and FIG. 19B illustrate an embodiment of performing audio sharing through a connection with a second wireless audio device set 1907 after executing an audio sharing mode.

Since operation 1910, operation 1915, and operation 1925 to operation 1975 of FIG. 19A and FIG. 19B according to various embodiments are the same as operation 1810 to operation 1873 of FIG. 18A and FIG. 18B described above, a detailed description thereof may be replaced with a relevant description of FIG. 18A and FIG. 18B.

Referring to view 1900 of FIG. 19A and FIG. 19B, in operation 1910, an electronic device 1901 (e.g., the electronic device 401 of FIG. 4) may establish a communication link to a first wireless audio device set 1903. In operation 1915, an external electronic device 1905 may establish a communication link to the second wireless audio device set 1907.

In an embodiment, in operation 1920, the electronic device 1901 may execute an audio sharing mode. For example, the electronic device 1901 may receive a sensor signal relating to an event for entering the audio sharing mode from the first wireless audio device set 1903. For example, the sensor signal relating to the event for entering the audio sharing mode may include a sensor signal relating to a movement (e.g., a specified number of times of motion) of the first wireless audio device set 1903 in a state in which the first wireless audio device set 1903 is detached from a cradle (e.g., the cradle 450 in FIG. 4) and a sensor signal relating to a state in which the first wireless audio device set 1903 is worn on an ear of a user after detecting the movement of the first wireless audio device set 1903. In another example, the sensor signal relating to the event for entering the audio sharing mode may include a sensor signal relating to a specified number (e.g., n or greater) of movements (e.g., motion) of the first wireless audio device set 1903 in a state of being mounted on the cradle 450 and a sensor signal relating to a state in which the first wireless audio device set 1903 is worn on an ear of a user after detecting the specified number of movements.

In an embodiment, in operation 1925, the electronic device 1901 may display a list of at least one external electronic device adjacent to the electronic device 1901. In operation 1930, the electronic device 1901 may detect an input to select one external electronic device 1905 from among the at least one external electronic device. In operation 1935, the electronic device 1901 may transmit a signal for requesting a communication link to the external electronic device 1905. In operation 1940, the external electronic device 1905 may transmit a response signal for accepting the request for the communication link to the electronic device 1901. In operation 1945, the external electronic device 1905 may transmit information (e.g., a MAC address corresponding to a unique address value for identifying a wireless audio device, identification information (e.g., profile information) about a wireless audio device, and/or a security key) about at least one wireless audio device set, for example, the second wireless audio device set 1907, connected to the external electronic device 1905 to the electronic device 1901. In operation 1950, the electronic device 1901 may detect an input to select the second wireless audio device set 1907 from among the at least one wireless audio device set.

In an embodiment, in operation 1955, the electronic device 1901 may transmit a signal for requesting a connection with the second wireless audio device set 1907 to the external electronic device 1905. In operation 1960, the external electronic device 1905 may transmit a signal for requesting release of the communication link to the second wireless audio device set 1907. In operation 1965, the second wireless audio device set 1907 may transmit a response signal for accepting the release of the communication link to the external electronic device 1905.

In various embodiments, although not shown, upon receiving the response signal for accepting the release of the communication link from the second wireless audio device set 1907, the external electronic device 1905 may enter an automatic connection standby state. For example, the automatic connection standby state may include a state for supporting the second wireless audio device set 1907 to automatically establish a communication link with the external electronic device 1905 previously connected when the second wireless audio device set 1907 is not in a state of being connected with a different electronic device (e.g., when the electronic device 1901 and the second wireless audio device set 1907 having a communication link established in operation 1975 are disconnected).

In an embodiment, in operation 1970, the external electronic device 1905 may transmit information about the release of the communication link with the second wireless audio device set 1907. In operation 1975, the electronic device 1901 may establish a communication link with the second wireless audio device set 1907.

In an embodiment, in operation 1980, the electronic device 1901 may control configuration information about each of the first wireless audio device set 1903 and the second wireless audio device set 1907 related to a function of the executed audio sharing mode. The configuration information may include ANC configuration information, volume control information (volume up/down), and/or event notification reception information.

In an embodiment, although not shown, when the executed audio sharing mode is a first audio sharing mode, the electronic device 1901 may transmit currently played audio data to the first wireless audio device set 1903 and the second wireless audio device set 1907 through an application related to audio playback. For example, the electronic device 1901 may transmit the currently played audio data to the first wireless audio device set 1903, based on the configuration information (e.g., ANC information and volume information) about the first wireless audio device set 1903. The electronic device 1901 may transmit the currently played audio data to the second wireless audio device set 1907, based on the configuration information (e.g., ANC information and volume information) about the second wireless audio device set 1907.

In an embodiment, although not shown, when the audio sharing mode is a second audio sharing mode, the electronic device 1901 may receive a first audio signal from the first wireless audio device set 1903. The electronic device 1901 may transmit the first audio signal to the second wireless audio device set 1907, based on the configuration information (e.g., ANC information and volume information) about the second wireless audio device set 1907. The electronic device 1901 may receive a second audio signal from the second wireless audio device set 1907. The electronic device 1901 may transmit the second audio signal to the first wireless audio device set 1903, based on the configuration information (e.g., ANC information and volume information) about the first wireless audio device set 1903.

In various embodiments, although not shown, when releasing the communication link with the electronic device 1901, the second wireless audio device set 1907 may be automatically connected to the external electronic device 1905 to which the second wireless audio device set 1907 has established the communication link before being connected to the electronic device 1901.

Figure 20:
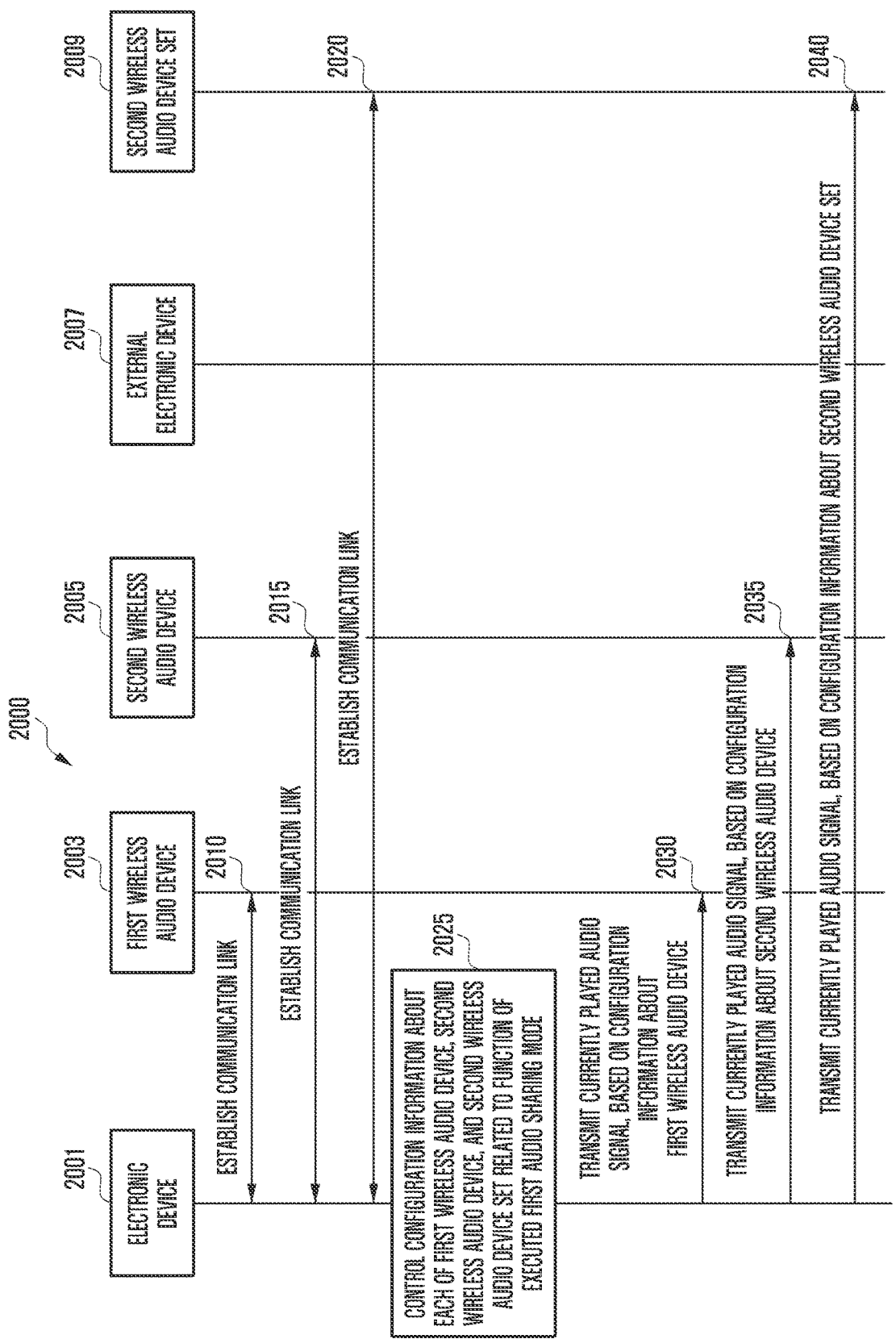
FIG. 20 is a view illustrating signal flow between an electronic device, a first wireless audio device, a second wireless audio device, an external electronic device, and a second wireless audio device set, according to an embodiment of the disclosure.

FIG. 20 is a view illustrating signal flow between an electronic device, a first wireless audio device, a second wireless audio device, an external electronic device, and a second wireless audio device set, according to an embodiment of the disclosure.

According to various embodiments, FIG. 20 illustrates a method of executing an audio sharing mode in a state in which, when a first wireless audio device set 1803 or 1903 is worn on the ears of a first user according to the foregoing embodiments of FIG. 18A to FIG. 19B, a first wireless audio device 2003 (e.g., the first wireless audio device 411 of FIG. 4) is maintained to be worn on an ear of the first user and a second wireless audio device 2005 (e.g., the second wireless audio device 413 of FIG. 4) is detached from an ear of the first user and is then worn on an ear of a second user, and a second wireless audio device set 2009 is worn on an ear of a third user.

According to various embodiments, although not shown, an electronic device 2001 may receive a sensor signal from the first wireless audio device set 1803 or 1903 in the state in which the first wireless audio device set 1803 or 1903 is worn on the ear of the first user. The electronic device 2001 may determine a state in which the first wireless audio device 2003 or the second wireless audio device 2005 included in the first wireless audio device set is detached from the ear of the first user and is worn on the ear of the second user, based on the sensor signal received from the first wireless audio device set 1803 or 1903, for example, a sensor signal detected by an acceleration sensor (e.g., the acceleration sensor 522 of FIG. 5) or a gyro sensor (e.g., the gyro sensor 523 of FIG. 5).

Referring to view 2000 of FIG. 20, in operation 2010, the electronic device 2001 (e.g., the electronic device 401 of FIG. 4) may establish a communication link with the first wireless audio device 2003. In operation 2015, the electronic device 2001 may establish a communication link with the second wireless audio device 2005. In operation 2020, the electronic device 2001 may establish a communication link with the second wireless audio device set 2009. In this case, no link is described with the external electronic device 2007.

Since the operation of the electronic device 2001 establishing the communication link with the second wireless audio device set 2009 according to various embodiments has been described above in detail in operation 1820 to operation 1870 of FIG. 18A and FIG. 18B, a description thereof will be omitted.

In an embodiment, in operation 2025, the electronic device 2001 may control configuration information about each of the first wireless audio device 2003, the second wireless audio device 2005, and the second wireless audio device set 2009 related to a function of an executed first audio sharing mode (e.g., media sharing mode).

In an embodiment, in operation 2030, the electronic device 2001 may transmit a currently played audio signal to the first wireless audio device 2003, based on the configuration information about the first wireless audio device 2003. For example, the electronic device 2001 may transmit the current played audio signal to the first wireless audio device 2003, based on ANC configuration information and/or volume information about the first wireless audio device 2003. When an event (e.g., a texting event) is received while playing the audio signal, the electronic device 2001 may or may not transmit a notification of the received event, based on event notification reception information about the first wireless audio device 2003.

In an embodiment, in operation 2035, the electronic device 2001 may transmit a currently played audio signal to the second wireless audio device 2005, based on the configuration information about the second wireless audio device 2005. For example, the electronic device 2001 may transmit the current played audio signal to the second wireless audio device 2005, based on ANC configuration information and/or volume information about the second wireless audio device 2005. When an event (e.g., a texting event) is received while playing the audio signal, the electronic device 2001 may or may not transmit a notification of the received event, based on event notification reception information about the second wireless audio device 2005.

In an embodiment, in operation 2040, the electronic device 2001 may transmit a currently played audio signal to the second wireless audio device set 2009, based on the configuration information about the second wireless audio device set 2009. For example, the electronic device 2001 may transmit the current played audio signal to the second wireless audio device set 2009, based on ANC configuration information and/or volume information about the second wireless audio device set 2009. When an event (e.g., a texting event) is received while playing the audio signal, the electronic device 2001 may or may not transmit a notification of the received event, based on event notification reception information about the second wireless audio device set 2009.

Figure 21A:
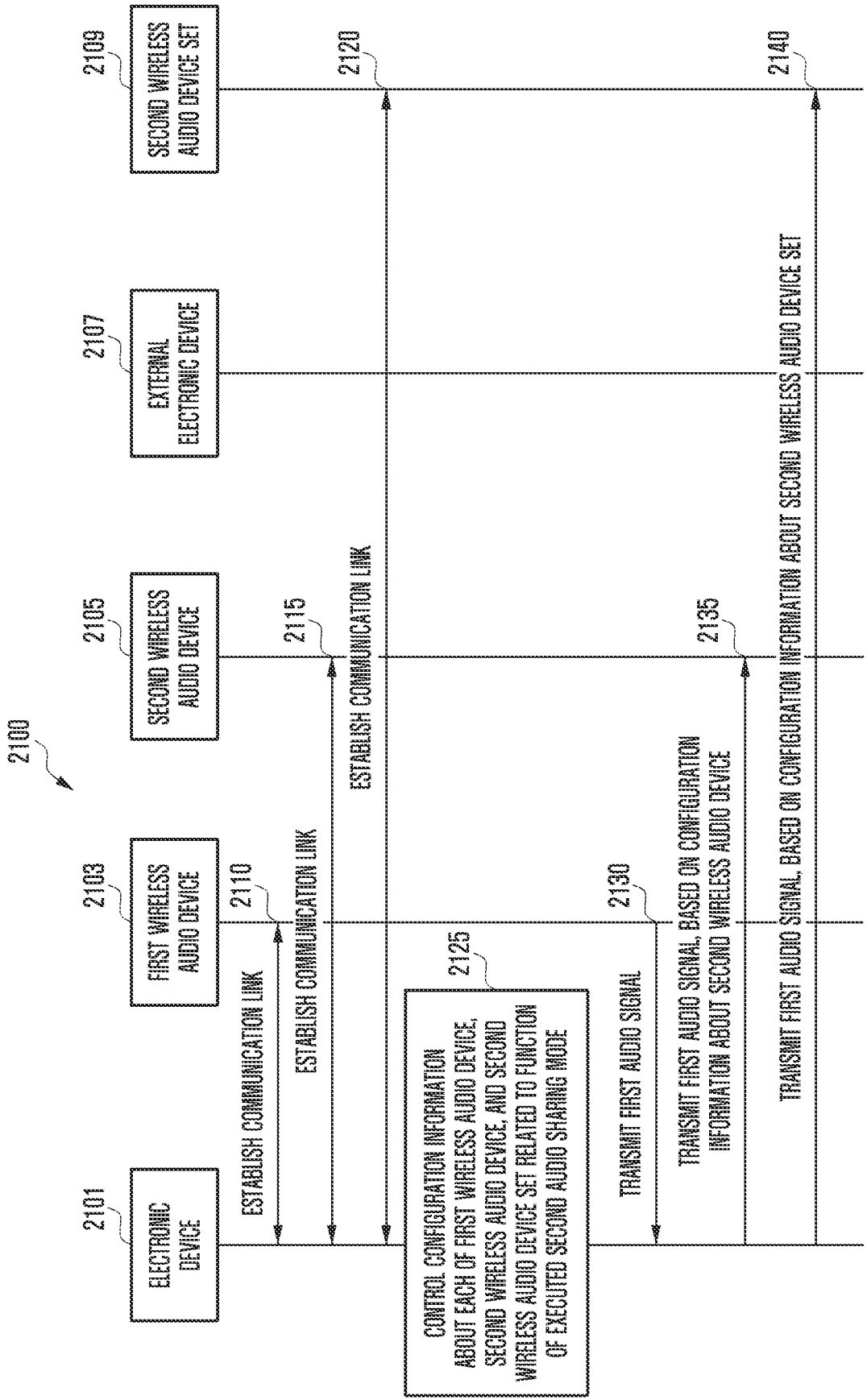

FIGS. 21A and 21B are further views illustrating signal flow between an electronic device, a first wireless audio device, a second wireless audio device, an external electronic device, and a second wireless audio device set, according to various embodiments of the disclosure.

According to various embodiments, FIG. 21A and FIG. 21B illustrate a method of executing an audio sharing mode in a state in which a first wireless audio device 2103 (e.g., the first wireless audio device 411 of FIG. 4) is worn on an ear of a first user, a second wireless audio device 2105 (e.g., the second wireless audio device 413 of FIG. 4) is worn on an ear of a second user, and a second wireless audio device set 2109 is worn on an ear of a third user.

Referring to view 2100 of FIGS. 21A and 21B, in operation 2110, an electronic device 2101 (e.g., the electronic device 401 of FIG. 4) may establish a communication link to the first wireless audio device 2103. In operation 2115, the electronic device 2101 may establish a communication link to the second wireless audio device 2105. In operation 2120, the electronic device 2101 may establish a communication link to the second wireless audio device set 2109. In this case, no link is described with the external electronic device 2107. Since the operation of the electronic device 2101 establishing the communication link the second wireless audio device set 2109 has been described above in detail in operation 1820 to operation 1870 of FIG. 18A and FIG. 18B, a description thereof will be omitted.

In an embodiment, in operation 2125, the electronic device 2101 may control configuration information about each of the first wireless audio device 2103, the second wireless audio device 2105, and the second wireless audio device set 2109 related to a function of an executed second audio sharing mode.

In an embodiment, in operation 2130, the first wireless audio device 2103 may transmit a first audio signal to the electronic device 2101. The first wireless audio device 2103 may obtain the first audio signal through a microphone (e.g., the microphone 519 of FIG. 5) and may transmit the first audio signal to the electronic device 2101.

In an embodiment, in operation 2135, the electronic device 2101 may transmit the first audio signal to the second wireless audio device 2105, based on the configuration information about the second wireless audio device 2105. In operation 2140, the electronic device 2101 may transmit the first audio signal to the second wireless audio device set 2109, based on the configuration information about the second wireless audio device set 2109.

In an embodiment, in operation 2145, the second wireless audio device 2105 may transmit a second audio signal to the electronic device 2101. The second wireless audio device 2105 may obtain the second audio signal through the microphone 519 and may transmit the second audio signal to the electronic device 2101.

In an embodiment, in operation 2150, the electronic device 2101 may transmit the second audio signal to the first wireless audio device 2103, based on the configuration information about the first wireless audio device 2103. In operation 2155, the electronic device 2101 may transmit the second audio signal to the second wireless audio device set 2109, based on the configuration information about the second wireless audio device set 2109.

In an embodiment, in operation 2160, the second wireless audio device set 2109 may transmit a third audio signal to the electronic device 2101. The second wireless audio device set 2109 may obtain the third audio signal through the microphone 519 and may transmit the third audio signal to the electronic device 2101.

In an embodiment, in operation 2165, the electronic device 2101 may transmit the third audio signal to the first wireless audio device 2103, based on the configuration information about the first wireless audio device 2103. In operation 2170, the electronic device 2101 may transmit the third audio signal to the second wireless audio device 2105, based on the configuration information about the second wireless audio device 2105.

In various embodiments, it has been described that the first to third audio signals are relayed through the electronic device 2101, but the disclosure is not limited thereto. The first wireless audio device 2103, the second wireless audio device 2105, and the second wireless audio device set 2109 may independently transmit and receive the respectively audio signals.

FIG. 22 is a view illustrating a connection with at least one wireless audio device set connected to an external electronic device adjacent to an electronic device according to an embodiment of the disclosure.

Referring to view 2200 of FIG. 22, as shown by reference number 2210, a list 2215 including at least one external electronic device connected to an electronic device (e.g., the electronic device 401 of FIG. 4) may be displayed.

In an embodiment, the electronic device 401 may activate a discovery mode and may display a list 2220 of at least one external electronic device adjacent to the electronic device 401. For example, the list 2220 of the at least one external electronic device may include a Jane phone 2221, a Tom tablet 2222, and a Brown phone 2223. The electronic device 401 may detect a user input 2225 to select the Jane phone 2221 from the list 2220 of the at least one external electronic device. Upon detecting the user input 2225 to select the Jane phone 2221, the electronic device 401 may display a list 2445 including at least one wireless audio device set, for example, Jane's wireless audio device (Jane buds) 2450, having an established communication link to the Jane's phone 2221 as shown by reference numeral 2240. Upon detecting an input 2455 to select the Jane's wireless audio device (Jane buds) 2450 from the list 2445, the electronic device 401 may display a notification message 2285 (e.g., Your buds connected Jane's buds) in indicating that a connection with the Jane's wireless audio device (e.g., Jane's buds) has been established on a display (e.g., the display 421 of FIG. 4) as shown by reference numeral 2280.

Although not shown, upon detecting the input 2455 to select the Jane's wireless audio device (Jane's buds) 2450, the electronic device 401 may receive information about the wireless audio device, such as MAC address information about the Jane's wireless audio device, profile information, and/or a security key, from the Jane's phone 2221.

Figure 23A:
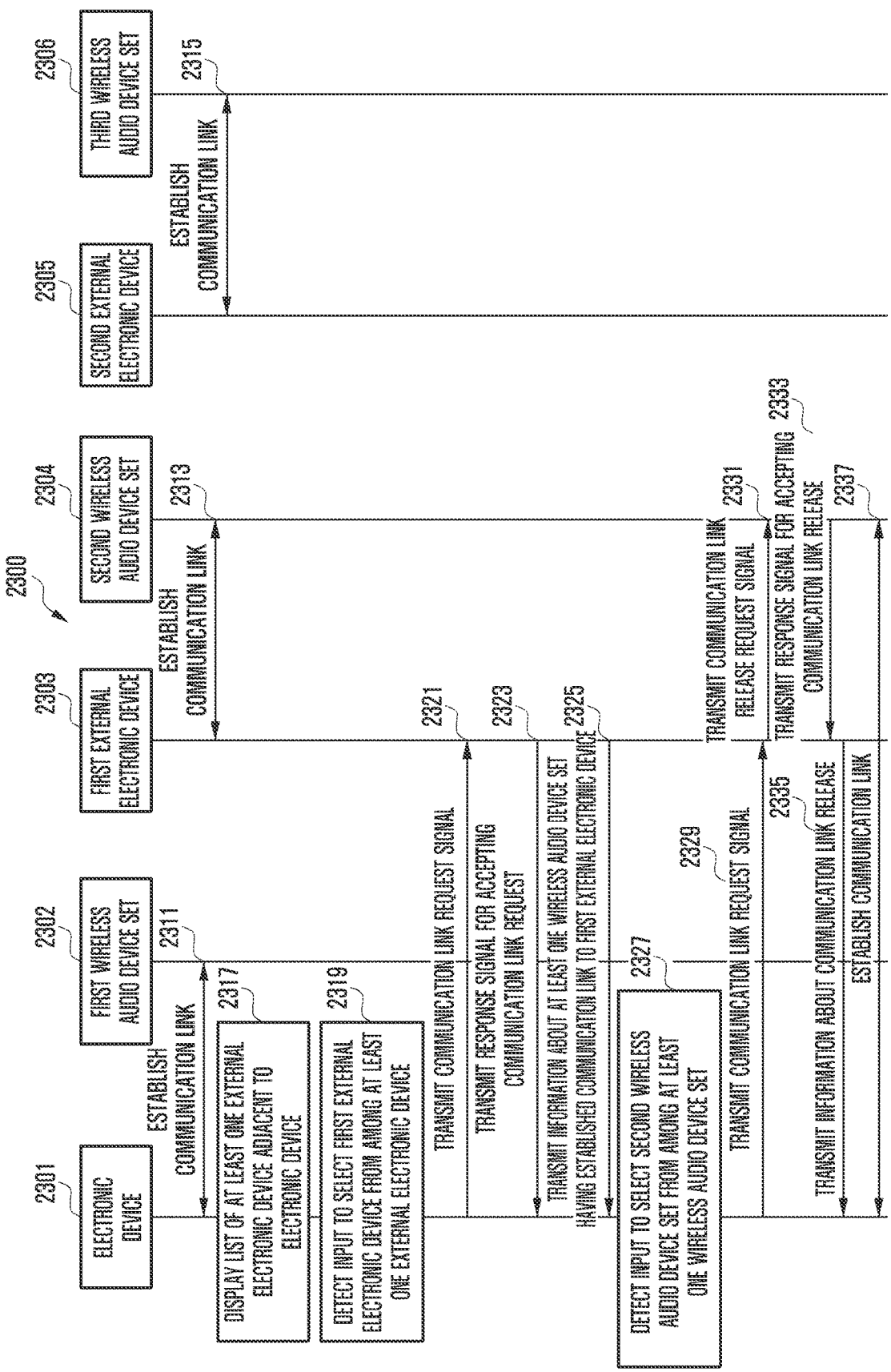
FIGS. 23A and 23B are views illustrating signal flow between an electronic device, a first wireless audio device set, a first external electronic device, a second wireless audio device set, a second external electronic device, and a third wireless audio device set, according to various embodiments of the disclosure.
Figure 23B:
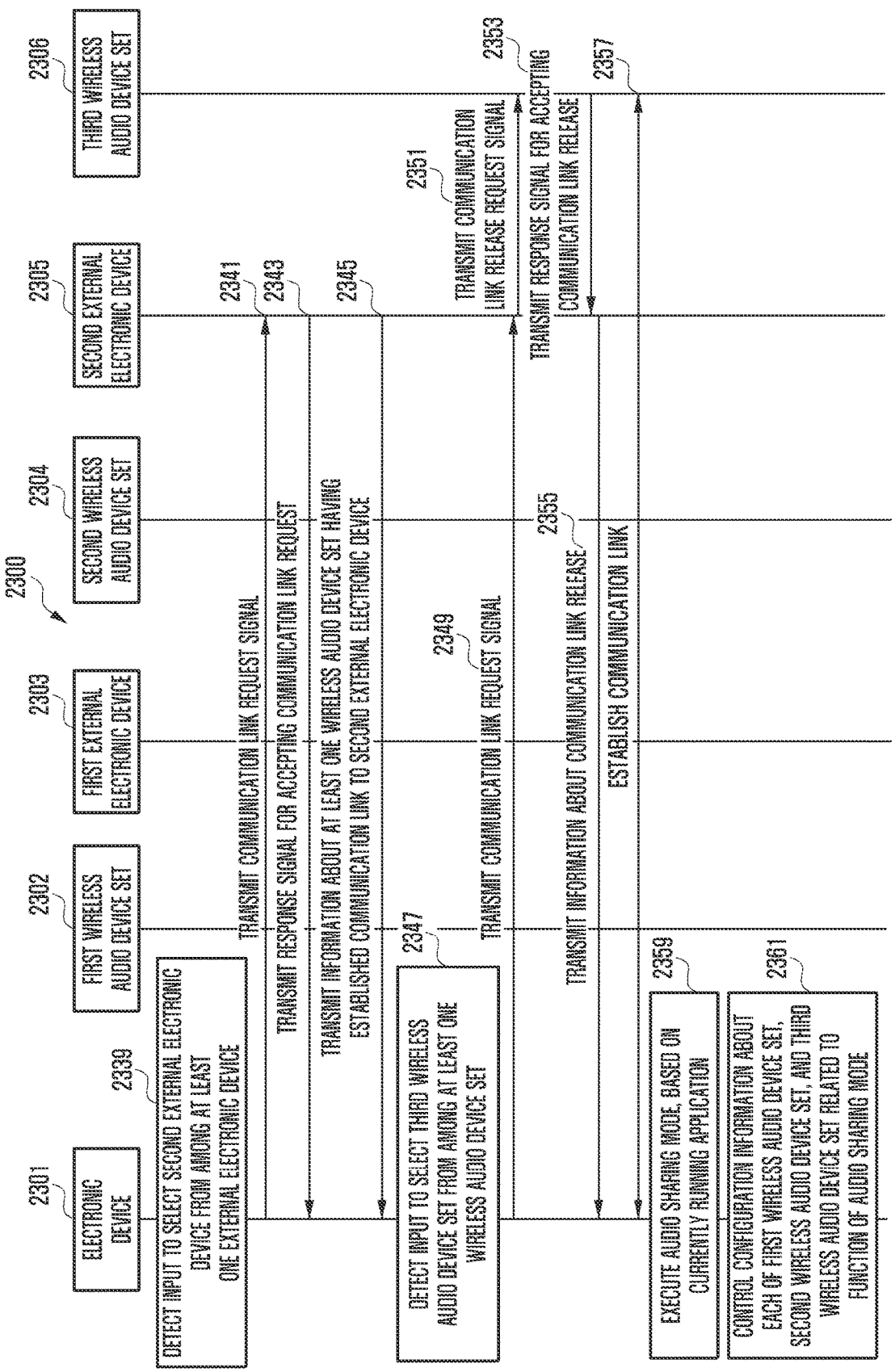

FIGS. 23A and 23B are views illustrating signal flow between an electronic device, a first wireless audio device set, a first external electronic device, a second wireless audio device set, a second external electronic device, and a third wireless audio device set, according to various embodiments of the disclosure.

Since operation 2317 to operation 2337 of FIG. 23A according to various embodiments are the same as operation 1810 to operation 1870 of FIG. 18A and FIG. 18B described above, a detailed description thereof may be replaced with a relevant description of FIG. 18A and FIG. 18B. In addition, since operation 2339 to operation 2357 of FIG. 23B are similar to operation 1810 to operation 1870 of FIG. 18A and FIG. 18B described above, a detailed description thereof may be replaced with a relevant description of FIG. 18A and FIG. 18B.

Referring to view 2300 of FIGS. 23A and 23B, in operation 2311, an electronic device 2301 (e.g., the electronic device 401 of FIG. 4) may establish a communication link to a first wireless audio device set 2302. In operation 2313, a first external electronic device 2303 may establish a communication link to a second wireless audio device set 2304. In operation 2315, a second external electronic device 2305 may establish a communication link to a third wireless audio device set 2306. In operation 2317, the electronic device 2301 may display a list of at least one external electronic device adjacent to the electronic device 2301. In operation 2319, the electronic device 2301 may detect an input to select the first external electronic device 2303 from among the at least one external electronic device.

In an embodiment, in operation 2321, the electronic device 2301 may transmit a signal for requesting a communication link to the first external electronic device 2303. In operation 2323, the first external electronic device 2303 may transmit a response signal for accepting the request for the communication link to the electronic device 2301. In operation 2325, the first external electronic device 2303 may transmit information about at least one wireless audio device set, for example, the second wireless audio device set 2304, connected to the first external electronic device 2303 to the electronic device 2301. The information about the second wireless audio device set 2304 may include a MAC address, identification information (e.g., profile information), and/or a security key.

In an embodiment, in operation 2327, the electronic device 2301 may detect an input to select the second wireless audio device set 2304 from among the at least one wireless audio device set. In operation 2329, the electronic device 2301 may transmit a signal for requesting a connection to the second wireless audio device set 2304 to the first external electronic device 2303. In operation 2331, the first external electronic device 2303 may transmit a signal for requesting release of the communication link to the second wireless audio device set 2304. In operation 2333, the second wireless audio device set 2304 may transmit a response signal for accepting the release of the communication link to the first external electronic device 2303.

In various embodiments, although not shown, upon receiving the response signal for accepting the release of the communication link from the second wireless audio device set 2304, the first external electronic device 2303 may enter an automatic connection standby state. For example, the automatic connection standby state may include a state for supporting the second wireless audio device set 2304 to automatically establish a communication link with the first external electronic device 2303 previously connected when the second wireless audio device set 2304 is not in a state of being connected with a different electronic device (e.g., when the electronic device 2301 and the second wireless audio device set 2304 having a communication link established in operation 2337 are disconnected).

In an embodiment, in operation 2335, the first external electronic device 2303 may transmit information about the release of the communication link with the second wireless audio device set 2304. In operation 2337, the electronic device 2301 may establish a communication link with the second wireless audio device set 2304, based on the information about the release of the communication link with the second wireless audio device set 2304 received from the first external electronic device 2303.

In various embodiments, although not shown, after establishing the communication link with the electronic device 2301, the second wireless audio device set 2304 may release or maintain the communication link with the first external electronic device 2303. For example, when releasing the communication link with the first external electronic device 2303 after establishing the communication link with the electronic device 2301, the second wireless audio device set 2304 may store configuration information about the communication link with the first external electronic device 2303 previously connected. When releasing the communication link with the electronic device 2301, the second wireless audio device set 2304 may reestablish (e.g., restore) the communication link with the first external electronic device 2304 in the automatic connection standby state, based on the configuration information about the communication link with the first external electronic device 2303.

In an embodiment, in operation 2339, the electronic device 2301 may detect an input to select the second external electronic device 2305 from among the at least one external electronic device. In operation 2341, the electronic device 2301 may transmit a signal for requesting a communication link to the second external electronic device 2305. In operation 2343, second external electronic device 2305 may transmit a response signal for accepting the request for the communication link to the electronic device 2301. In operation 2345, the second external electronic device 2305 may transmit information about at least one wireless audio device set, for example, the third wireless audio device set 2306, connected to the second external electronic device 2305 to the electronic device 2301. The information about the third wireless audio device set 2306 may include a MAC address, identification information (e.g., profile information), and/or a security key.

In an embodiment, in operation 2347, the electronic device 2301 may detect an input to select the third wireless audio device set 2306 from among the at least one wireless audio device set. In operation 2349, the electronic device 2301 may transmit a signal for requesting a connection to the third wireless audio device set 2306 to the second external electronic device 2305. In operation 2351, the second external electronic device 2305 may transmit a signal for requesting release of the communication link to the third wireless audio device set 2306. In operation 2353, the third wireless audio device set 2306 may transmit a response signal for accepting the release of the communication link to the second external electronic device 2305.

In various embodiments, although not shown, upon receiving the response signal for accepting the release of the communication link from the third wireless audio device set 2306, the second external electronic device 2305 may enter an automatic connection standby state (e.g., a state for supporting the third wireless audio device set 2306 to automatically establish a communication link with the second external electronic device 2305 previously connected when the third wireless audio device set 2306 is not in a state of being connected with a different electronic device (e.g., when the electronic device 2301 and the third wireless audio device set 2306 having a communication link established in operation 2357 are disconnected).

In an embodiment, in operation 2355, the second external electronic device 2305 may transmit information about the release of the communication link with the third wireless audio device set 2306. In operation 2357, the electronic device 2301 may establish a communication link with the third wireless audio device set 2306, based on the information about the release of the communication link with the third wireless audio device set 2306 received from the second external electronic device 2305.

In an embodiment, in operation 2359, the electronic device 2301 may execute an audio sharing mode, based on a currently running application.

In an embodiment, in operation 2361, the electronic device 2301 may control configuration information about each of the first wireless audio device set 2302, the second wireless audio device set 2304, and the third wireless audio device set 2306 related to a function of the audio sharing mode. For example, the configuration information may include ANC configuration information, volume control information (volume up/down), and/or event notification reception information.

In an embodiment, the electronic device 2301 may support sharing of an audio signal between the first wireless audio device set, the first external electronic device, the second wireless audio device set, the second external electronic device, and the third wireless audio device set, based on the executed audio sharing mode and the configuration information about each wireless audio device.

In various embodiments, although not shown, the electronic device 2301 may detect an input to terminate the audio sharing mode or an input to release the communication link with each wireless audio device set (e.g., the second wireless audio device set 2304 and/or the third wireless audio device set 2306). Upon detecting the input to terminate the audio sharing mode or the input to release the communication link, the electronic device 2301 may transmit a signal relating to the detected input to each wireless audio device set (e.g., the second wireless audio device set 2304 and/or the third wireless audio device set 2306). Upon receiving the input to terminate the audio sharing mode or the input to release the communication link, the second wireless audio device set 2304 (or the third wireless audio device set 2306) may be automatically connected to the first external electronic device 2303 (or the second external electronic device 2305) to which the second wireless audio device set 2304 (or the third wireless audio device set 2306) has previously established the communication connection before connecting to the electronic device 2301.

An audio sharing method of an electronic device (e.g., the electronic device 401 of FIG. 4) according to various embodiments may include detecting a connection of a first wireless audio device (e.g., the first wireless audio device 441 of FIG. 4) and a second wireless audio device (e.g., the second wireless audio device 443 of FIG. 4) through a wireless communication circuit (e.g., the wireless communication circuit 405 of FIG. 4), identifying whether a wearer of the first wireless audio device 441 and a wearer of the second wireless audio device 443 are different, based on a first sensor signal received from the first wireless audio device 441 and a second sensor signal received from the second wireless audio device 443, executing an audio sharing mode, based on the wearer of the first wireless audio device 441 and the wearer of the second wireless audio device 443 being different, controlling configuration information about the first wireless audio device 441 and the configuration information about the second wireless audio device 443 that are related to a function of the audio sharing mode, and transmitting audio data according to the audio sharing mode to the first wireless audio device 441 and the second wireless audio device 443, based on the configuration information about the first wireless audio device 441 and the configuration information about the second wireless audio device 443, respectively.

According to various embodiments, the audio sharing method of the electronic device 401 may further include displaying a user interface for controlling the configuration information about the first wireless audio device 441 and the configuration information about the second wireless audio device 443 on a display (e.g., the display 421 of FIG. 4) upon executing the audio sharing mode.

According to various embodiments, the audio sharing mode may include a first audio sharing mode and a second audio sharing mode.

According to various embodiments, the first audio sharing mode may include a media sharing mode, and the executing of the audio sharing mode may include identifying a currently running application upon identifying that the wearer of the first wireless audio device 441 and the wearer of the second wireless audio device 443 are different, and executing the first audio sharing mode when the currently running application is an application related to audio playback.

According to various embodiments, the transmitting of the audio data according to the audio sharing mode to the first wireless audio device 441 and the second wireless audio device 443 may include transmitting audio data currently played in the first audio sharing mode to the first wireless audio device 441, based on the configuration information about the first wireless audio device 441, and transmitting the audio data currently played in the first audio sharing mode to the second wireless audio device 443, based on the configuration information about the second wireless audio device 443.

According to various embodiments, the second audio sharing mode may include a conversation sharing mode, and the executing of the audio sharing mode may include executing the second audio sharing mode when the currently running application is not an application related to audio playback.

According to various embodiments, the transmitting of the audio data according to the audio sharing mode to the first wireless audio device 441 and the second wireless audio device 443 may include receiving first audio data from the first wireless audio device 441, transmitting the first audio data to the second wireless audio device 443, based on the configuration information about the second wireless audio device 443, receiving second audio data from the second wireless audio device 443, and transmitting the second audio data to the first wireless audio device 441, based on the configuration information about the first wireless audio device 441.

According to various embodiments, the audio sharing method of the electronic device 401 may further include detecting a communication link with an external electronic device (e.g., the external electronic device 1805 of FIG. 18A) through the wireless communication circuit 405, receiving and displaying information about at least one wireless audio device having a communication link to the external electronic device 1805 from the external electronic device 1805, transmitting a signal for requesting a connection with a first wireless audio device set (e.g., the second wireless audio device set 1807 of FIG. 18A) to the external electronic device 1805 upon detecting a user input to select the first wireless audio device set 1807 from among the at least one wireless audio device, and establishing a communication link with the first wireless audio device set 1807 when receiving a signal relating to release of a connection with the first wireless audio device set 1807 from the external electronic device 1805.

According to various embodiments, the information about the at least one wireless audio device may include a MAC address, identification information, and/or a security key.

According to various embodiments, the audio sharing method of the electronic device 401 may further include controlling the configuration information about the first wireless audio device 441, the configuration information about the second wireless audio device 443, and configuration information about the first wireless audio device set 1807 that are related to the function of the executed audio sharing mode, and transmitting the audio data according to the audio sharing mode to the first wireless audio device 441, the second wireless audio device 443, and the first wireless audio device set 1807, based on the configuration information about the first wireless audio device 441, the configuration information about the second wireless audio device 443, and the configuration information about the first wireless audio device set 1807, respectively.

According to various embodiments, the audio sharing method of the electronic device 401 may further include identifying whether the first wireless audio device 441 and the second wireless audio device 443 are worn, based on the first sensor signal received from the first wireless audio device 441 and the second sensor signal received from the second wireless audio device 443.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and detail may be made therein without departing from the spirit and scope of the disclosure as defined by the appended claims and their equivalents.

The invention claimed is:

1. An electronic device comprising:
a wireless communication circuit;
memory storing instructions; and
at least one processor,
wherein the instructions, when executed by the at least one processor, cause the electronic device is configured to:
detect a connection of a first wireless audio device and a second wireless audio device through the wireless communication circuit,
identify whether a wearer of the first wireless audio device and a wearer of the second wireless audio device are different, based on a first sensor signal received from the first wireless audio device and a second sensor signal received from the second wireless audio device,
execute an audio sharing mode, based on the wearer of the first wireless audio device and the wearer of the second wireless audio device being different,
control configuration information about the first wireless audio device and the configuration information about the second wireless audio device that are related to a function of the audio sharing mode, and
transmit audio data according to the audio sharing mode to the first wireless audio device and the second wireless audio device, based on the configuration information about the first wireless audio device and the configuration information about the second wireless audio device, respectively.

2. The electronic device of claim 1, further comprising:
a display,
wherein the instructions, when executed by the at least one processor, further cause the electronic device to control the display to display a user interface for controlling the configuration information about the first wireless audio device and the configuration information about the second wireless audio device.

3. The electronic device of claim 1,
wherein the configuration information comprises active noise cancellation (ANC) configuration information, volume control information, event notification reception configuration information, microphone control information, or speaker control information about each of the first wireless audio device and the second wireless audio device, and
wherein the audio sharing mode comprises a first audio sharing mode and a second audio sharing mode.

4. The electronic device of claim 3,
wherein the first audio sharing mode comprises a media sharing mode, and
wherein the instructions, when executed by the at least one processor, further cause the electronic device to:
identify a currently running application upon identifying that the wearer of the first wireless audio device and the wearer of the second wireless audio device are different, and
execute the first audio sharing mode when the currently running application is related to audio playback.

5. The electronic device of claim 4, wherein the instructions, when executed by the at least one processor, further cause the electronic device to:
transmit audio data currently playing in the first audio sharing mode to the first wireless audio device, based on the configuration information about the first wireless audio device, and
transmit the audio data currently playing in the first audio sharing mode to the second wireless audio device, based on the configuration information about the second wireless audio device.

6. The electronic device of claim 3,
wherein the second audio sharing mode comprises a conversation sharing mode, and
wherein the instructions, when executed by the at least one processor, further cause the electronic device to execute the second audio sharing mode when the currently running application is not related to audio playback.

7. The electronic device of claim 6, wherein the instructions, when executed by the at least one processor, further cause the electronic device to:
receive first audio data from the first wireless audio device,
transmit the first audio data to the second wireless audio device, based on the configuration information about the second wireless audio device,
receive second audio data from the second wireless audio device, and
transmit the second audio data to the first wireless audio device, based on the configuration information about the first wireless audio device.

8. The electronic device of claim 1,
wherein the instructions, when executed by the at least one processor, further cause the electronic device to:
detect a communication link with an external electronic device through the wireless communication circuit,
receive and display information about at least one wireless audio device having a communication link to the external electronic device from the external electronic device,
transmit a signal requesting a connection with a first wireless audio device set to the external electronic device upon detecting a user input to select the first wireless audio device set from among the at least one wireless audio device, and
establish a communication link with the first wireless audio device set when receiving a signal relating to release of a connection with the first wireless audio device set from the external electronic device, and
wherein the information about the at least one wireless audio device comprises a media access control (MAC) address, identification information, or a security key.

9. The electronic device of claim 8, wherein the instructions, when executed by the at least one processor, further cause the electronic device to:
control the configuration information about the first wireless audio device, the configuration information about the second wireless audio device, and configuration information about the first wireless audio device set that are related to the function of the executed audio sharing mode, and
transmit the audio data according to the audio sharing mode to the first wireless audio device, the second wireless audio device, and the first wireless audio device set, based on the configuration information about the first wireless audio device, the configuration information about the second wireless audio device, and the configuration information about the first wireless audio device set, respectively.

10. The electronic device of claim 1, wherein the instructions, when executed by the at least one processor, further cause the electronic device to identify whether the first wireless audio device and the second wireless audio device are worn, based on the first sensor signal and the second sensor signal.

11. The electronic device of claim 1, wherein the instructions, when executed by the at least one processor, further cause the electronic device to receive the first sensor signal and the second sensor signal at a specified time interval.

12. An audio sharing method of an electronic device, the method comprising:
detecting a connection of a first wireless audio device and a second wireless audio device through a wireless communication circuit;
identifying whether a wearer of the first wireless audio device and a wearer of the second wireless audio device are different, based on a first sensor signal received from the first wireless audio device and a second sensor signal received from the second wireless audio device;
executing an audio sharing mode, based on the wearer of the first wireless audio device and the wearer of the second wireless audio device being different;
controlling configuration information about the first wireless audio device and the configuration information about the second wireless audio device that are related to a function of the audio sharing mode; and
transmitting audio data according to the audio sharing mode to the first wireless audio device and the second wireless audio device, based on the configuration information about the first wireless audio device and the configuration information about the second wireless audio device, respectively.

13. The method of claim 12, further comprising:
displaying a user interface for controlling the configuration information about the first wireless audio device and the configuration information about the second wireless audio device on a display, upon executing the audio sharing mode.

14. The method of claim 12,
wherein the audio sharing mode comprises a first audio sharing mode and a second audio sharing mode,
wherein the first audio sharing mode comprises a media sharing mode,
wherein the executing of the audio sharing mode comprises:
identifying a currently running application upon identifying that the wearer of the first wireless audio device and the wearer of the second wireless audio device are different; and
executing the first audio sharing mode when the currently running application is related to audio playback, and wherein the transmitting of the audio data according to the audio sharing mode to the first wireless audio device and the second wireless audio device comprises:
transmitting audio data currently played in the first audio sharing mode to the first wireless audio device, based on the configuration information about the first wireless audio device; and
transmitting the audio data currently played in the first audio sharing mode to the second wireless audio device, based on the configuration information about the second wireless audio device.

15. The method of claim 14,
wherein the second audio sharing mode comprises a conversation sharing mode,
wherein the executing of the audio sharing mode comprises executing the second audio sharing mode when the currently running application is not related to audio playback, and
wherein the transmitting of the audio data according to the audio sharing mode to the first wireless audio device and the second wireless audio device comprises:
receiving first audio data from the first wireless audio device;
transmitting the first audio data to the second wireless audio device, based on the configuration information about the second wireless audio device;
receiving second audio data from the second wireless audio device; and
transmitting the second audio data to the first wireless audio device, based on the configuration information about the first wireless audio device.

16. The method of claim 12, further comprising:
detecting a communication link with an external electronic device through the wireless communication circuit,
receiving and display information about at least one wireless audio device having a communication link to the external electronic device from the external electronic device,
transmitting a signal requesting a connection with a first wireless audio device set to the external electronic device upon detecting a user input to select the first wireless audio device set from among the at least one wireless audio device, and
establishing a communication link with the first wireless audio device set when receiving a signal relating to release of a connection with the first wireless audio device set from the external electronic device, and
wherein the information about the at least one wireless audio device comprises a media access control (MAC) address, identification information, or a security key.

17. The method of claim 16, further comprising:
controlling the configuration information about the first wireless audio device, the configuration information about the second wireless audio device, and configuration information about the first wireless audio device set that are related to the function of the executed audio sharing mode, and
transmitting the audio data according to the audio sharing mode to the first wireless audio device, the second wireless audio device, and the first wireless audio device set, based on the configuration information about the first wireless audio device, the configuration information about the second wireless audio device, and the configuration information about the first wireless audio device set, respectively.

18. The method of claim 12, further comprising:
identifying whether the first wireless audio device and the second wireless audio device are worn, based on the first sensor signal and the second sensor signal.

19. The method of claim 12, further comprising:
receiving the first sensor signal and the second sensor signal at a specified time interval.

20. One or more non-transitory computer-readable storage media storing one or more computer programs including computer-executable instructions that, when executed by one or more processors of an electronic device, cause the electronic device to perform operations, the operations comprising:
detecting a connection of a first wireless audio device and a second wireless audio device through a wireless communication circuit;
identifying whether a wearer of the first wireless audio device and a wearer of the second wireless audio device are different, based on a first sensor signal received from the first wireless audio device and a second sensor signal received from the second wireless audio device;
executing an audio sharing mode, based on the wearer of the first wireless audio device and the wearer of the second wireless audio device being different;
controlling configuration information about the first wireless audio device and the configuration information about the second wireless audio device that are related to a function of the audio sharing mode; and
transmitting audio data according to the audio sharing mode to the first wireless audio device and the second wireless audio device, based on the configuration information about the first wireless audio device and the configuration information about the second wireless audio device, respectively.

* * * * *